US012420512B2

(12) United States Patent
Gough et al.

(10) Patent No.: US 12,420,512 B2
(45) Date of Patent: Sep. 23, 2025

(54) APPARATUS FOR MANUFACTURING A CONTAINER

(71) Applicant: FRUGALPAC LIMITED, Ipswich (GB)

(72) Inventors: Peter Gough, Northampton (GB); Henry Slack, London (GB)

(73) Assignee: Frugalpac Limited, Ipswich (GB)

( * ) Notice: Subject to any disclaimer, the term of this patent is extended or adjusted under 35 U.S.C. 154(b) by 89 days.

(21) Appl. No.: 18/007,125

(22) PCT Filed: Jul. 27, 2021

(86) PCT No.: PCT/GB2021/051929
§ 371 (c)(1),
(2) Date: Jan. 27, 2023

(87) PCT Pub. No.: WO2022/023729
PCT Pub. Date: Feb. 3, 2022

(65) Prior Publication Data
US 2023/0226790 A1 Jul. 20, 2023

(30) Foreign Application Priority Data
Jul. 28, 2020 (GB) ...................................... 2011685

(51) Int. Cl.
*B31B 50/59* (2017.01)
*B31B 50/62* (2017.01)
(Continued)

(52) U.S. Cl.
CPC ............ *B31B 50/594* (2018.05); *B31B 50/62* (2017.08); *B31B 50/741* (2017.08); *B31B 50/84* (2017.08);
(Continued)

(58) Field of Classification Search
CPC ..... B31B 50/594; B31B 50/62; B31B 50/741; B31B 50/84; B31B 2105/002;
(Continued)

(56) References Cited

U.S. PATENT DOCUMENTS 1,016,327 A * 2/1912 Greenfield ............ B31B 50/594 493/108
1,024,938 A * 4/1912 Heyl ..................... B31B 50/594 493/89
(Continued)

FOREIGN PATENT DOCUMENTS

CN 204 278 603 4/2015
EP 2803467 A1 * 11/2014 ............. B29C 49/24
(Continued)

OTHER PUBLICATIONS

U.S. Appl. No. 18/007,108, Peter Gough.
(Continued)

*Primary Examiner* — Anna K Kinsaul
*Assistant Examiner* — Mobeen Ahmed
(74) *Attorney, Agent, or Firm* — Brown & Brown IP Law PLLC

(57) ABSTRACT

An apparatus for manufacturing a bottle comprising an inner pouch and an outer paperboard shell, the shell made from a sheet blank comprising a main body panel, a first neck panel and a second neck panel. An apparatus for use in manufacturing a bottle comprises a former having a cavity for receiving the pouch, the former comprising a main body section, a neck section and a shoulder section; at least two neck press elements, each neck press element being moveable into a clamping position to clamp a part of one of said neck panels between the neck press element and the neck section of the former; and at least two shoulder press elements, each shoulder press element being moveable into
(Continued)

a clamping position to clamp a part of one of neck panels between the shoulder press element and the shoulder section of the former.

20 Claims, 27 Drawing Sheets

(51) Int. Cl.
*B31B 50/74* (2017.01)
*B31B 50/84* (2017.01)
*B31B 105/00* (2017.01)
*B31B 110/20* (2017.01)
*B31B 120/00* (2017.01)
*B31B 120/40* (2017.01)

(52) U.S. Cl.
CPC ..... *B31B 2105/002* (2017.08); *B31B 2110/20* (2017.08); *B31B 2120/002* (2017.08); *B31B 2120/40* (2017.08); *B31B 2241/005* (2013.01)

(58) Field of Classification Search
CPC ........... B31B 2110/20; B31B 2120/002; B31B 2120/40; B31B 2241/005; B31B 50/00; B31B 50/26; B31B 50/59
See application file for complete search history.

(56) References Cited

U.S. PATENT DOCUMENTS

| | | | | | |
|---|---|---|---|---|---|
| 1,192,202 | A * | 7/1916 | Johnson | B31B 50/59 493/152 |
| 1,230,177 | A * | 6/1917 | Lang | B31B 50/59 493/152 |
| 2,169,345 | A * | 8/1939 | Kuchler | B31B 50/00 229/4.5 |
| 4,256,231 | A * | 3/1981 | Cioc | B29C 49/0411 215/12.2 |
| 4,386,923 | A * | 6/1983 | Okushita | B65D 5/606 141/315 |
| 4,560,090 | A * | 12/1985 | Okushita | B65D 77/065 222/105 |
| 4,918,906 | A * | 4/1990 | Ako | B65B 1/02 53/449 |
| 5,095,960 | A * | 3/1992 | Grundler | B65B 43/34 141/147 |
| 5,272,855 | A * | 12/1993 | Togi | B31B 50/00 53/410 |
| 5,433,345 | A * | 7/1995 | Sasaki | B65D 75/5877 222/105 |
| 5,829,637 | A * | 11/1998 | Takemura | B65D 77/065 222/105 |
| 6,530,256 | B1 * | 3/2003 | Irie | B21D 41/02 72/358 |
| 6,824,731 | B1 * | 11/2004 | Zoppas | B29C 49/42073 425/534 |
| 7,681,783 | B2 * | 3/2010 | Stephenson | B65D 77/22 220/495.01 |
| 10,717,578 | B2 * | 7/2020 | Slack | B65D 23/02 |
| 10,737,864 | B2 * | 8/2020 | Myerscough | B65D 41/04 |
| 2003/0145968 | A1 * | 8/2003 | Kumamoto | B65D 23/0821 162/227 |
| 2006/0119004 | A1 * | 6/2006 | Chmura | B29C 57/12 425/525 |
| 2006/0124719 | A1 * | 6/2006 | Mannlein | B65D 3/14 229/403 |
| 2010/0252617 | A1 * | 10/2010 | Dayton | H05K 7/20836 493/110 |
| 2013/0140326 | A1 * | 6/2013 | Myerscough | B65D 5/46 220/495.11 |
| 2017/0015480 | A1 * | 1/2017 | Slack | B65D 23/02 |
| 2019/0070819 | A1 * | 3/2019 | Larsson | B29C 49/0005 |
| 2021/0283676 | A1 * | 9/2021 | Whincup | B65D 41/02 |
| 2022/0274367 | A1 * | 9/2022 | Wang | B31B 50/64 |
| 2023/0226741 | A1 * | 7/2023 | Khan | B65D 1/0215 215/12.2 |
| 2023/0357992 | A1 * | 11/2023 | Turner | D21J 3/10 |
| 2024/0100798 | A1 * | 3/2024 | Larsson | B65D 1/0207 |

FOREIGN PATENT DOCUMENTS

| | | | | |
|---|---|---|---|---|
| EP | 3 239 068 | | 11/2017 | |
| EP | 3375592 | A1 * | 9/2018 | B29C 49/24 |
| GB | 2 524 822 | | 10/2015 | |
| GB | 2 563 279 | | 12/2018 | |
| WO | 2010/085182 | | 7/2010 | |
| WO | 2015/150794 | | 10/2015 | |

OTHER PUBLICATIONS

International Search Report and Written Opinion dated Nov. 3, 2021 (Application No. PCT/GB2021/051929).
GB Search Report dated Jan. 29, 2021 (Application No. GB 2011685.1).

* cited by examiner

APPARATUS FOR MANUFACTURING A CONTAINER

FIELD OF THE INVENTION

This invention relates to an apparatus for manufacturing a container. In particular this invention relates to an apparatus for manufacturing a bottle comprising an outer paperboard shell and an inner liner or pouch.

BACKGROUND TO THE INVENTION

There is a general desire and need to reduce the amount of waste that is produced and a drive to recycle as much as possible. One particular area that is receiving a lot of attention is containers for food and drink.

Traditionally wine has been stored and sold in glass bottles. The glass used is relatively heavy and typically makes up about 40% of the weight of the filled bottle of wine. This means that the transportation costs are high. Furthermore, glass breaks relatively easily when, for example, a bottle is dropped. The bottle will typically break into sharp fragments which may cause injury to a consumer.

It is known to make a bottle having a pulp moulded paperboard outer shell and a blow moulded inner plastics lining. Although these containers have a decreased weight compared to glass bottles, they have a number of disadvantages. The shelf life of the wine within the bottles may be decreased compared to glass bottles, and it is difficult to apply print to the outer surface of the bottle.

It is also known to manufacture a bottle having a paperboard outer shell and an inner liner or pouch, and in which the shell is formed from flat sheet material which is pressed to form the 3-dimensional shape of the shell. Such a bottle is disclosed in WO 2015/150794. By forming the shell of the bottle from a flat sheet of paperboard it is possible to pre-print the paperboard before manufacture of the bottle, thereby significantly improving the aesthetics of the bottle compared to pulp-moulded bottles.

Commercial considerations mean that it is desirable for any alternative bottles including a paperboard shell to be able to be manufactured in a cost effective manner at similar speeds and in similar volumes to existing glass bottles, and also with the same degree of reliability and consistency.

It is, therefore, an object of the invention to provide a machine for manufacturing a bottle that is able to operate reliably and at high speeds.

SUMMARY OF THE INVENTION

A first aspect of the disclosure provides an apparatus for use in manufacturing a bottle, the bottle comprising an inner pouch and an outer paperboard shell, the shell being made from two sheet blanks each comprising a main body panel, a first neck panel and a second neck panel, and the apparatus comprising:

- a former having a cavity for receiving said pouch;
- first and second clamp elements configured to shape said main body panels around a main body section of the former, each of the first and second clamp elements comprising a part-cylindrical surface;
- a pair of inner neck press assemblies configured to shape said first neck panels around a neck section of the former, each of the inner neck press assemblies comprising a first part-cylindrical press surface and a second press surface having a double curvature; and
- a plurality of clamp units configured to shape said second neck panels around the neck section of the former, each of the clamp units comprising a first curved press surface and a second straight press surface.

The apparatus preferably further comprises a controller configured to cause movement of the first and second clamp elements to shape said main body panels around the former, to subsequently cause movement of the pair of inner neck press assemblies to shape said first neck panels around the former, and to subsequently cause movement of the plurality of clamp units to shape said second neck panels around the former.

The blanks may form a side wall of the shell partially surrounding the pouch. In some embodiments it may be desirable for the pouch to be fully enclosed and in these embodiments it may, therefore, be desirable to secure a base element to the side wall of the shell. Accordingly, the apparatus preferably further comprises an assembly configured to secure a base element to said blanks to form a base of said shell.

The shapes of the side wall formed by the blanks and the pouch may mean that it is necessary to displace a part of the pouch relative to the side wall in order to secure the base element to the side wall. The apparatus may, therefore, comprise a mechanism for displacing a part of the pouch relative to a part of the blanks. The mechanism may comprise an inflation system configured to inflate the pouch. The mechanism may additionally comprise a member arranged to apply a force to a part of the inflated pouch.

To allow the flat sheet paperboard blanks to be more easily shaped around the former, preferred embodiments of the apparatus comprise an assembly for applying moisture to the blanks. The assembly is preferably configured to apply a greater level of moisture to the first and second neck panels than to the main body panel.

In preferred methods of forming the bottle, the two sheet blanks are shaped around the former and adhered to each other. Accordingly, in preferred embodiments the apparatus further comprises an applicator configured to apply adhesive to a first surface of at least one of the blanks. The adhesive is preferably applied to selective areas of the surface of the blank and accordingly the applicator is preferably configured to apply the adhesive in a pre-defined two-dimensional pattern on the surface of the blank.

The apparatus may include a first heating element arranged to apply heat to a first region of the adhesive. The first heating element may comprise an infrared heating element. Alternatively, the first heating element may be heated by a supply of hot fluid, for example hot air.

The apparatus may include a second heating element arranged to apply heat to a second region of the adhesive. The second heating element may comprise an infrared heating element. Alternatively, the second heating element may be heated by a supply of hot fluid, for example hot air.

As the apparatus may be configured to form different parts of the blanks around the former sequentially, it may be necessary to activate or re-activate adhesive applied to some parts of the blanks. Furthermore, in embodiments in which the moisture content of the paperboard of the blanks has been increased before forming of the blanks, it may be necessary to supply additional moisture to a part of the blanks during the process of forming the blanks. Accordingly, the apparatus preferably comprises an assembly for selectively increasing the moisture content of only a part of at least one of the blanks. This assembly preferably comprises a delivery nozzle for directing a mixed stream of hot air and dry steam to the selected part of at least one of the blanks. The assembly preferably further comprises a shroud, sheath or heat resistant plate configured to prevent interaction between the mixed stream of hot air and dry steam and a second part of at least one of the blanks.

In preferred embodiments the pouch is secured to a fitment and the pouch and the fitment together form a pouch assembly. The pouch assembly is preferably configured to hold and dispense a liquid. During manufacturing of the bottle, a part of each of the first and second neck panels may be shaped and formed around a part of the fitment. Accordingly, in preferred embodiments the apparatus comprises a stopper for insertion into an opening of the fitment. The stopper is preferably cylindrical. The stopper is preferably configured to seat on a part of the fitment.

A second aspect of the disclosure provides an apparatus for use in manufacturing a bottle, the bottle comprising an inner pouch and an outer paperboard shell, the shell being made from two sheet blanks, and the apparatus comprising:

- a former having a cavity for receiving said pouch;
- a first blank holder disposed on a first side of said former for holding a first one of said two sheet blanks;
- a second blank holder disposed on a second side of said former for holding a second one of said two sheet blanks;
- a first clamp element having a part-cylindrical clamp surface facing the first side of the former, the first clamp element being moveable between a retracted position and a clamped position along a first axis, movement from the retracted position to the clamped position being in a direction towards the former;
- a second clamp element having a part-cylindrical clamp surface facing the second side of the former, the second clamp element being moveable between a retracted position and a clamped position along the first axis, movement from the retracted position to the clamped position being in a direction towards the former; and
- a pair of overlap clamp elements, each overlap clamp element being moveable between a retracted position and a clamped position along a second axis, transverse to the first axis, and movement from the retracted position to the clamped position being in a direction towards the former.

The former is preferably a split former comprising two halves, between which the cavity is defined. The two halves of the former may be separated by a gap.

The former is preferably disposed between the first and second blank holders such that a plane of each of the first and second blank holders is substantially perpendicular to a plane of the gap between the two halves of the former.

In the clamped position, the first clamp element is configured to clamp a part of a first one of the two sheet blanks between the clamp surface of the first clamp element and a part of the former. In the clamped position, the second clamp element is configured to clamp a part of a second one of the two sheet blanks between the clamp surface of the second clamp element and a part of the former.

The overlap clamp elements are preferably configured such that in the clamped position each of the overlap clamp elements is disposed between a part of the first clamp element and a part of the second clamp element. Furthermore, in the clamped position, each of the overlap clamp elements is configured to apply a force to a region of overlap between the two sheet blanks.

In preferred embodiments the apparatus further comprises a heating element. The heating element is preferably an infrared heating element. The heating element is configured to apply heat to regions of adhesive on a first surface of one of the blanks.

In some embodiments the apparatus further comprises a first infeed assembly for holding a stack of a first one of the two sheet blanks, and a second infeed assembly for holding a stack of a second one of the two sheet blanks. A first transfer assembly is preferably provided to transfer a single blank from the first infeed assembly to the first blank holder. A second transfer assembly is preferably provided to transfer a single blank from the second infeed assembly to the second blank holder. Each of the first and second transfer assemblies preferably comprises a separation element configured to separate a single blank from the stack of blanks in each of the first and second infeed assemblies respectively. The separation element may comprise a suction cup.

In embodiments in which the apparatus comprises a heating element, the second transfer assembly is preferably configured to transfer a single blank from the second infeed assembly to a position adjacent the heating element and subsequently transfer the single blank from the position adjacent the heating element to the second blank holder.

The apparatus preferably comprises a controller configured to operate the first clamp element to move between the retracted and clamped positions, to operate the second clamp element to move between the retracted and clamped positions, and to operate the overlap clamp elements to move between the retracted and clamped positions. Preferably the controller is configured to move the first clamp element into its clamped position, to subsequently move the second clamp element into its clamped position, and to subsequently move the overlap clamp elements into their clamped positions.

In embodiments including first and second transfer assemblies, the controller may additionally be configured to operate the first transfer assembly to transfer a single blank from the first infeed assembly to the first blank holder, and to operate the second transfer assembly to transfer a single blank from the second infeed assembly to the second blank holder.

In embodiments additionally including a heating element, the controller may be configured to:

- (i) operate the first transfer assembly to transfer a single blank from the first infeed assembly to the first blank holder;
- (ii) operate the second transfer assembly to transfer a single blank from the second infeed assembly to a position adjacent the heating element;
- (iii) operate the first clamp element to move the first clamp element into its clamped position;
- (iv) operate the second transfer assembly to transfer the blank from the position adjacent the heating element to the second blank holder;
- (v) operate the second clamp element to move the second clamp element into its clamped position; and
- (vi) operate the overlap clamp elements to move the overlap clamp elements into their clamped positions.

Operations (i) and (ii) may be carried out in either order, or simultaneously.

Operations (iii) and (iv) may be carried out in either order, or simultaneously.

A third aspect of the disclosure provides an apparatus for use in manufacturing a bottle, the bottle comprising an inner pouch and an outer paperboard shell, the shell being made from a sheet blank comprising a main body panel, a first neck panel and a second neck panel, and the apparatus comprising:

a former having a cavity for receiving said pouch, the former comprising a main body section, a neck section and a shoulder section extending between the main body section and the neck section;

at least two neck press elements, each neck press element including a press surface facing and aligned with at least a part of the neck section of the former, and each neck press element being moveable into a clamping position to clamp a part of one of said neck panels between the neck press element and the neck section of the former; and at least two shoulder press elements, each shoulder press element including a press surface facing and aligned with the shoulder section of the former, and each shoulder press element being moveable into a clamping position to clamp a part of one of said neck panels between the shoulder press element and the shoulder section of the former.

Preferably the press surface of the shoulder press element is a curved press surface. Preferably each of the neck press elements includes a curved press surface.

Preferably the apparatus comprises a pair of neck press elements, the neck press elements being disposed on opposite sides of the former, and a pair of shoulder press elements, the shoulder press elements being disposed on opposite sides of the former.

Preferably the main body section of the former is substantially cylindrical and the neck section of the former is substantially cylindrical, and a diameter of the main body section of the former is larger than a diameter of the neck section of the former.

The apparatus preferably further comprises a heating assembly. The heating assembly is configured to heat a region of the first neck panels to activate adhesive on a surface of the first neck panels. The heating assembly preferably comprises an annular heating element. The heating element is preferably heated by a supply of hot fluid, preferably hot air. The heating element is preferably moveable between a disengaged position and an engaged position. Movement of the heating element from the disengaged position to the engaged position comprises movement of the heating element in a direction towards the former.

In preferred embodiments the inner pouch is secured to a fitment including a pair of lugs. Each of the first neck panels includes an aperture sized to receive one of the pair of lugs. During manufacture of the bottle, the first neck panels are formed such that the lugs protrude through the apertures so as to engage the fitment with the shell of the bottle.

In preferred embodiments, to ensure the correct alignment of the first neck panels with the lugs, the apparatus includes a pair of alignment fingers moveable between a retracted position, in which an end of each alignment finger is at a distance from the former, and an inserted position, in which the end of each alignment finger extends through the aperture in the respective first neck panel.

Each alignment finger preferably comprises an elongate member. A longitudinal axis of the longitudinal member is preferably aligned with a part of the neck section of the former.

Each of the neck press elements preferably comprises a pair of arms extending substantially parallel to each other. A gap is preferably defined between the arms. Each of the neck press elements may include two curved press surfaces, the curved press surfaces being provided at a distal end of each arm.

A distance between the arms, i.e. a width of the gap, is preferably slightly larger than a width of the aperture in the first neck panel. In this way, when the neck press elements are in the clamped positions, the arms contact regions of the first neck panel adjacent to and either side of the aperture.

In embodiments including alignment fingers, each alignment finger is preferably disposed in the gap between the arms of a respective one of the neck press elements.

In preferred embodiments the apparatus further comprises a pair of push rods. Each of the push rods is aligned with a part of the shoulder section of the former. Each of the push rods is moveable between a retracted position and an extended position. In the extended position each push rod applies a force to a respective first neck panel to deflect at least a part of the first neck panel in a direction towards the neck section of the former.

Each push rod may be elongate. Each push rod may include an end surface transverse to a longitudinal axis of the push rod. An angle between a plane of the end surface and the longitudinal axis may be between 30° and 80°.

Each push rod may extend through an aperture in a respective one of the shoulder press elements.

The curved press surface of each of the shoulder press elements preferably comprises an upper portion having a part-cylindrical shape with a first radius of curvature, and a lower portion having a part-cylindrical shape with a second radius of curvature, the second radius of curvature being larger than the first radius of curvature.

The curved press surface of each of the shoulder press elements may further comprise a middle portion disposed between the upper portion and the lower portion. The middle portion of the press surface preferably has a double curvature. The two planes of principle curvature are preferably perpendicular to each other. The lower, middle and upper portions preferably form a continuous press surface.

The apparatus preferably comprises a controller configured to operate the pair of neck press elements to move pair of neck press elements between the disengaged and clamping positions and to operate the pair of shoulder press elements to move pair of shoulder press elements between the disengaged and clamping positions.

In embodiments including a heating element, the controller is preferably configured to operate the heating element to move the heating element between the disengaged position and the engaged position.

In embodiments including alignment fingers, the controller is preferably configured to operate the alignment fingers to move the alignment fingers between their retracted positions and their inserted positions.

In embodiments including push rods, the controller is preferably configured to operate the push rods to move the push rods between their retracted positions and their extended positions.

In preferred embodiments the controller may be configured to:

(i) operate the heating element to move the heating element into the engaged position;

(ii) after a predetermined period of time, operate the heating element to move the heating element into the disengaged position;

(iii) operate the alignment fingers to move the alignment fingers into their inserted positions;

(iv) operate the push rods to move the push rods into their extended positions;

(v) operate the pair of neck press elements to move pair of neck press elements into the clamping positions; and (vi) operate the pair of shoulder press elements to move pair of shoulder press elements into the clamping positions.

Operations (v) and (vi) may be carried out in either order, or simultaneously.

A fourth aspect of the disclosure provides an apparatus for use in manufacturing a bottle, the bottle comprising an inner pouch and an outer paperboard shell, the shell being made from a sheet blank comprising a main body panel, a first neck panel and a second neck panel, and the apparatus comprising:

a former having a cavity for receiving said pouch, the former comprising a main body section, a neck section and a shoulder section extending between the main body section and the neck section; and a plurality of clamp units, each clamp unit comprising a curved press surface and a straight press surface, each clamp unit being moveable into a clamping position to clamp a first part of one of said second neck panels between the curved press surface and the shoulder section of the former and to clamp a second part of one of said second neck panels between the straight press surface and the neck section of the former.

Preferably the clamp units are arranged in a substantially circular array around the former.

The apparatus preferably comprises between 8 and 16 clamp units. More preferably the apparatus comprises 14 clamp units. The clamp units are preferably spaced apart around the former.

Each clamp unit preferably comprises a shoulder press element including the curved press surface and a neck press element including the straight press surface. The neck press element may additionally include a second curved press surface.

The neck press element is preferably pivotally connected to the shoulder press element. The shoulder press element is preferably pivotally connected to a support arm.

Each clamp unit preferably comprises an actuator. The actuator is preferably arranged to move the neck press element with respect to the shoulder press element about the pivotal connection. The actuator may additionally be arranged to move the shoulder press element with respect to the support arm about the pivotal connection. The actuator is preferably connected between the support arm and the neck press element. The actuator may be pivotally connected to the support arm. The actuator may be pivotally connected to the neck press element. The actuator is preferably a linear actuator.

The arrangement of the shoulder press element and the neck press element is preferably such that movement of the clamp unit into the clamping position causes the curved press surface of the shoulder press element to apply a force to the second neck panel and, subsequently, the straight press surface of the neck press element to apply a force to the second neck panel.

The apparatus preferably further comprises at least two alignment plates, a first set of the neck press elements or a first set of the clamp units being connected to a first one of the alignment plates and a second set of the neck press elements or a second set of the clamp units being connected to a second one of the alignment plates, the alignment plates being moveable in a direction towards the former. Each of the alignment plates preferably includes a radially inner curved surface, a radius of curvature of the radially inner curved surface being substantially the same as a radius of curvature of the neck section of the former.

A fifth aspect of the disclosure provides an apparatus for use in manufacturing a container, the container being made of paperboard and being formed from at least two elements adhered together, and the apparatus comprising:

a first inlet connected to a supply of dry steam;

a second inlet connected to a supply of hot air;

a mixing chamber, the first inlet and the second inlet being fluidly connected to the mixing chamber such that a flow of dry steam from the first inlet mixes with a flow of hot air from the second inlet; and a delivery nozzle fluidly connected to the mixing chamber and configured to direct said mixed flow of hot air and dry steam to a part of at least one of said elements.

In preferred embodiments the first inlet is fluidly connected to the mixing chamber downstream of the second inlet.

The first inlet is preferably connected to a steam generator. A separator device for removing condensate from steam is preferably disposed between the steam generator and the first inlet. The separator device preferably comprises a cyclonic separator.

The delivery nozzle may include an end surface or edge surrounding an opening. The apparatus may further include a sealing plate. In these embodiments the delivery nozzle is preferably movable between a first position in which the delivery nozzle is not in contact with the sealing plate and a second position in which the end surface or edge of the delivery nozzle is in contact with the sealing plate.

The apparatus preferably further comprises a heating assembly arranged to apply heat to a part of the delivery nozzle. The heating assembly is preferably disposed proximate or adjacent the delivery nozzle. The heating assembly may comprise a heating band or heater jacket surrounding a part of the delivery nozzle.

The delivery nozzle preferably includes an outlet for the mixed flow of hot air and dry steam.

In preferred embodiments the apparatus includes a protective sheath arranged to prevent or block interaction between the mixed flow of hot air and dry steam and a second part of at least one of the elements. The protective sheath may connected to the delivery nozzle. The protective sheath may be disposed in an interior volume of the delivery nozzle. The protective sheath may be supported in the interior volume of the delivery nozzle so as to define an annular flow path around the protective sheath. The protective sheath preferably comprises a tubular side wall.

The apparatus preferably comprises a diverter disposed downstream of the first inlet. The diverter is fluidly connected to an exhaust conduit. The diverter preferably has a delivery configuration and an exhaust configuration. In the delivery configuration the flow of dry steam from the first inlet mixes with the flow of hot air in the mixing chamber and flows into the delivery nozzle. In the exhaust configuration the flow of dry steam from the first inlet is directed to flow through the exhaust conduit. In this way, a continuous flow of dry steam may enter the apparatus through the first inlet and the diverter may be set in the delivery configuration when dry steam is to be directed to the part of at least one of said elements and may be set to the exhaust configuration to divert the flow of dry steam away from the delivery nozzle. The diverter may comprise a bypass valve.

A sixth aspect of the disclosure provides a method of reactivating adhesive comprising:

mixing a stream of dry steam with a stream of hot air; and directing said mixed stream to flow over a surface including a layer of adhesive.

A seventh aspect of the disclosure provides a method of inserting a base element in a tubular side wall element of a container, the method comprising:

forming a limiting protrusion on an inner surface of the side wall element at a distance from an end of the side wall element; and inserting the base element into the tubular side wall element until an edge region of the base element contacts the limiting protrusion.

In preferred embodiments the step of forming a limiting protrusion on an inner surface of the side wall element comprises applying a curable polymeric composition to a part of the inner surface. Preferably the curable polymeric composition is applied along a line extending circumferentially around the inner surface. The curable polymeric composition may be applied in a continuous line. Alternatively, the curable polymeric composition may be applied as a plurality of discrete dots or beads. The curable polymeric composition may be an adhesive.

In other embodiments the step of forming a limiting protrusion on an inner surface of the side wall element may comprise embossing or indenting a region of the side wall element. In other embodiments the step of forming a limiting protrusion on an inner surface of the side wall element may comprise folding a portion of the side wall element.

An eighth aspect of the disclosure provides an apparatus for use in manufacturing a container having a base element and a tubular side wall element, the apparatus comprising a nozzle configured to dispense a curable polymeric composition along a line extending circumferentially around an inner surface of said tubular side wall element.

The nozzle may be configured to dispense the curable polymeric composition so as to apply the curable polymeric composition in a continuous line. Alternatively, the nozzle may be configured to dispense the curable polymeric composition so as to apply the curable polymeric composition as a plurality of discrete dots or beads. The curable polymeric composition may be an adhesive.

The apparatus may further comprise an assembly for rotating the nozzle. Alternatively, the apparatus may further comprise an assembly for rotating the tubular side wall element.

A ninth aspect of the disclosure provides a blank made of sheet paperboard for forming a container, the blank comprising a main body panel and a neck panel extending from the main body panel, wherein the moisture content of the neck panel is greater than the moisture content of the main body panel.

A tenth aspect of the disclosure provides a method of treating a blank made of sheet paperboard for forming a container, the method comprising:

applying moisture to a main body panel of the blank such that the moisture content of the main body panel is at a first level; and applying moisture to a neck panel of the blank such that the moisture content of the main body panel is at a second level, the second level being higher than then first level.

An eleventh aspect of the disclosure provides an apparatus for treating a blank made of sheet paperboard for forming a container, the apparatus comprising at least one nozzle configured to apply moisture to a main body panel of the blank such that the moisture content of the main body panel is raised to a first level and to apply moisture to a neck panel of the blank such that the moisture content of the neck panel is raised to a second level, the second level being higher than then first level.

Preferred and/or optional features of each aspect and embodiment described above may also be used, alone or in appropriate combination, in the other aspects and embodiments also.

BRIEF DESCRIPTION OF THE DRAWINGS

The invention will now be further described by way of example only and with reference to the accompanying drawings, in which.

DESCRIPTION OF THE PREFERRED EMBODIMENTS

Figure 1:
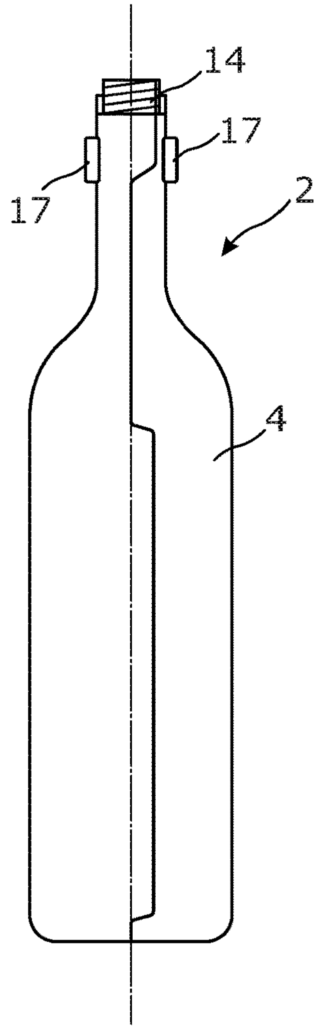
FIG. 1 is a side view of a bottle comprising a paperboard outer shell and an inner pouch.
Figure 2:
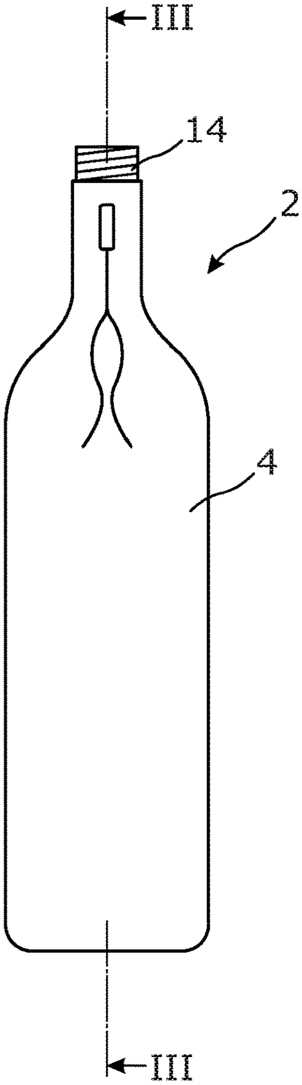
FIG. 2 is a further side view of the bottle of FIG. 1, perpendicular to the view in FIG. 1.
Figure 3:
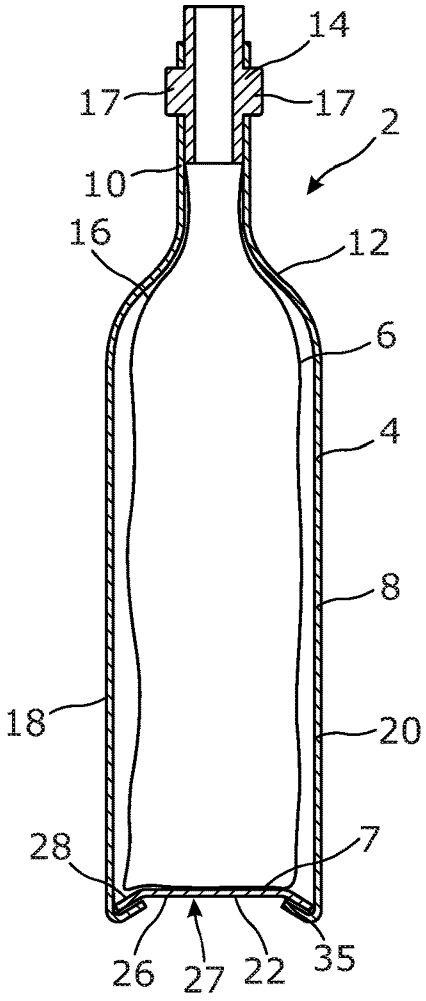
FIG. 3 is a vertical cross-sectional view along the line Ill-Ill of FIG. 2.

FIGS. 1 to 3 illustrates a container in the form of a bottle 2 comprising a paperboard or cardboard outer shell 4 and an inner pouch 6.

The container or bottle 2 comprises an outer shell 4 made of a paperboard or paperboard material. The outer shell 4 is generally cylindrical and has an elongate, cylindrical main body portion 8 having a first, larger diameter, and an elongate, cylindrical neck portion 10 having a second, smaller diameter. The neck portion 10 extends from a first end of the main body portion 8, and a tapered or curved shoulder portion 12 of the shell 4 of the bottle 2 extends between the neck portion 10 and the main body portion 8.

An inner pouch 6 is supported within the shell 4 by means of a fitment 14. The fitment 14 is secured to the pouch 6 and is engaged with the neck portion 10 of the shell 4 such that the pouch 6 is partially suspended from or supported by the fitment 14 and extends downwards into the main body portion 8 of the shell 4. A lower end 7 of the pouch 6 is supported or seated on a base of the shell 4. The pouch 6 and fitment 14 together form a pouch assembly 16. The pouch 6 and fitment 14 are, preferably, each made of a plastics material. The pouch 6 may be a metallised pouch.

Figure 6:
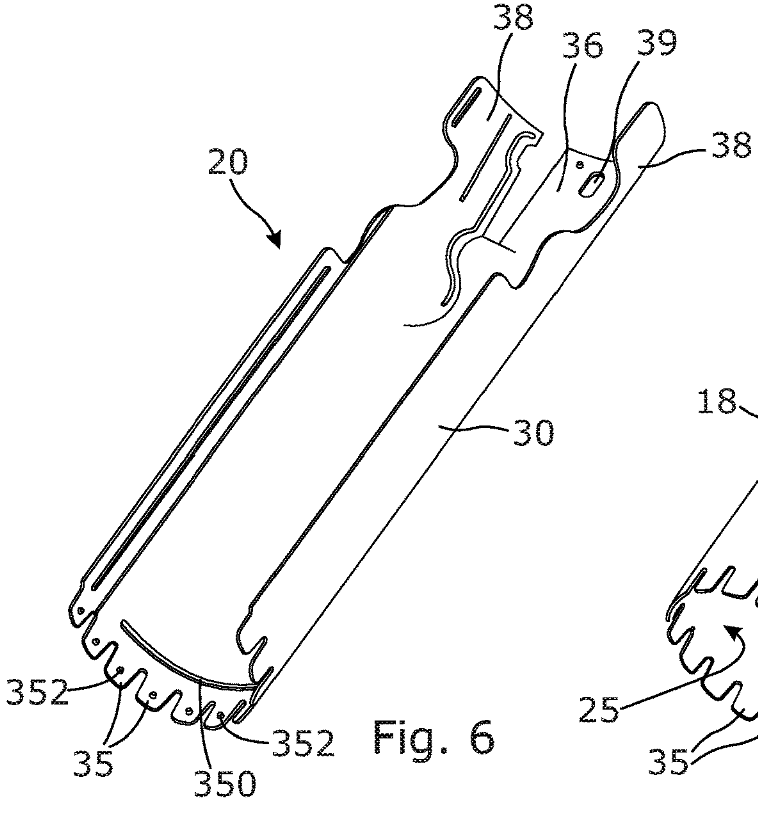
FIG. 6 shows a partially formed second side wall element of the shell, formed from the blank of FIG. 5.
Figure 7:
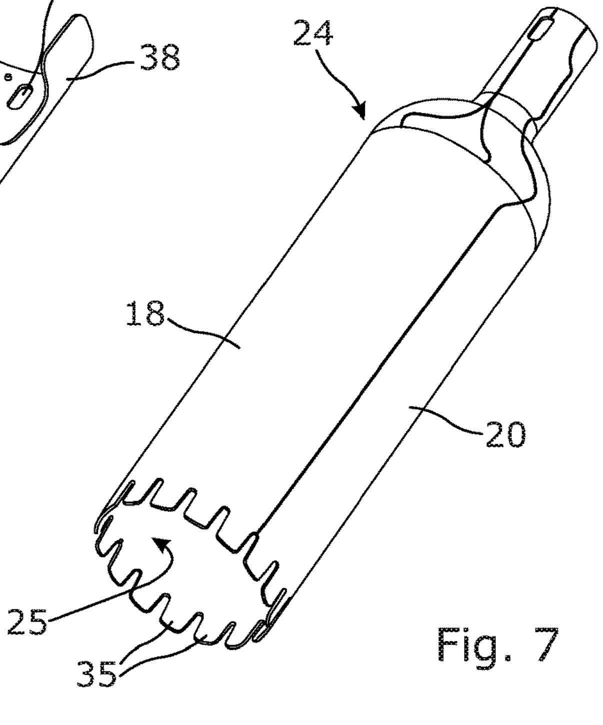
FIG. 7 illustrates a complete side wall of the shell including a main body portion and a neck portion.

The shell 4 is formed of three separate elements that are bonded together. The shell 4 comprises a first side wall element 18, a second side wall element 20 and a third base element 22. Each of the first and second side wall elements 18, 20 includes a part of the neck portion 10 of the shell 4 and a part of the main body portion 8 of the shell 4, as illustrated in FIG. 6. When the first and second side wall elements 18, 20 are joined together, a part of the first side wall element 18 overlaps a part of the second side wall element 20 to form a complete and continuous side wall 24 of the shell 4, as illustrated in FIG. 7.

The base element 22 is formed from a circular disc of paperboard or paperboard and includes a planar central region 26 and a peripheral skirt portion 28 that extends fully around the circumference of the central region 26. The skirt portion 28 comprises an edge region of the disc that has been pressed so as to extend at an angle to the planar central region 26. In this way, a first surface 27 of the base element 22 has a substantially concave shape.

The first, second and third elements 18, 20, 22 of the shell 4 are all made from flat sheets of 100% paperboard that have been pressed to form the required three-dimensional shapes.

Figure 4:
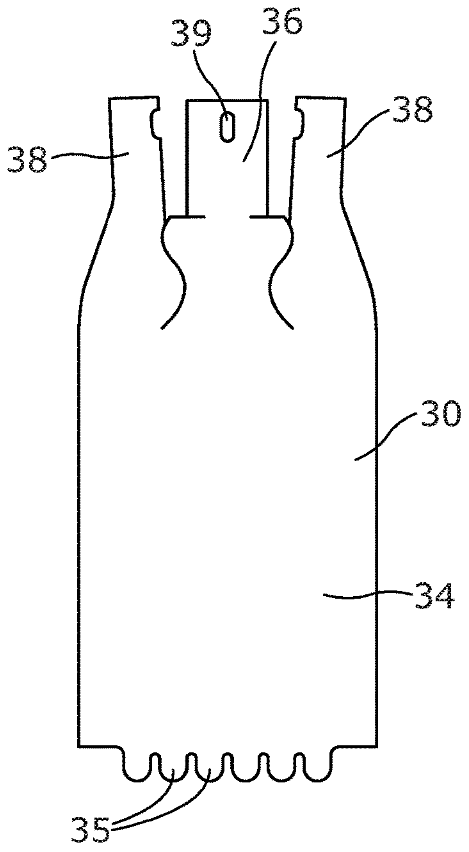
FIGS. 4 and 5 illustrate embodiments of blanks used to form first and second side wall elements of the outer shell of the bottle of FIG. 1.
Figure 5:
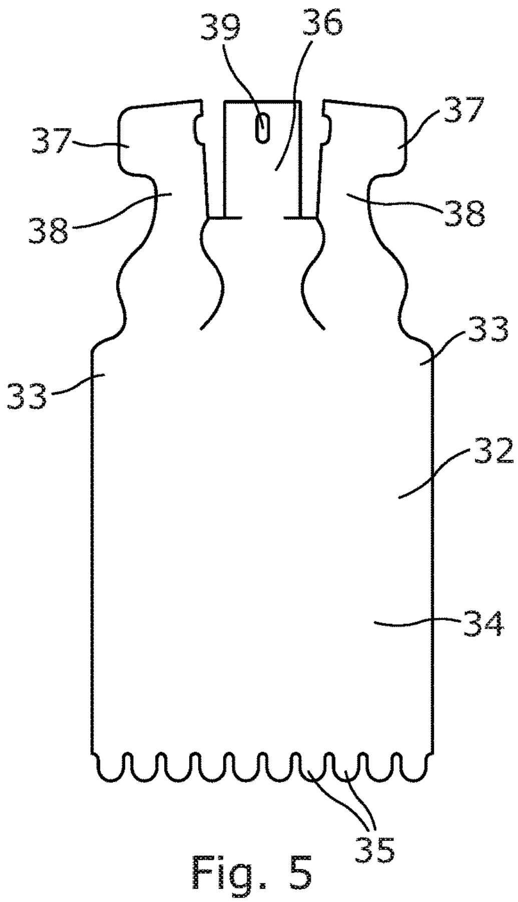

Blanks 30, 32 used to form the first and second side wall elements 18, 20 respectively are shown in FIGS. 4 and 5. A first side wall blank 30 is used to form the first side wall element 18, and a second side wall blank 32 is used to form the second side wall element 20. Each of the first and second side wall blanks 30, 32 comprises a main body panel or portion 34, a central neck panel or portion 36, and outer neck panels or portions 38. In each of the side wall blanks 30, 32, the central neck panel 36 and outer neck panels 38 extend from a first end of the main body panel 34 and a plurality of base tabs 35 extend from an opposite second end of the main body panel 34.

The second side wall blank 32 additionally comprises side wall tabs 33 and neck tabs 37. A side wall tab 33 extends from each side edge of the main body panel 34. A neck tab 37 extends from an outer side edge of each of the outer neck panels 38.

Figure 8:
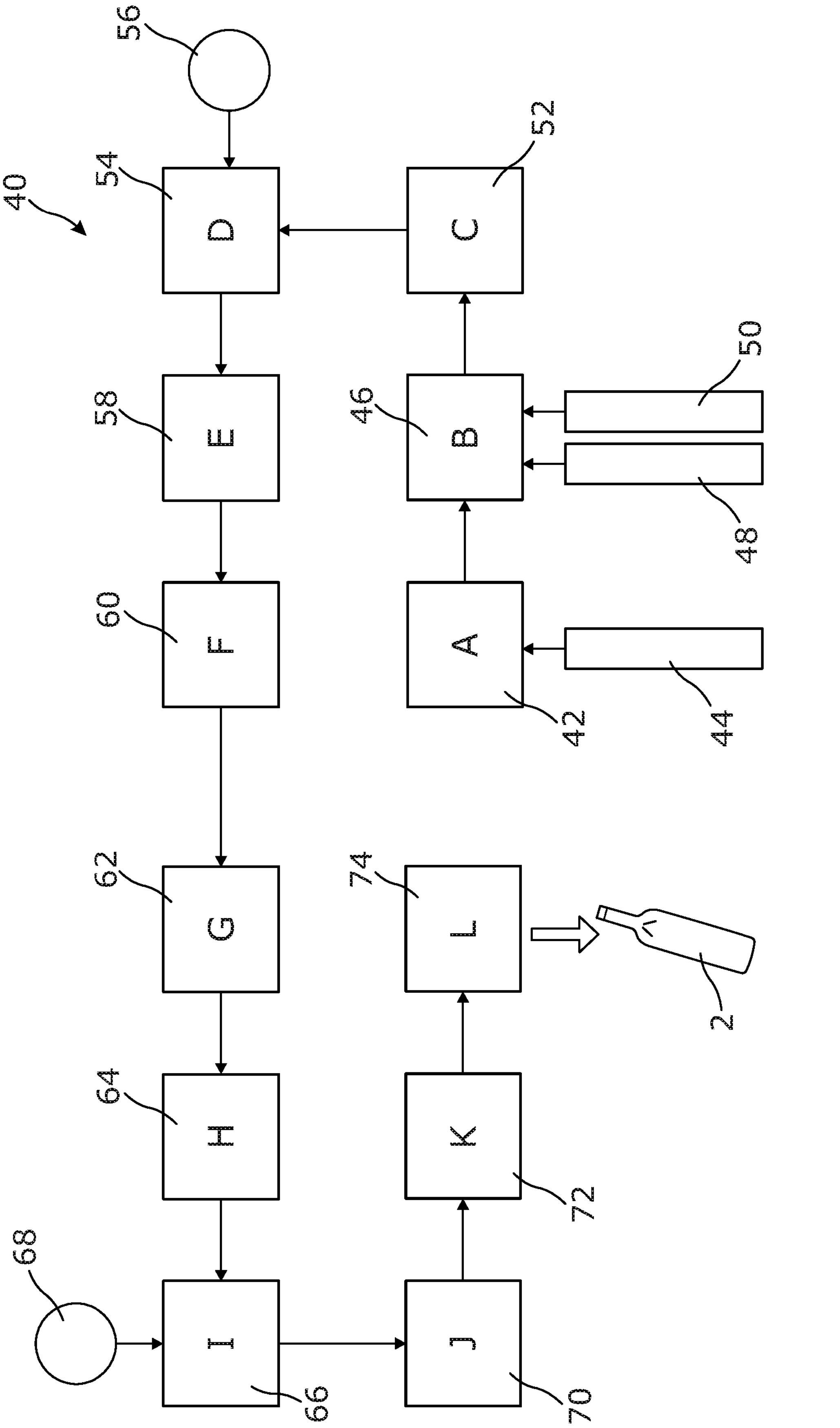
FIG. 8 is a schematic diagram of a machine for manufacturing a bottle according to a preferred embodiment of the present invention.

FIG. 8 is a schematic diagram of a machine 40 for manufacturing a container according to a preferred embodiment of the present invention. The machine 40 is preferably configured to manufacture bottles, in particular wine bottles. The following description therefore refers to the machine 40 for use in the manufacture of bottles, but it will be appreciated that aspects of the machine may be adapted to manufacture any suitable container.

At a first station 42 (Station A) of the machine 40 a pouch assembly 16 is inserted between two halves of a split former 94. The machine 40 preferably includes an infeed assembly 44 arranged to store a plurality of pouch assemblies 16 and supply them to the first station 42. At a second station 46 (Station B) of the machine 40 two side wall blanks 30, 32 are formed around the former 94 to create the main body portion 8 of the shell 4. As described above, each of the side wall blanks 30, 32 used to form the complete side wall 24 of the shell 4 are different. Accordingly, the machine 40 preferably comprises a first blank infeed assembly 48 for supplying a first one of the side wall blanks 30 to the second station 46 and a second blank infeed assembly 50 for supplying a second one of the side wall blanks 32 to the second station 46. At Station B the first side wall blank 30 is wrapped around a first part of the former 94 and the second side wall blank 32 is then wrapped around a second part of the former 94 so that edge regions of the second side wall blank 32 overlap edge regions of the first side wall blank 30. The second side wall blank 32 is secured to the first side wall blank 30 by adhesive.

At a third station 52 (Station C) of the machine 40 the central neck panel 36 of each of the two side wall blanks 30, 32 is formed around the former 94. At a fourth station 54 (Station D) of the machine 40 outer neck panels 38 of each of the two side wall blanks 30, 32 are formed around the former 94 to create the neck portion 10 of the shell 4. To adhere the outer neck panels 38 to the central neck panels 36 and to each other it is desirable at this stage to activate adhesive applied to the neck panels 38 of the blanks 30, 32. Accordingly, in preferred embodiments the machine 40 comprises means 56 to activate or reactivate adhesive disposed on the neck panels 38 of the blanks 30, 32. It will be appreciated that in forming the neck panels 36, 38 around the former 94, both the neck region 10 and the shoulder region 12 of the shell 4 are formed.

At a fifth station 58 (Station E) of the machine 40 the neck portion 10 and shoulder portion 12 of the shell 4 are hot pressed. At a sixth station 60 (Station F) of the machine 40 the neck portion 10 and shoulder portion 12 of the shell 4 are cold pressed and a stopper 88 is removed from the fitment 14 of the pouch assembly 16.

At a seventh station 62 (Station G) of the machine 40 the side wall 24 of the shell 4 is removed from the former 94 and the pouch 6 is inflated ready for insertion of the base element 22.

At an eighth station 64 (Station H) of the machine 40 a limit feature 350 is applied to an inner surface 25 of the side wall 24 proximate the base tabs 35.

At a ninth station 66 (Station I) of the machine 40 a base element 22 is inserted into the end of the side wall 24 and brought into contact with the limit feature 350. The machine 40 preferably includes an infeed assembly 68 arranged to store a plurality of base elements 22 and supply them to the ninth station 66.

At a tenth station 70 (Station J) of the machine 40 adhesive is applied to the base tabs 35. At an eleventh station 72 (Station K) of the machine 40 the base tabs 35 are folded and pressed into contact with the base element 22. At a twelfth station 74 (Station L) the adhesive on the base tabs 35 is activated and then a base region of the shell 4 is cold pressed to adhere the base tabs 35 to the base element 22.

Optionally a length of tape or a label may be wrapped around the neck portion 10 of the bottle 2 before the bottle 2 is ejected from the machine 40. A final drying process may then be applied to the bottle 2 to remove any excess moisture from the paperboard of the shell 4.

The operation of a preferred embodiment of the machine 40 and preferred configurations of each of the stations (Stations A-L) will now be described.

In the following description references made to upper, lower, top and bottom are in relation to the orientation of the bottle 2, where a base of the bottle 2 is lowermost and a neck of the bottle 2 is uppermost, i.e. the bottle 2 is standing on its base. A vertical axis is one that extends between a top of the bottle 2 at the end of the neck of the bottle 2 and a base of the bottle 2. It will be appreciated that one or more stations of the machine 40 may be oriented such that the bottle 2 is not standing or oriented vertically, and references to upper, lower, top and bottom shall be interpreted accordingly.

Station A

Figure 9:
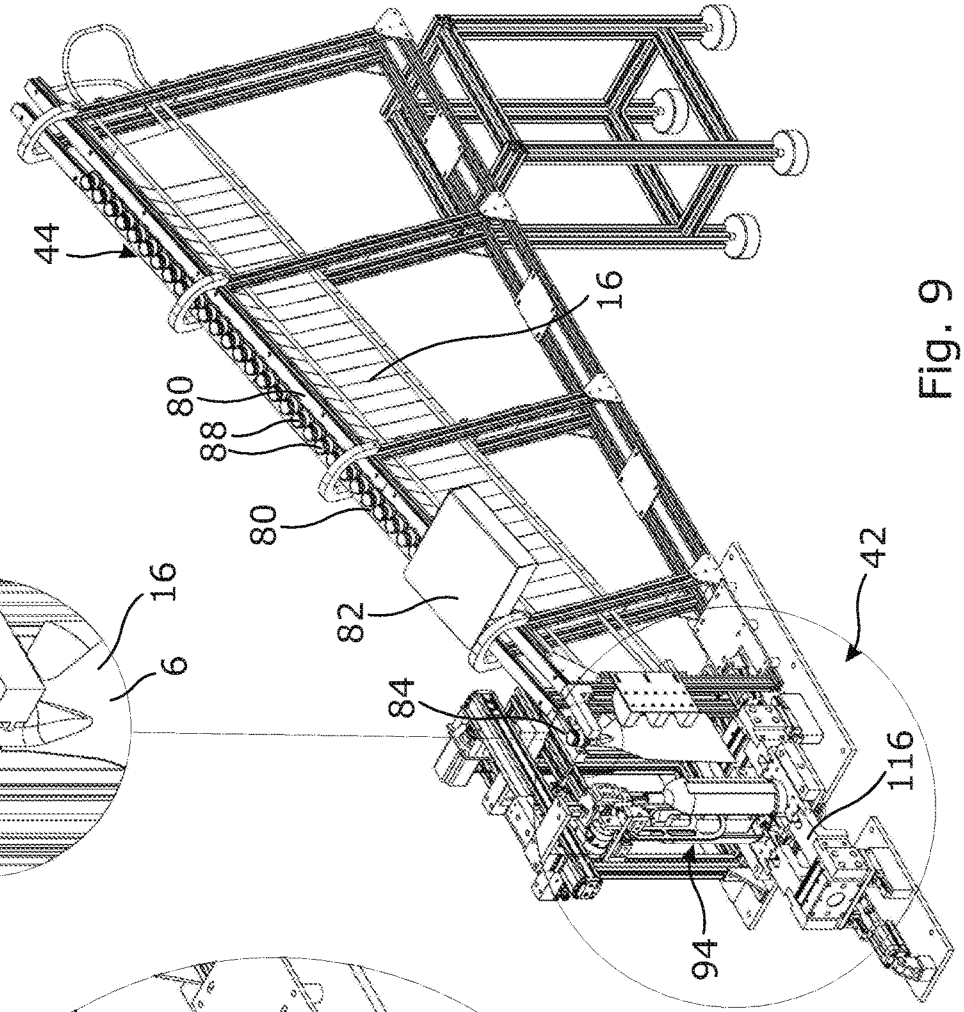
FIG. 9 is a perspective view of a first station (Station A) of a machine for manufacturing a bottle according to a preferred embodiment of the present invention.
Figure 11:
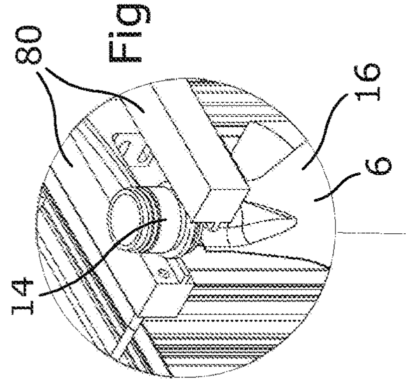
FIG. 11 is an enlarged perspective view of a pouch rail of an infeed assembly of the first station of FIG. 9.
Figure 10:
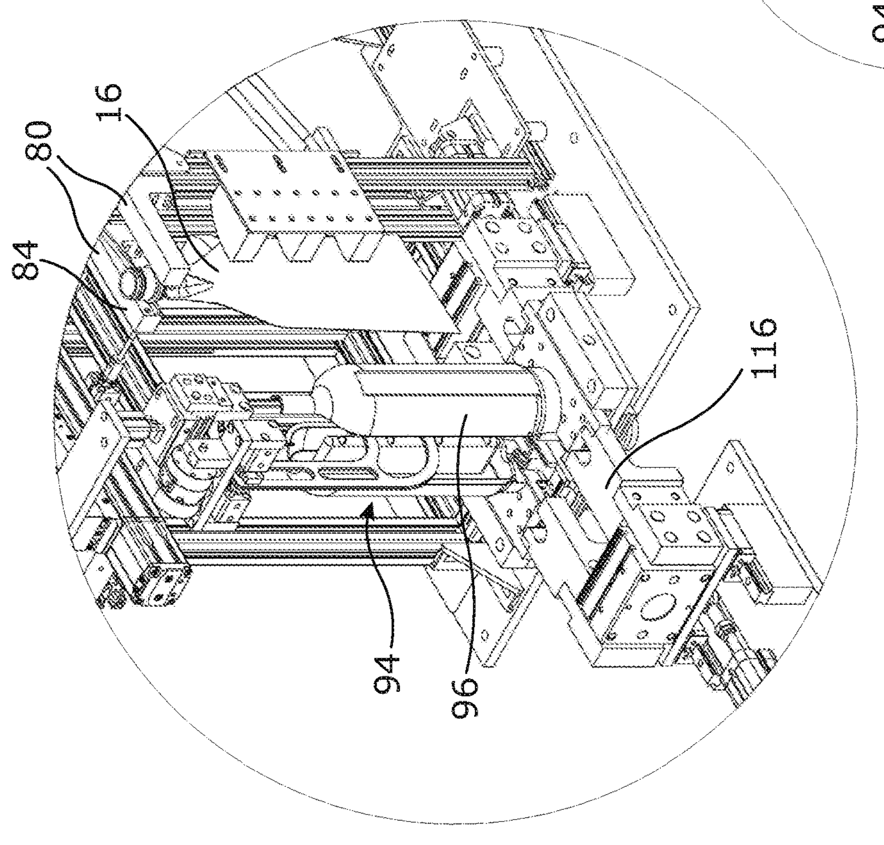
FIG. 10 is an enlarged perspective view of a pouch insertion mechanism of the first station of FIG. 9.

The first station 42 is shown in FIGS. 9 to 11, together with its associated infeed assembly 44. The infeed assembly 44 comprises rails 80 arranged to support a plurality of pouch assemblies 16. Each pouch assembly 16 comprises a pouch 6 attached to a fitment 14, as shown most clearly in FIG. 13. Typically the pouch 6 will be heat welded to a lower portion 13 of the fitment 14. An upper portion 15 of the fitment 14 preferably comprises a screw thread for engagement with a top or cap (not shown) of the bottle 2. It will be appreciated that in preferred embodiments the pouch 6 is made of a flexible polymeric material, and the fitment 14 is made of a more rigid polymeric material. As illustrated in FIG. 11, in this embodiment a flange of the upper portion 15 of the fitment 14 is seated on and slides along guide protrusions of the rails 80.

An infeed mechanism 82 is configured to deliver a single pouch assembly to an end region 84 of the rails 80 ready for delivery to and insertion into a former 94.

A forming insert or stopper 88 is inserted into an open end of the upper portion 15 of the fitment 14. The stopper 88 (shown most clearly in FIG. 12) is generally cylindrical and comprises a first portion 90 having a first diameter and an axially aligned second portion 92 having a second diameter, the second diameter being smaller than the first diameter. The stopper 88 is engaged with the fitment 14 such that a part of the first portion 90 of the stopper 88 is seated in the upper portion 15 of the fitment 14. An end of the first portion 90 of the stopper 88 protrudes from the end of the fitment 14. The second portion 92 of the stopper 88 extends through the lower portion 13 of the fitment 14 and into the pouch 6.

The stopper 88 is configured to prevent or minimise distortion of the fitment 14 during manufacturing of the bottle 2, as will be described further below. Accordingly, external dimensions of the stopper 88 are preferably substantially the same as or similar to internal dimensions of the fitment 14. The stopper 88 is preferably made of a suitable metal material.

At the first station 42 of the machine 40, the pouch assembly 16, together with the stopper 88, is inserted into a former 94. The former 94 has two halves 96, as shown most clearly in FIGS. 12 and 13. Each half 96 of the former 94 comprises a main body section 98, a neck section 100 and a shoulder section 102 disposed between the main body section 98 and the neck section 100. When the two halves 96 of the former 94 are in a closed configuration the main body sections 98 are adjacent each other and an outer surface 104 of the pair of main body sections 98 defines a surface around which the main body portion 8 of the outer shell 4 is formed. Similarly, when the two halves 96 of the former 94 are in a closed configuration the neck sections 100 are adjacent each other and an outer surface 106 of the pair of neck sections 100 defines a surface around which the neck portion 10 of the outer shell 4 is formed. When the two halves 96 of the former 94 are in a closed configuration the shoulder sections 102 are adjacent each other and an outer surface 108 of the pair of shoulder sections 102 defines a surface around which the shoulder portion 12 of the outer shell 4 is formed. In this way the former 94 is effectively split vertically to allow insertion of the pouch assembly 16 between the two halves 96 of the former 94.

Figure 13:
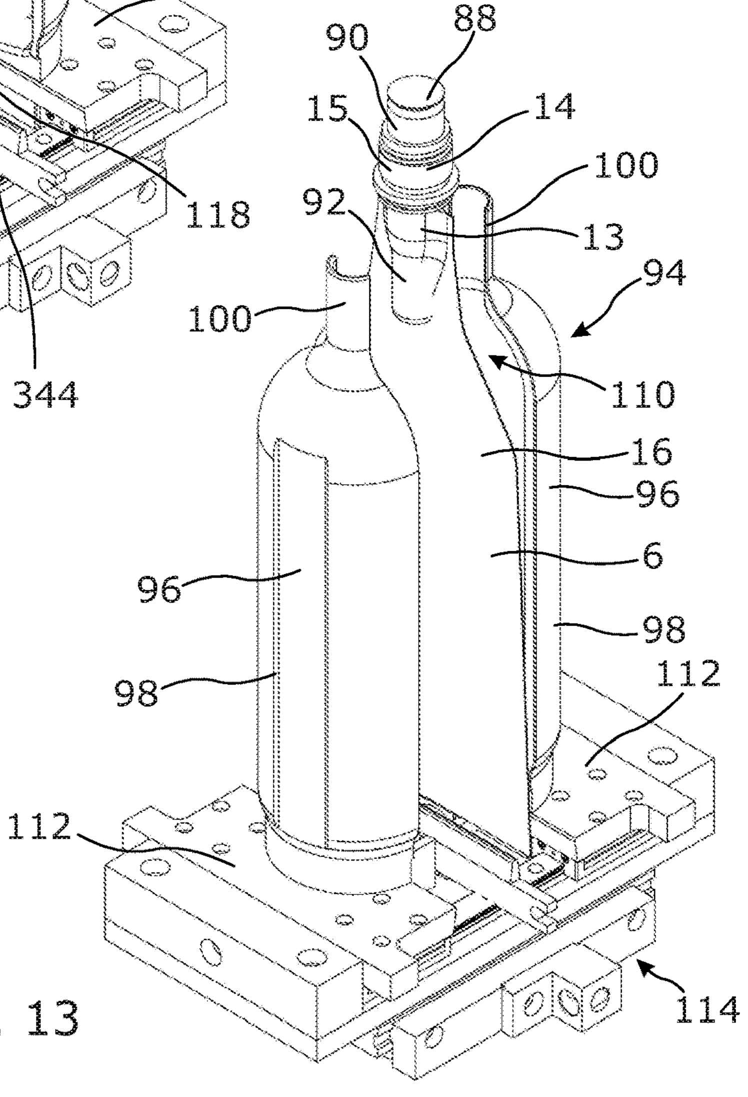
FIG. 13 is a perspective view of the split former of FIG. 12, showing a pouch assembly inserted between body portions of the former, with the body portions in an open configuration.
Figure 14:
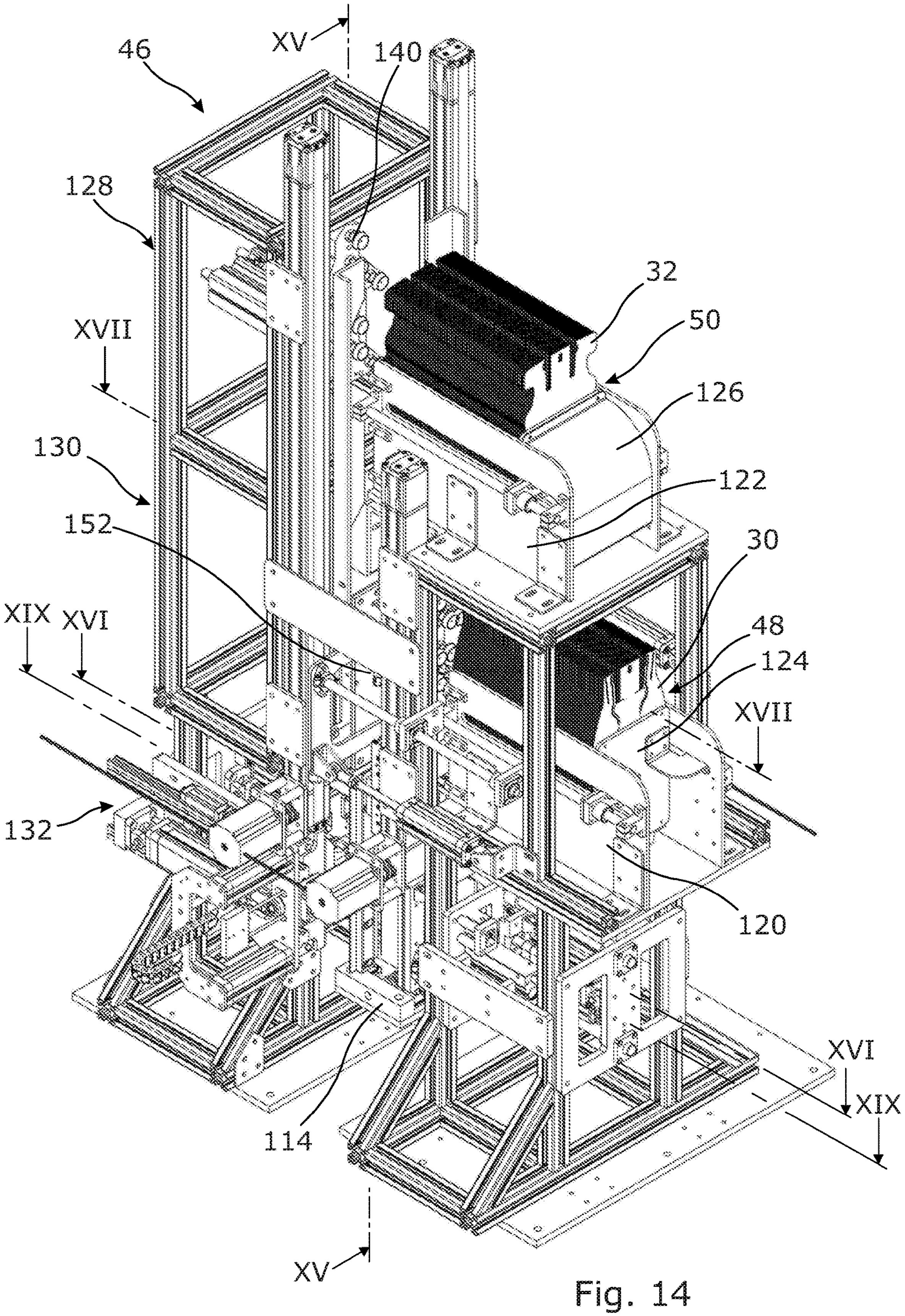
FIG. 14 is a perspective view of a second station (Station B) of a machine for manufacturing a bottle according to a preferred embodiment of the present invention.

An interior of the former 94 defines a cavity 110 for receiving at least a part of the pouch assembly 16. In particular, as illustrated in FIG. 13, when the two halves 96 of the former 94 are in an open configuration a pouch assembly 16 is insertable between the two halves 96. The pouch assembly 16 is inserted such that the lower portion 13 of the fitment 14 is received in a part of the cavity 110 between the two neck sections 100 and the pouch 6 is received in a part of the cavity 110 between the two main body sections 98 of the former 94. The upper portion 15 of the fitment 14 preferably protrudes from the former 94.

It will be appreciated that the two halves 96 of the former 94 are moveable between the open and closed configurations. Accordingly, in this embodiment, the first station 42 comprises a mechanism for moving the two halves 96 of the former 94 away from each other into the open configuration and moving the two halves 96 towards each other into the closed configuration. In the closed configuration the two halves 96 of the former 94 may not be in contact with each other and there may still be a gap between the two halves 96. The gap in the closed configuration will, however, be smaller than a gap between the two halves 96 in the open configuration.

In this embodiment each of the two halves 96 of the former 94 is mounted on a respective sliding plate 112 of a carriage assembly 114. The sliding plates 112 are arranged such that they are slidable in first directions towards each other and in second directions away from each other. The sliding plates 112 may be biased to move in the first directions such that the two halves 96 of the former 94 are biased into the closed configuration. In this embodiment the first station 42 comprises an opening mechanism 116 that is engaged with the carriage assembly 114 and is arranged to move the sliding plates 112 in the second directions against the biasing force. The pouch assembly 16 in then inserted between the two halves 96 of the former 94 in the open configuration as described above.

After insertion of the pouch assembly 16, the opening mechanism 116 is disengaged from the carriage assembly 114. The biasing force then automatically moves the sliding plates 112 in the first directions such that the two halves 96 of the former 94 move into the closed configuration around the pouch assembly 16. In the closed configuration the neck sections 100 of the two halves 96 of the former 94 grip the lower portion 13 of the fitment 14. The neck sections 100 of the two halves 96 of the former 94 may additionally or alternatively grip at least a part of the second portion 92 of the stopper 88. Side edges of the pouch 6 may protrude through the gap between the two halves 96 of the former 94. This protrusion may assist in maintaining alignment of the pouch assembly with respect to the former 94. Furthermore, in embodiments in which the fitment of the pouch assembly includes lugs 17, the lugs 17 may also protrude through the gap.

To apply a biasing force to the sliding plates 112 the carriage assembly 114 preferably includes a biasing element 118, which in this embodiment is a spring 118.

The former 94 remains mounted on the carriage assembly 114 and the carriage assembly 114 transports or transfers the former 94 and pouch assembly 16 to the second station 46 of the machine 40. It will be appreciated that the biasing force is continuously applied to the two halves 96 of the former 94 so that the two halves 96 remain in the closed configuration and the pouch assembly 16 remains engaged with the former 94 during forming of the shell 4 of the bottle 2.

Station B

The second station 46 is shown in FIGS. 14 to 19, together with its associated infeed assemblies 48, 50.

The first infeed assembly 48 is configured to hold a plurality of first side wall blanks 30 used to form the first side wall element 18 of each shell 4 and to supply these to the second station 46. The second infeed assembly 50 is configured to hold a plurality of second side wall blanks 32 used to form the second side wall element 20 of each shell 4 and to supply these to the second station 46.

Each of the first and second infeed assemblies 48, 50 comprises a holder 120, 122 and a biased push plate 124, 126. In use, a stack of blanks 30, 32 is loaded into each of the respective holders 120, 122 such that each of the blanks 30, 32 is vertically oriented. The associated push plate 124, 126 applies a force to the stack to maintain the vertical orientation of the blanks 30, 32 and to urge the stack towards a front edge of each of the holders 120, 122.

Before the blanks 30, 32 are loaded into the holders 120, 122 moisture is applied to each of the blanks 30, 32. Moisture is applied to the blanks 30, 32 so that it impregnates the fibres of the paperboard. Preferably the moisture is applied such that the neck panels 36, 38 of the blanks 30, 32 have a higher moisture content than the main body panel 34 of the blanks 30, 32. Increasing the moisture content of the paperboard makes the paperboard easier to form. As will be described below, shaping of the neck panels 30, 32 to form the neck portion 10 and shoulder portion 12 of the shell 4 requires a greater degree of forming (smaller radii of curvature and regions with double curvature) than shaping of the main body panel 34 to form the main body portion 8 of the shell 4.

Each of the blanks 30, 32 includes a two-dimensional pattern of adhesive applied to a first surface of the blank 30, 32. The first surface of each of the blanks 30, 32 will become a part of an inner surface of the shell 4 of the bottle 2 once formed. It will be appreciated that the adhesive applied to the blanks 30, 32 is preferably not activated, i.e. not tacky, while the blanks 30, 32 are stored in the first and second infeed assemblies 48, 50 so that the blanks 30, 32 do not adhere to each other in the stacks.

In this embodiment, the second station 46 comprises an upper infeed section 128, a lower infeed section 130, and a forming section 132. The first infeed assembly 48 is coupled to the lower infeed section 130. A first transfer assembly 134 picks a blank 30 from the front of the stack of blanks 30 at the front edge of the holder 120. The first transfer assembly 134 is arranged to transfer the blank 30 to the forming section 132. The first transfer assembly 134 may be of any suitable design but must be configured to separate a single blank 30 from the stack of blanks 30 in the first infeed assembly 48, and then transport or transfer this blank 30 to other parts of the second station 46, as described below. In this embodiment the first transfer assembly 134 comprises a plate 136 on which is mounted a plurality of suction cups 138. In use, the suction cups 138 engage with the blank 30 and apply a force to the blank 30 to separate the blank 30 from the stack of blanks 30 in the first infeed assembly 48. The suction cups 138 then retain or hold the blank 30 to enable the blank to be moved through the second station 46. The plate 136 of the first transfer assembly 134 is coupled to a suitable mechanism for moving the first transfer assembly 134 along a first axis in the lower infeed section 130 towards and away from the first infeed assembly 48, and along a second axis through the forming section 132. In this embodiment the second axis is perpendicular to the first axis.

The second infeed assembly 50 is coupled to the upper infeed section 128. A second transfer assembly 140 picks a blank 32 from the front of the stack of blanks 32 at the front edge of the holder 122. The second transfer assembly 140 is arranged to transfer the blank 32 to the forming section 132. The second transfer assembly 140 may be of any suitable design but must be configured to separate a single blank 32 from the stack of blanks 32 in the second infeed assembly 50, and then transport or transfer this blank 32 to other parts of the second station 46, as described below. In this embodiment the second transfer assembly 140 comprises a plate 142 on which is mounted a plurality of suction cups 144.

In use, the suction cups 144 engage with the blank 32 and apply a force to the blank 32 to separate the blank 32 from the stack of blanks 32 in the second infeed assembly 50. The suction cups 144 then retain or hold the blank 32 to enable the blank to be moved into the lower infeed section 130 and the forming section 132 of the second station 46. The plate 142 of the second transfer assembly 140 is coupled to a suitable mechanism for moving the second transfer assembly 140 along a first axis in the upper infeed section 128 towards and away from the second infeed assembly 50, and along a second axis through the lower infeed section 130 and the forming section 132. In this embodiment the second axis is perpendicular to the first axis.

During use of the machine 40, the carriage assembly 114, together with the former 94 and pouch assembly 16, moves into the forming section 132 of the second station 46. The carriage assembly 114 is oriented such that a plane of the gap between the two halves 96 of the former 94 is substantially perpendicular to a plane of each of the blanks 30, 32 in the stacks of blanks.

Figure 15:
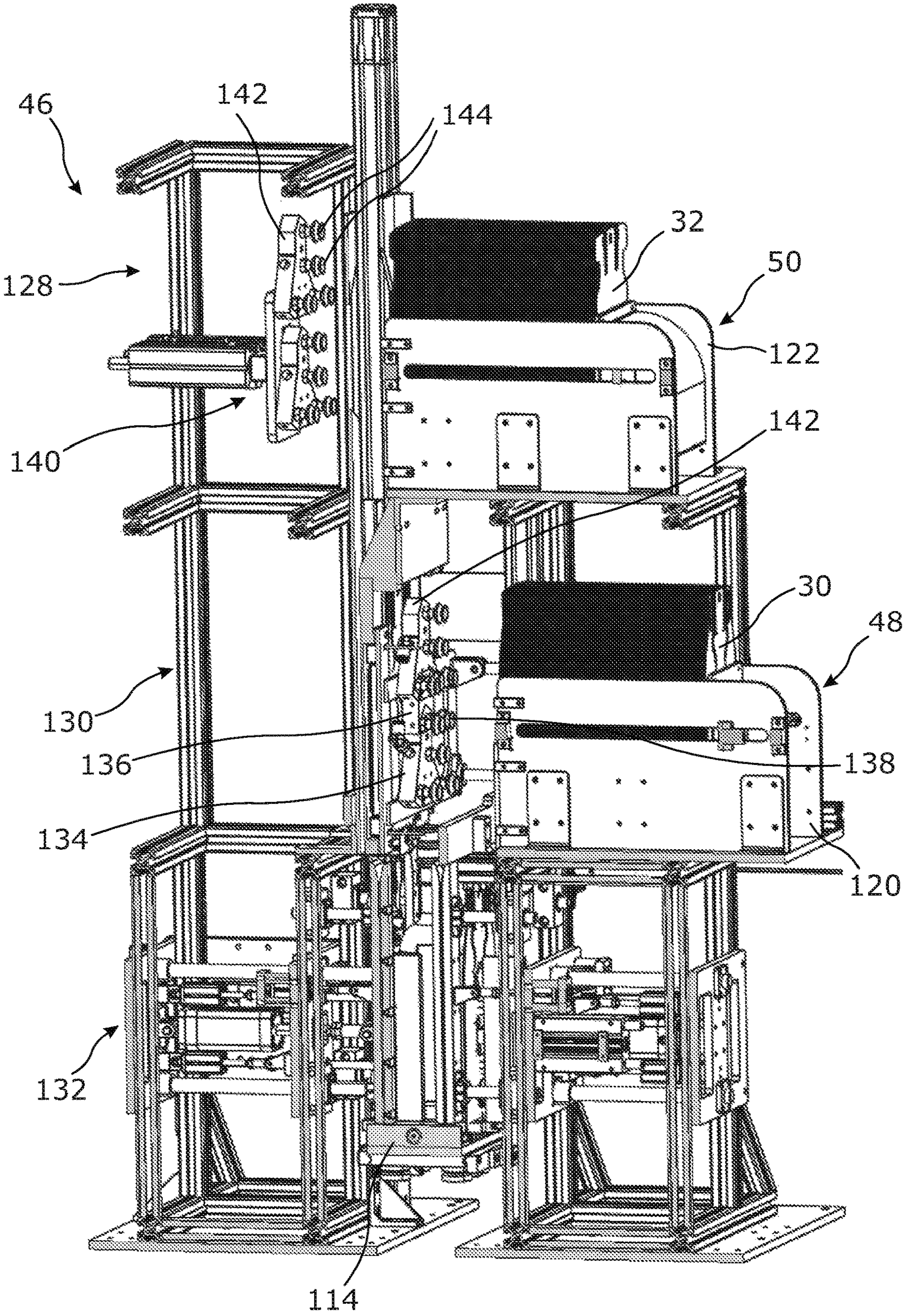
FIG. 15 is a sectional view of the second station of FIG. 14, in a plane containing the line XV-XV of FIG. 14.
Figure 16:
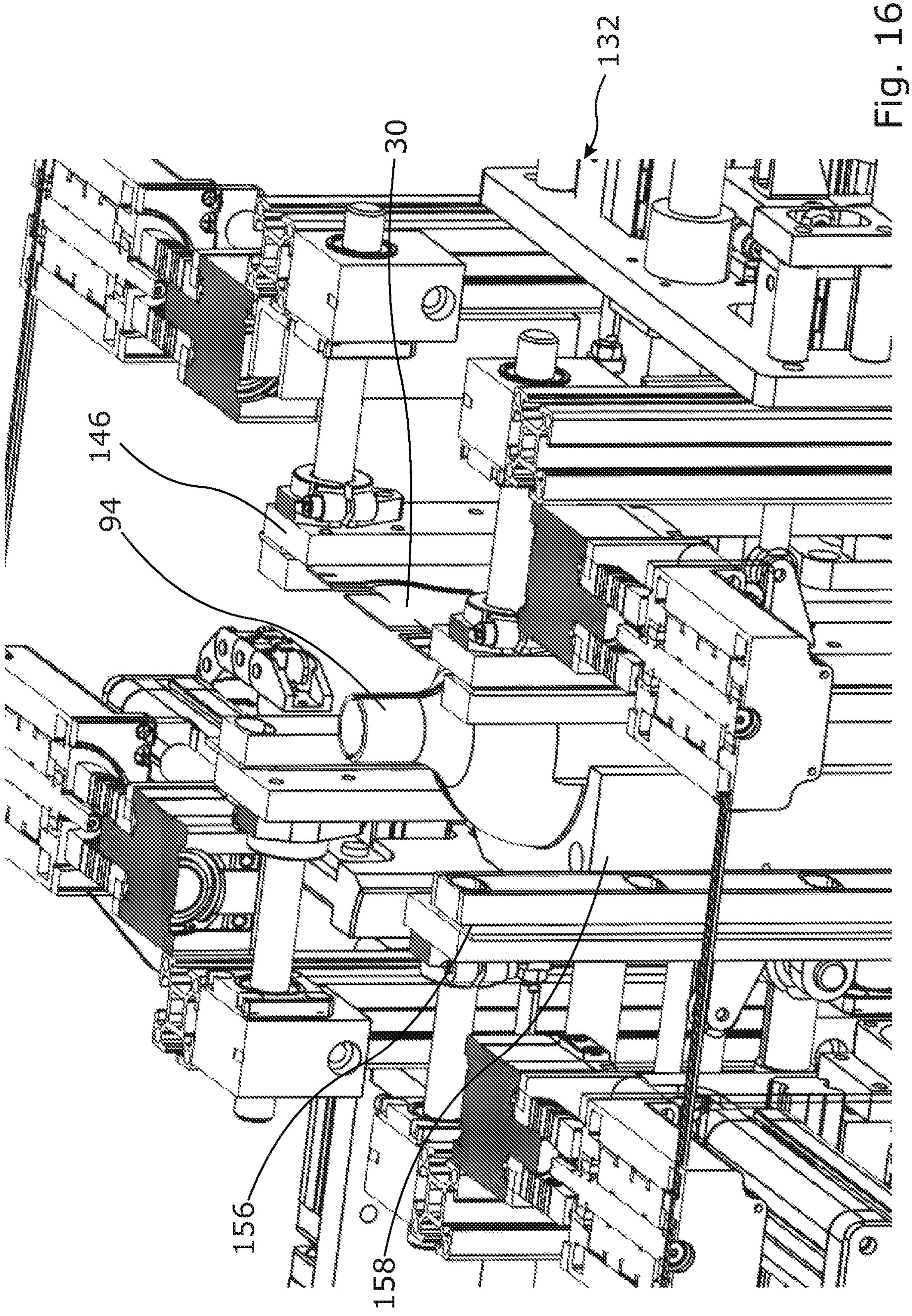
FIG. 16 is a sectional view of a part of the second station of FIG. 14, in a plane containing the line XVI-XVI of FIG. 14.

Referring now to FIGS. 15 and 16, the first transfer assembly 134 transports a single first side wall blank 30 to the forming section 132 and engages the blank 30 with a first blank holder 146 disposed on a first side of the former 94. The blank holder 146 holds the blank 32 such that it is correctly aligned with the former 94, i.e. such that the main body panel 34 is adjacent the main body sections 98 of the former 94 and the neck panels 36, 38 are adjacent the neck sections 100 of the former 94. A plane of the blank holder 146 is substantially perpendicular to the plane of the gap between the two halves 96 of the former 94. The blank holder 146 preferably holds the blank 32 such that the central neck panel 36 is aligned with the gap in the former 94.

Figure 19:
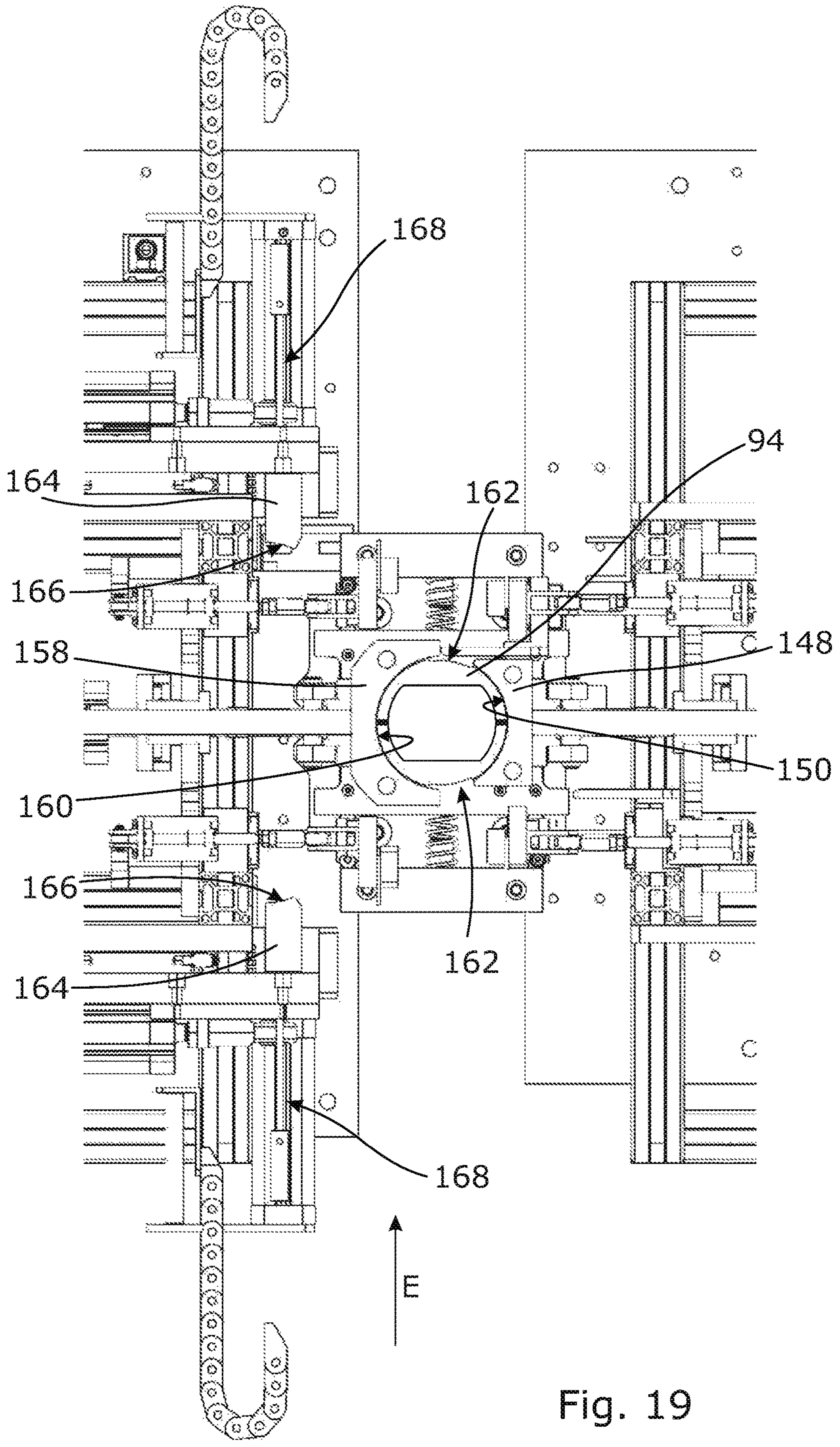
FIG. 19 is a sectional view of a part of the second station of FIG. 14, in a plane containing the line XIX-XIX of FIG. 14.

A first clamp element 148 of the second station 46 comprises a block having a concave part-cylindrical clamp surface 150, as shown most clearly in FIG. 19. A radius of curvature of the clamp surface 150 is substantially the same as a radius of curvature of the outer surface 104 of the main body sections 98 of the former 94. In an initial, retracted position the first clamp element 148 is disposed on a first side of the first blank holder 146, such that the blank 30 is disposed between the first clamp element 148 and the former 94. The first clamp element 148 is configured to move in a first direction towards the former 94 into a clamping position and, in doing so, to press and shape the main body panel 34 of the blank 30 around the main body sections 98 of the former 94.

A circumferential width of the concave part-cylindrical clamp surface 150 is less than a width of the first side wall blank 30 between opposite side edges of the main body panel 34. In this way, when the first clamp element 148 presses the blank 30 against the former 94, a central section of the main body panel 34 of the blank 30 is disposed and clamped between the first clamp element 148 and the former 94, and side edge regions of the main body panel 34 of the blank 32 extend from edges of the first clamp element 148.

Figure 17:
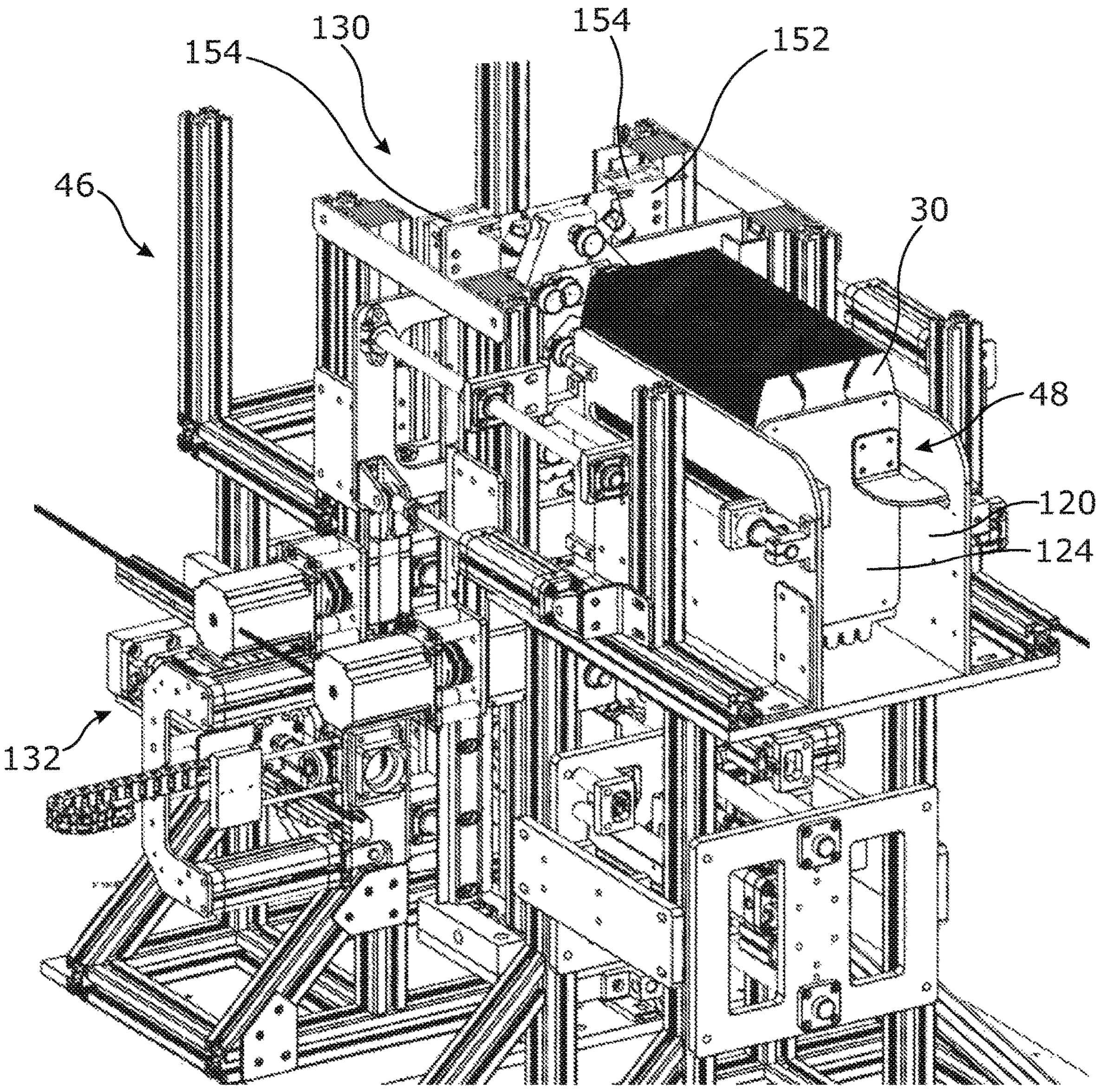
FIG. 17 is a sectional view of a part of the second station of FIG. 14, in a plane containing the line XVII-XVII of FIG. 14, showing a heater assembly of the second station.
Figure 18:
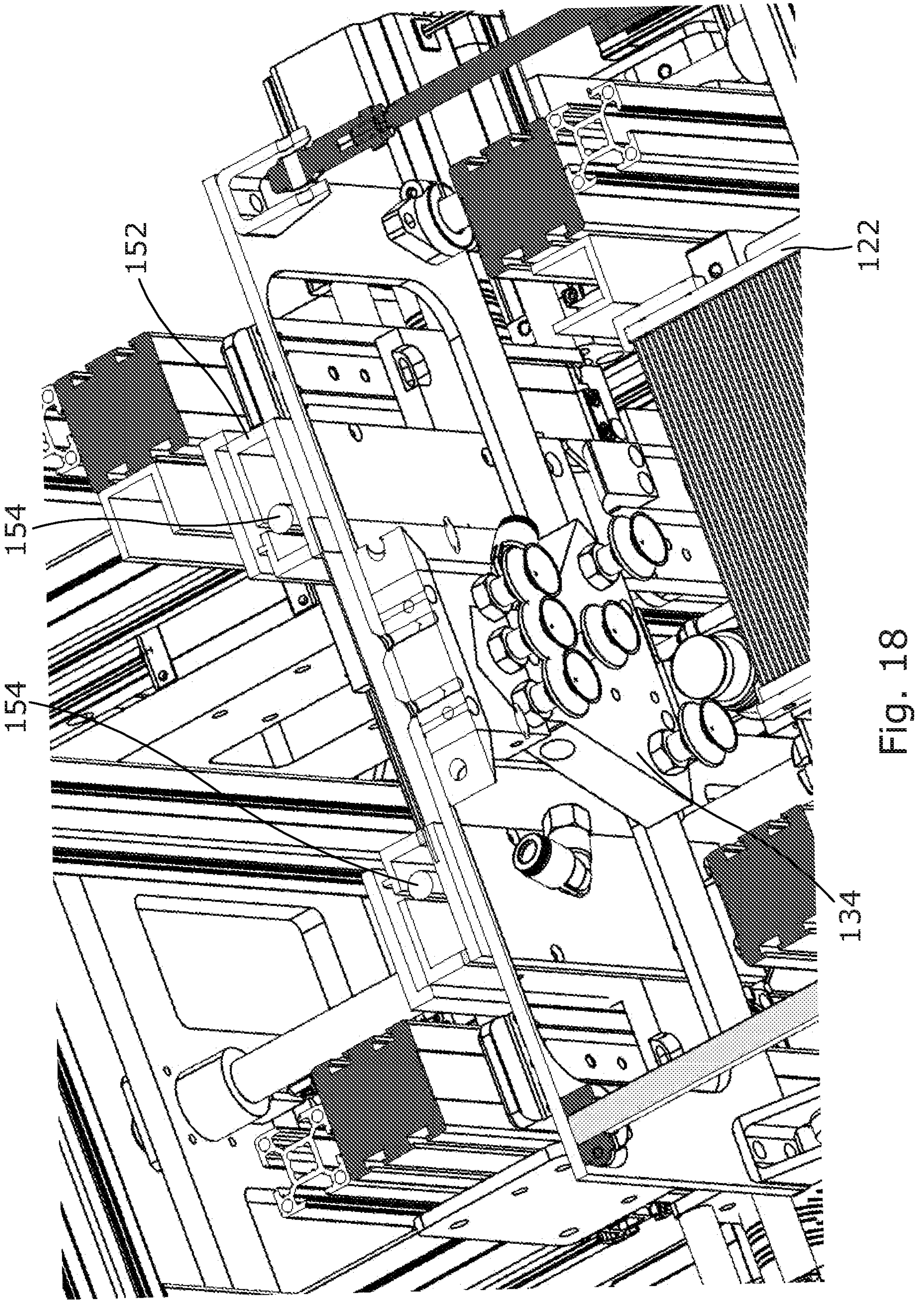
FIG. 18 is a further sectional view of the heater assembly of FIG. 17.

The second transfer assembly 140 transports a single second side wall blank 32 to a heating apparatus 152, shown in FIGS. 17 and 18. In this embodiment the heating apparatus is disposed in the lower infeed section 130. The heating apparatus 152 comprises a pair of heating elements 154. In this embodiment the heating elements 154 are infrared (IR) heating elements 154, and preferably comprise IR lamps. When the second side wall blank 32 is engaged with the heating apparatus 152 the blank 32 is disposed such that the side wall tabs 33 of the blank 32 are adjacent the heating elements 154 and the first surface of the blank 32 is facing the heating elements 154. The heating elements 154 apply heat to the blank 32 sufficient to activate adhesive applied to each of the side wall tabs 33. In preferred embodiments a line of adhesive extends along each of the side wall tabs 33 and each of the heating elements 154 is elongate so as to apply heat evenly along the side wall tabs 33.

In a preferred embodiment of a method of manufacturing a bottle 2 using the machine 40, the second side wall blank 32 is heated by the heating apparatus 152 to activate the adhesive while the first clamp element 148 is pressing and shaping the first side wall blank 30 around the main body sections 98 of the former 94.

Once the adhesive on the side wall tabs 33 of the second side wall blank 32 has been activated by the heating apparatus 152, the second transfer assembly 140 transports the second side wall blank 32 to the forming section 132 and engages the blank 32 with a second blank holder 156 disposed on a second side of the former 94. The blank holder 156 holds the blank 32 such that it is correctly aligned with the former 94, i.e. such that the main body panel 34 is adjacent the main body sections 98 of the former 94 and the neck panels 36, 38 are adjacent the neck sections 100 of the former 94. A plane of the blank holder 156 is substantially perpendicular to the plane of the gap between the two halves 96 of the former 94. The blank holder 156 preferably holds the blank 32 such that the central neck panel 36 is aligned with the gap in the former 94.

A second clamp element 158 of the second station 46 comprises a block having a concave semi-cylindrical clamp surface 160. A radius of curvature of the clamp surface 160 is substantially the same as a radius of curvature of the outer surface 104 of the main body sections 98 of the former 94. In an initial position the second clamp element 158 is disposed on a first side of the second blank holder 156, such that the blank 32 is disposed between the second clamp element 158 and the former 94. The second clamp element 158 is configured to move in a first direction towards the former 94 into a clamping position and, in doing so, to press and shape the main body panel 34 of the blank 32 around the main body sections 98 of the former 94.

A circumferential width of the concave part-cylindrical clamp surface 160 is less than a width of the second side wall blank 32. In this way, when the second clamp element 158 presses the blank 32 against the former 94, a central section of the main body panel 34 of the blank 32 is disposed and clamped between the second clamp element 158 and the former 94, and the side wall tabs 33 of the blank 32 extend from edges of the second clamp element 158.

The second clamp element 158 shapes the second side wall blank 32 around the former 94 such that the side wall tabs 33 overlap the side edge regions of the main body panel 34 of the first side wall blank 30.

As shown most clearly in FIG. 19, with the first and second clamp elements 148, 158 in their respective clamping positions, there are gaps 162 between the first and second clamp elements 148, 158 on opposite sides of the former 94. The overlapped portions of the first and second side wall blanks 30, 32 are disposed in these gaps 162 such that at least an outer surface of each of the side wall tabs 33 is exposed.

The second station 46 further comprises a pair of overlap clamp elements 164. Each of the overlap clamp elements 164 comprises a curved clamp surface 166. A radius of curvature of the clamp surface 166 is substantially the same as a radius of curvature of the outer surface 104 of the main body sections 98 of the former 94. Furthermore, a width of each of the overlap clamp elements 164 is substantially the same as or slightly smaller than a width of each of the gaps 162 between the first and second clamp elements 148, 158 in their clamping positions.

After both blanks 30, 32 have been wrapped around the former 94 as described above, the overlap clamp elements 164 move into position in the gap 162 to press the side wall tabs 33 against the side edge regions of the main body panel 34 of the first side wall blank 30. The overlap clamp elements 164 are preferably configured to apply a force to the side wall tabs 33 for a period of time sufficient to enable the side wall tabs 33 to adhere to the side edge regions of the first side wall blank 30.

In this embodiment the second station 46 therefore comprises a mechanism 168 to move the overlap clamp elements 164 into the correct position relative to the first and second clamp elements 148, 158 and apply the necessary force to the blanks 30, 32. The mechanism 168 is configured to move each of the overlap clamp elements 164 in a first direction towards the former 94 and in a second direction away from the former 94. In this way the mechanism 168 is configured to move each of the overlap clamp elements 164 between an aligned position, in which the overlap clamp element 164 is aligned with the gap 162 but is not applying a force to the blanks 30, 32, and a clamping position, in which the overlap clamp element 164 is applying a force to the blanks 30, 32 to adhere the side wall tabs 33 to the side edge regions of the first side wall blank 30.

The mechanism 168 may additionally be configured to move each of the overlap clamp elements 164 into a third, stowed position. In this third position, illustrated in FIG. 19, the overlap clamp elements 164 are not aligned with the gaps 162. In some embodiments, such as the embodiment illustrated, the carriage assembly 114 moves along a direction E to enter the second station 46. In particular, the carriage assembly 114 moves along a direction E to position the former 94 between the first and second blank holders 146, 156. The direction E is preferably substantially parallel to a plane of each of the first and second blank holders 146, 156.

To permit this movement of the carriage assembly 114 and the former 94 into the second station 46, the overlap clamp elements 164 are preferably held in the third position such that the overlap clamp elements 164 do not impede movement of the carriage assembly 114 and the former 94. The mechanism 168 may therefore be configured to move each of the overlap clamp elements 164 in third and fourth directions between the stowed position and the aligned position. The third and fourth directions may be substantially perpendicular to the first direction of movement of the overlap clamp elements 164.

In some embodiments a separate mechanism 168 may be associated with each of the overlap clamp elements 164. In these embodiments the second station 46 may be configured such that both of the mechanisms 168 operate simultaneously.

After the side wall tabs 33 have adhered to the side edge regions of the first side wall blank 30, the first clamp element 148, the second clamp element 158 and the overlap clamp elements 164 are all moved away from the former 94 so that they are no longer applying a force to the blanks 30, 32. The carriage assembly 114, together with the former 94, pouch assembly 16 and partially formed side wall elements 18, 20 are then free to exit the second station 46 and move to the third station 52 of the machine 40.

Station C

Figure 20:
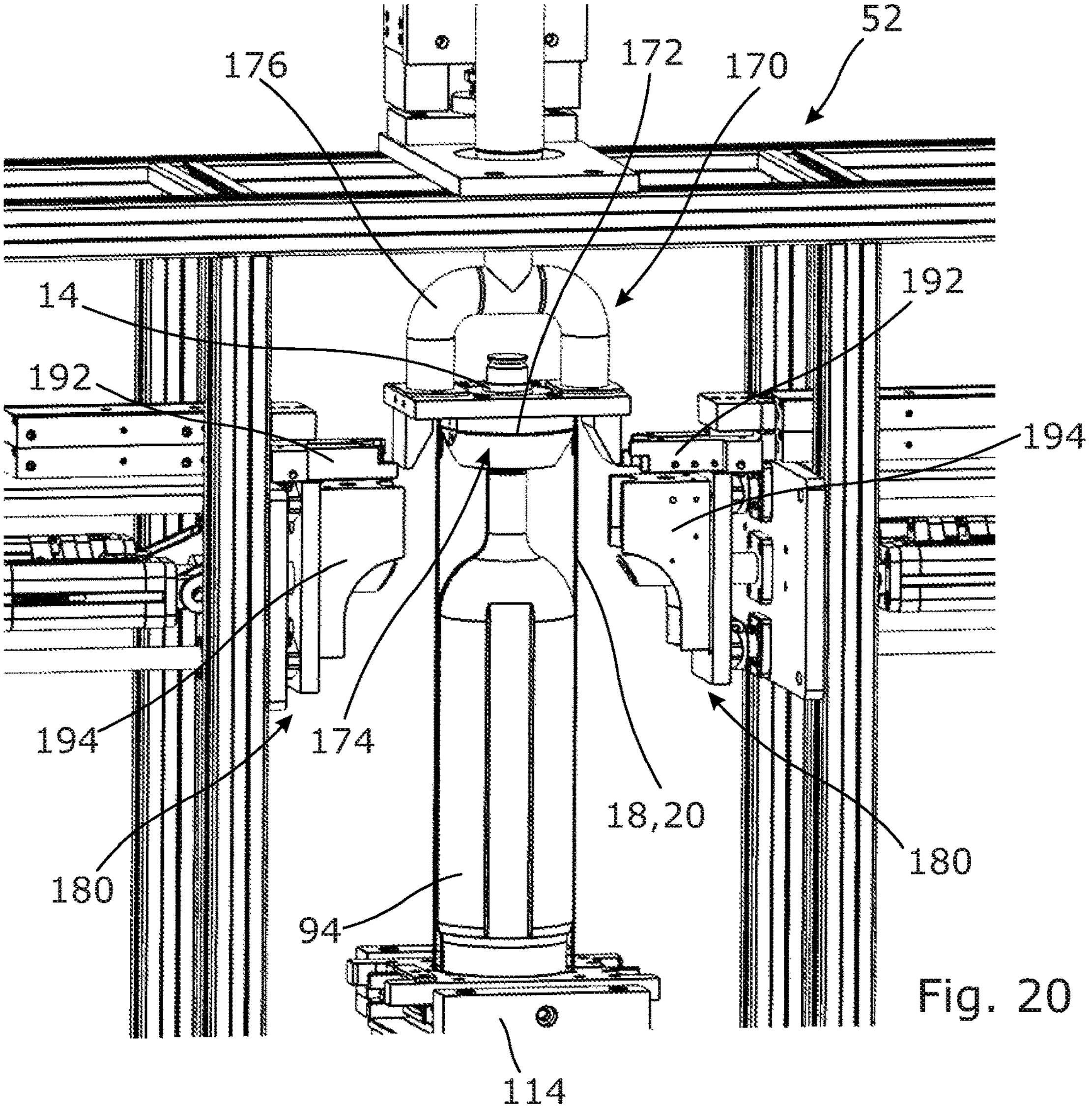
FIG. 20 is a perspective view of a third station (Station C) of a machine for manufacturing a bottle according to a preferred embodiment of the present invention.

The third station 52 is shown in FIG. 20. At the third station 52 the central neck panels 36 are shaped around the former 94 and a part of each of the central neck panels 36 is adhered to the pouch assembly 16.

Figure 21:
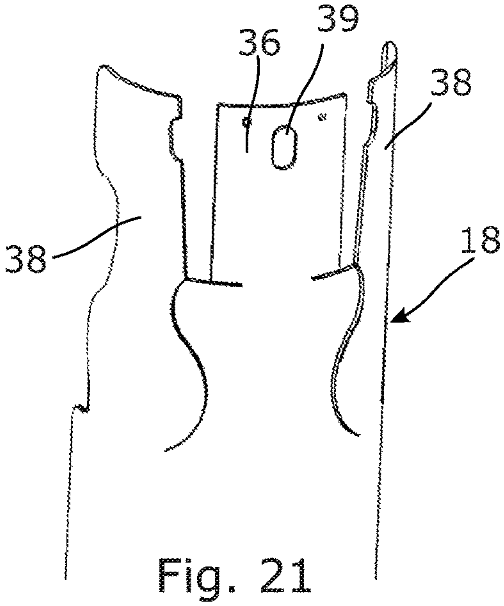
FIG. 21 illustrates a part of a partially formed first side wall element of the shell showing three neck panels of the side wall element.

The third station 52 comprises a heating assembly 170 and a pair of inner neck press assemblies 180. When a carriage assembly 114 enters the third station 52 the carriage assembly positions the former 94, together with the pouch assembly 16 and partially formed side wall elements 18, 20 between the two inner neck press assemblies 180. The heating assembly 170 is disposed above the former 94. In FIG. 20 the partially formed side wall elements 18, 20 are indicated by a cylindrical outline around the former 94. Details of the partially formed side wall elements 18, 20, including the neck panels 36, 38, are not shown in FIG. 20. FIG. 21 illustrates one embodiment of neck panels 36, 38 of a partially formed side wall element 18.

The heating assembly 170 comprises an annular heating element 172. A diameter of a radially inner surface of the heating element 172 is larger than an outer diameter of the fitment 14 or a maximum dimension of the fitment 14 in a direction perpendicular to the longitudinal axis of the fitment 14. A maximum diameter of a radially outer surface 174 of the heating element 172 is substantially equal to or slightly smaller than a diameter of a cylindrical surface defined by inner surfaces of the neck panels 36, 38 of the partially formed side wall elements 18, 20. It will be appreciated that, following forming of the blanks in the second station 46 as described above, the neck panels 36, 38 may have a tendency to bend radially inwardly slightly such that a diameter of an opening defined by top edges of the neck panels 36, 38 is smaller than an inner diameter of the main body panels 34 of the partially formed side wall elements 18, 20. For this reason the radially outer surface 174 of the heating element 172 is preferably tapered or sloped, such that a diameter of the radially outer surface 174 decreases towards a lower or leading end of the heating element 172.

The heating element 172 is preferably heated by hot fluid, in this embodiment hot air. Accordingly, the heating assembly 170 preferably comprises one or more pipes 176 for supplying hot air to the heating element 172.

The heating assembly 170 further comprises a mechanism for moving the heating element 172 between a disengaged position and an engaged position. In the disengaged position the heating element 172 is at a distance from the former 94 and the partially formed side wall elements 18, 20. In the engaged position the heating element 172 is disposed between at least a part of the central neck panels 36 of the partially formed side wall elements 18, 20.

In preferred embodiments, in the disengaged position the heating element 172 is disposed at a distance above the former 94. The mechanism is then configured to move the heating element 172 downwardly to a position between the central neck panels 36 of the partially formed side wall elements 18, 20. The tapered radially outer surface 174 of the heating element 172 may push the neck panels 36, 38 in a radially outward direction as the heating element 172 moves into the engaged position.

Heat from the heating element 172 activates or reactivates adhesive applied to the first surface of each of neck panels 36, 38 of the blanks 30, 32. In some embodiments the heating element 172 may only activate adhesive applied to the central neck panels 36. The heating element 172 remains in the engaged position for a suitable dwell time sufficient to activate the adhesive. The heating element 172 then returns to the disengaged position.

Figure 22:
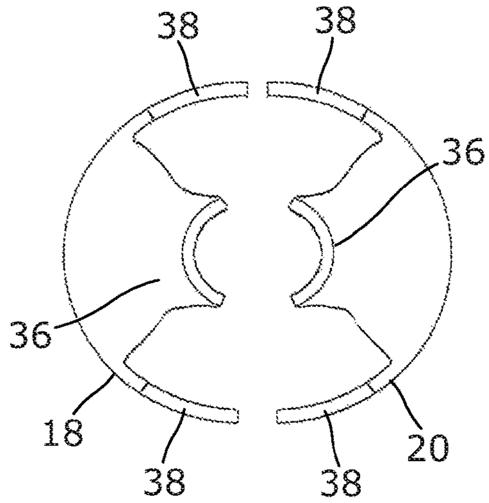
FIG. 22 illustrates the method step of pressing central neck panels of the side wall elements to form a part of the neck portion of the side wall of the shell (two side wall elements shown separated for clarity)

Following activation of the adhesive of the neck panels 36, 38, the two inner neck press assemblies 180 then apply a force to the central neck panels 36 to shape and form the central neck panels 36 around the neck section 100 of the former 94 and a part of the fitment 14. In particular, the inner neck press assemblies 180 are configured to shape the central neck panels 36 such that these are formed as illustrated in FIG. 22. An embodiment of the inner neck press assemblies 180 is shown in FIGS. 23 to 26. Each inner neck press assembly 180 is arranged to form a respective one of the central neck panels 36. When the carriage assembly 114 enters the third station 52, the former 94 is preferably oriented such that the central neck panels 36 of the partially formed side wall elements 18, 20 are aligned with the inner neck press assemblies 180.

In preferred embodiments, the outer shell 4 of the bottle 2 is retained in engagement or cooperation with the pouch assembly 16, at least in part, by means of lugs 17 that protrude radially outwardly from the fitment 14. The fitment 14 preferably includes a pair of lugs 17 that are disposed on opposite sides of the fitment 14, i.e. the lugs 17 are diametrically opposite each other. The central neck panel 36 of each of the blanks 30, 32 preferably includes an aperture 39. Each aperture 39 is sized and shaped to receive a respective one of the lugs 17. As described further below, when the central neck panels 36 are formed around the former 94 and fitment 14, each of the lugs 17 protrudes through the respective aperture 39. The fitment 14 is therefore engaged with the shell 4 by means of the protrusion of the lugs 17 through the apertures 39. This prevents rotation of the fitment 14, and therefore the pouch assembly 16, with respect to the shell 4. The engagement of the lugs 17 through the apertures 39 also supports the pouch assembly 16 within the shell 4.

Figure 23:
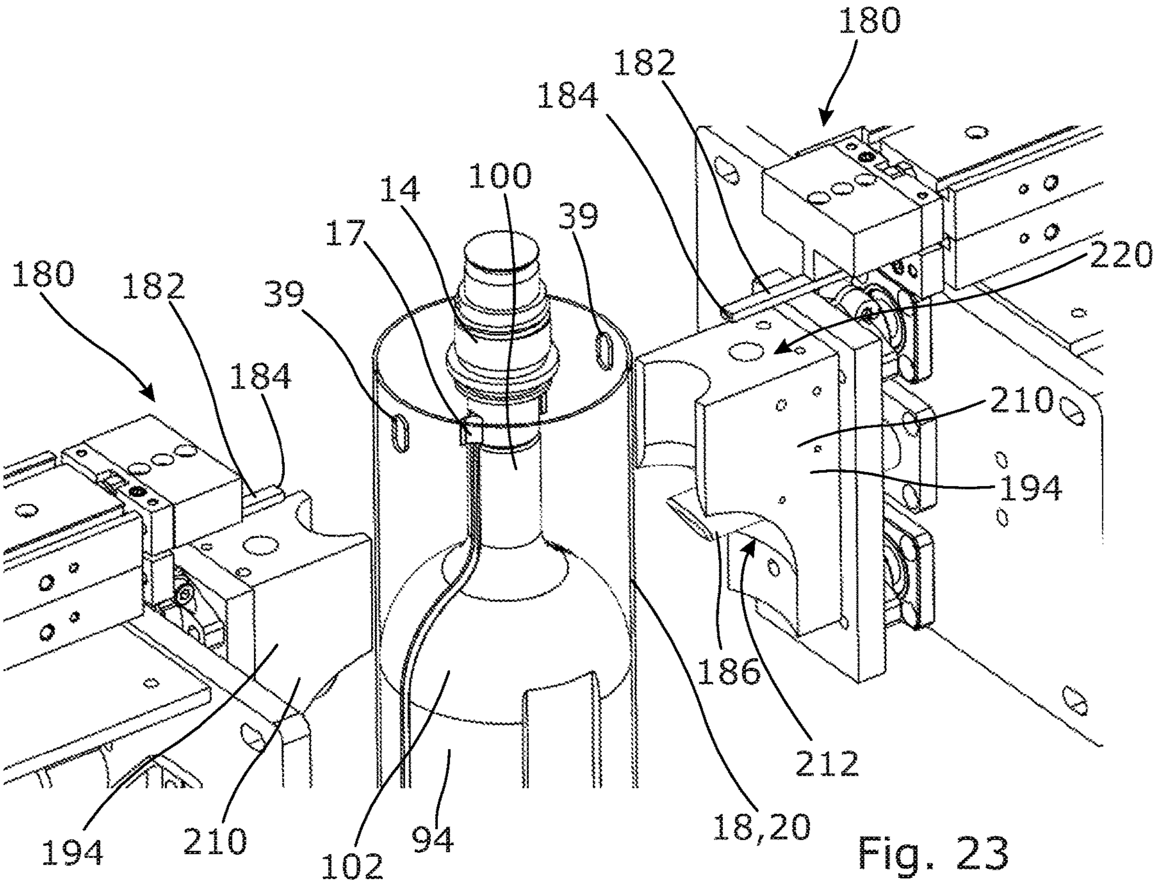
FIG. 23 is a perspective view of a part of the third station of FIG. 20 with some elements removed to show alignment fingers of the third station.
Figure 24:
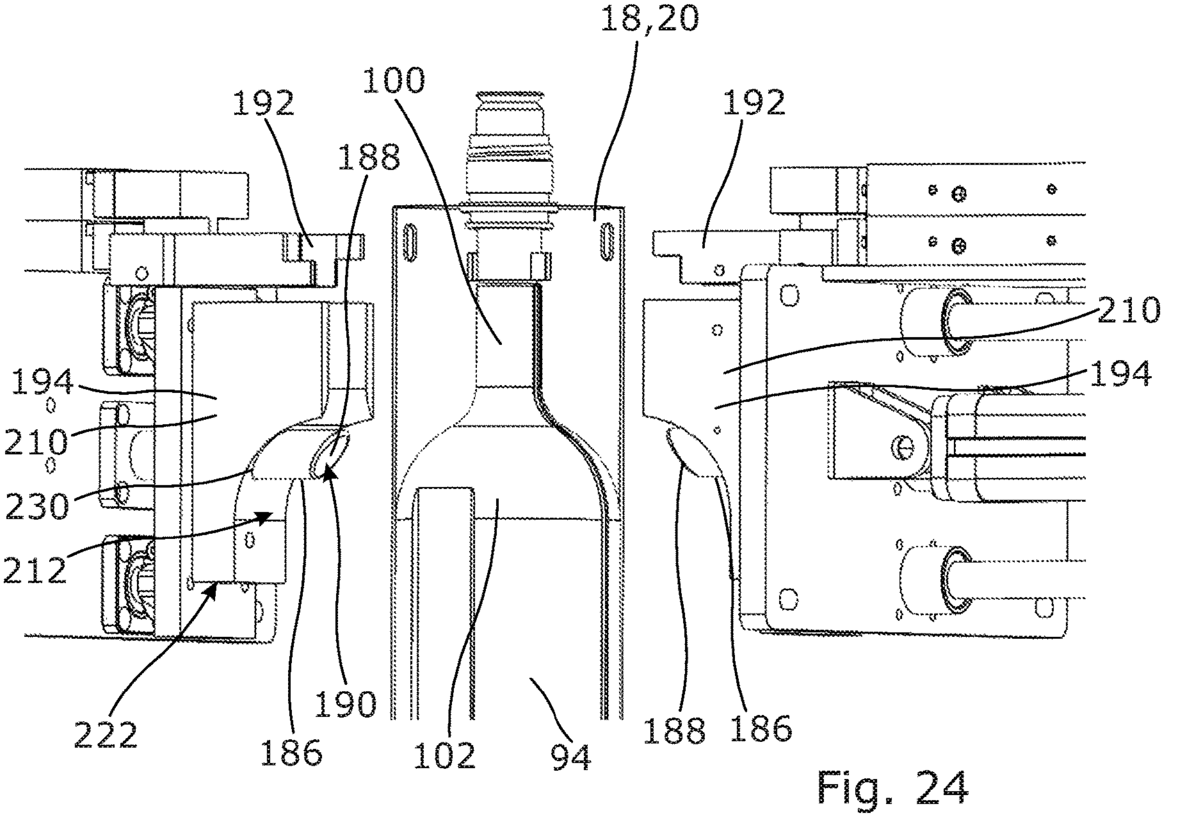
FIG. 24 is a perspective view of a part of the third station of FIG. 20 showing, in particular, push rods of the third station.

In this embodiment each of the inner neck press assemblies 180 comprises an alignment pin or finger 182, shown most clearly in FIG. 23. During operation of the inner neck press assemblies 180, each of the alignment fingers 182 moves from an initial, retracted position, at a distance from the former 94, to an inserted position, in which each of the alignment fingers 182 extends through a respective one of the apertures 39 in the central neck panels 36. In the inserted position the alignment fingers 182 ensure that the central neck panels 36 are correctly aligned with respect to the fitment 14, and in particular with respect to the lugs 17 of the fitment 14.

Each of the alignment fingers 182 preferably comprises an elongate, slender member. Each alignment finger 182 extends, along an axis of the member, to a free end 184 of the alignment finger 182. Dimensions of the member, perpendicular to the axis, are such that the alignment fingers 182 can extend through the apertures 39 in the central neck panels 36. Preferably there is minimal clearance between each member and an edge of the aperture 39 such that the insertion of the alignment finger 182 through the aperture 39 acts to correctly position and align the central neck panel 36.

Each inner neck press assembly 180 comprises a push rod 186 for performing an initial shaping step in a method of shaping the central neck panels 36, as shown most clearly in 24 and 25. Each push rod 186 comprises an elongate member terminating at a free end 188. An axis of each push rod 186 is preferably parallel to but offset from the axis of a respective one of the alignment fingers 182. In particular, while the alignment fingers 182 are aligned with the apertures 39 proximate a top edge of the central neck panels 36, the push rods 186 are aligned with a part of the shoulder section 102 of the former 94. The push rods 186 are oriented such the axes of the push rods 186 extend radially towards an axis of the former 94 and the free ends 188 are radially innermost.

The free end 188 of each push rod 186 comprises an end surface 190. The end surface 190 may be planar or may be curved. A plane of the end surface 190 is transverse to the axis of the push rod 186. Preferably an angle between the plane of the end surface and the axis is an acute angle, less than 90°. Preferably an angle between the plane of the end surface and the axis is between 30° and 80°. In this way the push rod 186 may have the shape of a cylindrical wedge. The slope of the end surface 190 is oriented such that a vertically upper part of the free end 188 of the push rod 186 is closer to a vertical axis of the former 94 than a vertically lower part of the free end 188.

With the alignment fingers 182 remaining in the inserted position, the push rod 186 of each of the inner neck press assemblies 180 is moved from a retracted position to an extended position. In the retracted position the push rods 186 are at a distance from the former 94 such that the free ends 188 are not engaged with the partially formed side wall elements 18, 20. To move each of the push rods 186 from the retracted position to the extended position, the free ends 188 are moved radially inwardly in a direction parallel to the axis of the push rod 186. In the extended position the end surface 190 of each of the push rods 186 contacts a part of the respective one of the central neck panels 36 in a region of the neck panel 36 proximate the shoulder section 102 of the former 94. Movement of the push rods 186 into the extended position presses the central neck panels 36 towards the shoulder section 102 and the neck section 100 of the former 94.

Because the alignment fingers 182 are still in the inserted position, as the push rods 186 reach the extended position, a first portion of each of the central neck panels 36 is brought into contact with the shoulder section 102 of the former 94 and a second portion of each of the central neck panels 36 is brought into contact with the neck section 100 of the former 94.

Figure 25:
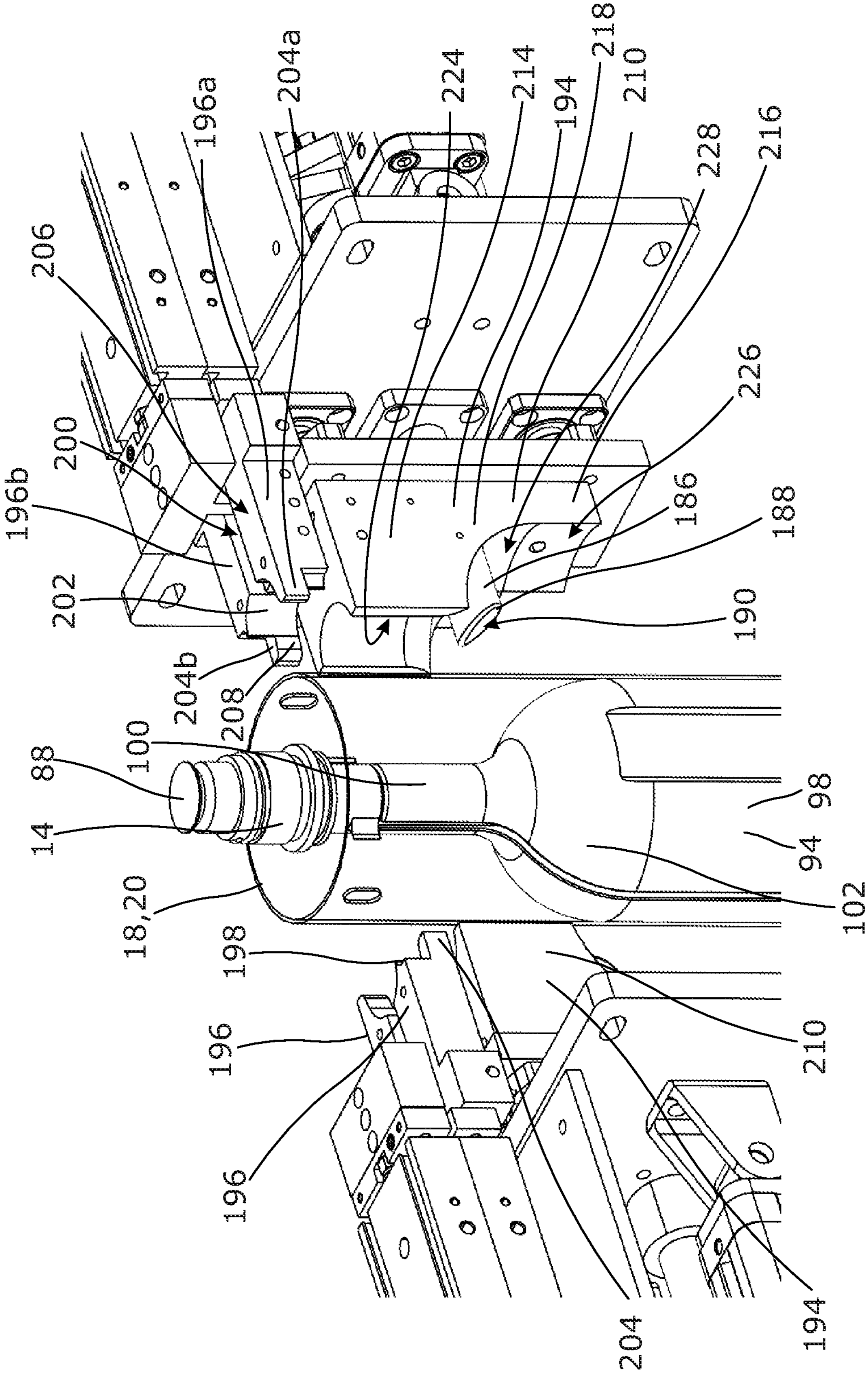
FIG. 25 is a perspective view of a part of the third station of FIG. 20 showing, in particular, press elements of the third station in an open configuration.

The inner neck press assemblies 180 further comprise press elements 192, 194 arranged to press and shape the central neck panels 36 around the former 94 and fitment 14, shown most clearly in FIG. 25.

An upper, neck press element 192 is aligned with an upper portion of the central neck panel 36 proximate the top edge of the neck panel 36. The upper press element 192 is configured to press and shape regions of the central neck panel 36 around the aperture 39. In this embodiment the upper press element 192 comprises a pair of arms 196.

Each arm 196 comprises an elongate member terminating at a free end 198. The arms 196 of each pair extend parallel to each other but spaced apart, such that there is a gap 200 between the elongate members. In this embodiment the alignment finger 182 extends through and along the gap 200 between the arms 196.

The free end 198 of each arm 196 comprises a curved press surface 202 and a finger 204 extending from a distal end of the arm 196. The curved press surfaces 202 of the pair of arms 196 are concave part-cylindrical. A radius of curvature of the curved press surface 202 is preferably substantially the same as or slightly larger than the radius of curvature of the outer surface of the neck section 100 of the former 94. The press surfaces 202 of the arms 196 of a pair of arms face inwardly towards each other such that the pair of press surfaces 202 define a contiguous part-cylindrical surface.

Each press surface 202 extends along a depth of the arm 196 between an upper face 206 and an opposite lower face of the arm 196. The finger 204*a* of a first arm 196*a* of the pair of arms extends from the distal end of the arm 196*a* proximate the upper face 206 of the arm 196*a*. The finger 204*a* does not extend along the full depth of the arm 196*a*. Preferably the finger 204*a* extends across approximately half the depth of the arm 196*a*. The finger 204*b* of a second arm 196*b* of the pair of arms extends from the distal end of the arm 196*b* proximate the lower face of the arm 196*b*. The finger 204*b* does not extend along the full depth of the arm 196*b*. Preferably the finger 204*b* extends across approximately half the depth of the arm 196*b*. An inner surface 208 of each of the fingers 204 is continuous with the press surface 202.

The third station 52 comprises a pair of upper press elements 192, one disposed on each side of the former 94. Accordingly, the third station 52 comprises a first pair of arms 196 on a first side of the former 94 and a second pair of arms 196 on a second side of the former 94. The upper press elements 192 are preferably identical. In this way, with the upper press elements 192 disposed opposite each other, a first arm 196*a* of a first one of the upper press elements 192 is opposite a second arm 196*b* of a second one of the upper press elements 192.

Each of the upper press elements 192 are moveable between a retracted position and an extended or clamping position. In the retracted position the upper press elements 192 are at a distance from the former 94 such that the arms 196 are not engaged with the partially formed side wall elements 18, 20. In a subsequent step in the method of forming the central neck panels 36, the upper press elements 192 are moved from the retracted position to the clamping position. The upper press elements 192 are moved in a direction parallel to the axes of the arms 196 such that the arms 196 move towards the neck section 100 of the former 94. During this movement the press surfaces 202 and the inner surfaces 208 of the fingers 204 contact an upper region of each of the central neck panels 36. The upper press elements 192 apply a force to the central neck panels 36 and the press surfaces 202 and the inner surfaces 208 of the fingers 204 shape the central neck panel 36 around the neck section 100 of the former 94 and a part of the fitment 14. In the clamping position the upper region of each of the central neck panels 36 is clamped between the neck section 100 of the former 94 and a respective one of the upper press elements 192.

Figure 26:
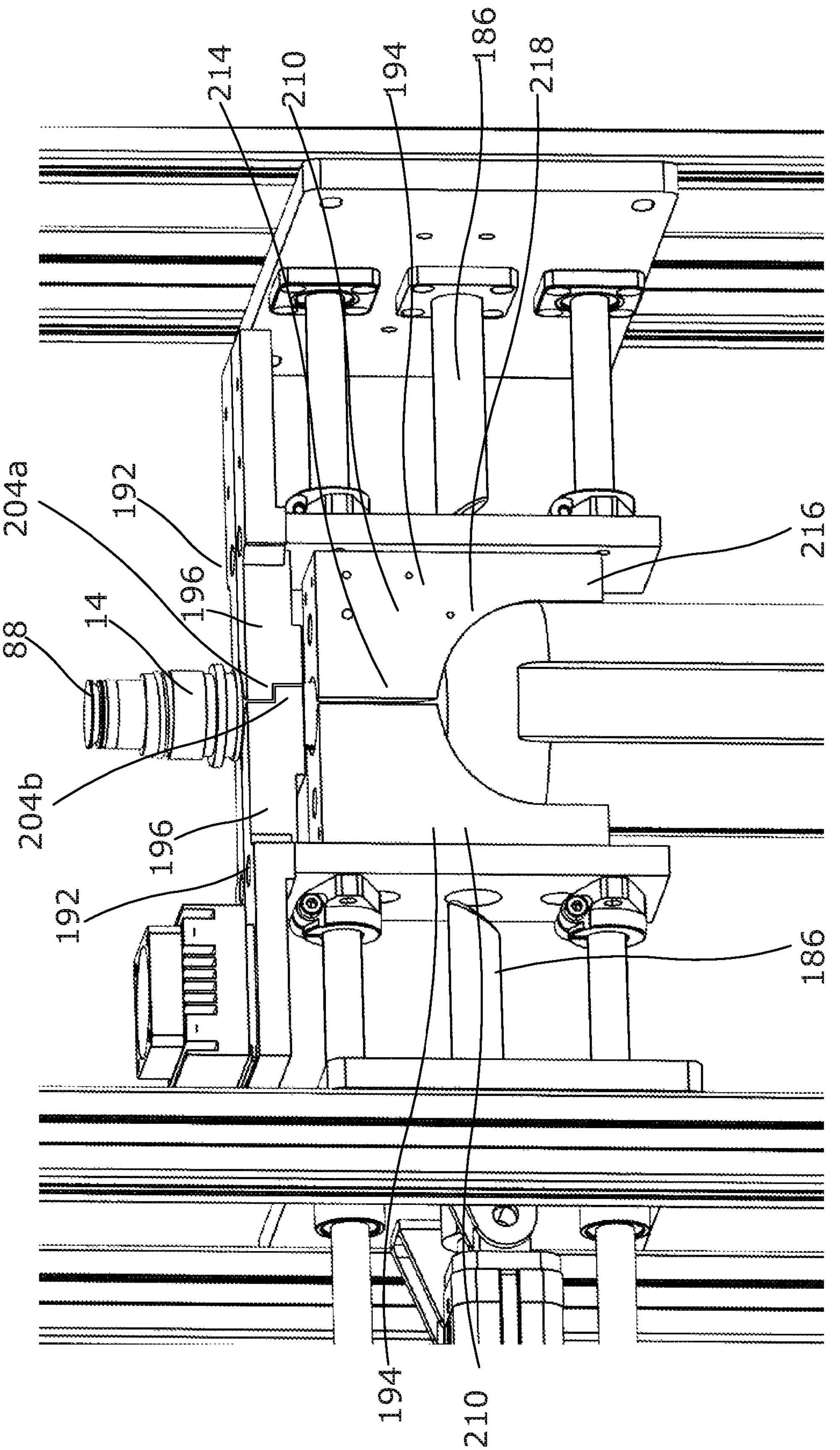
FIG. 26 is a perspective view of a part of the third station of FIG. 20 showing the press elements of FIG. 25 in a closed configuration.
Figure 27:
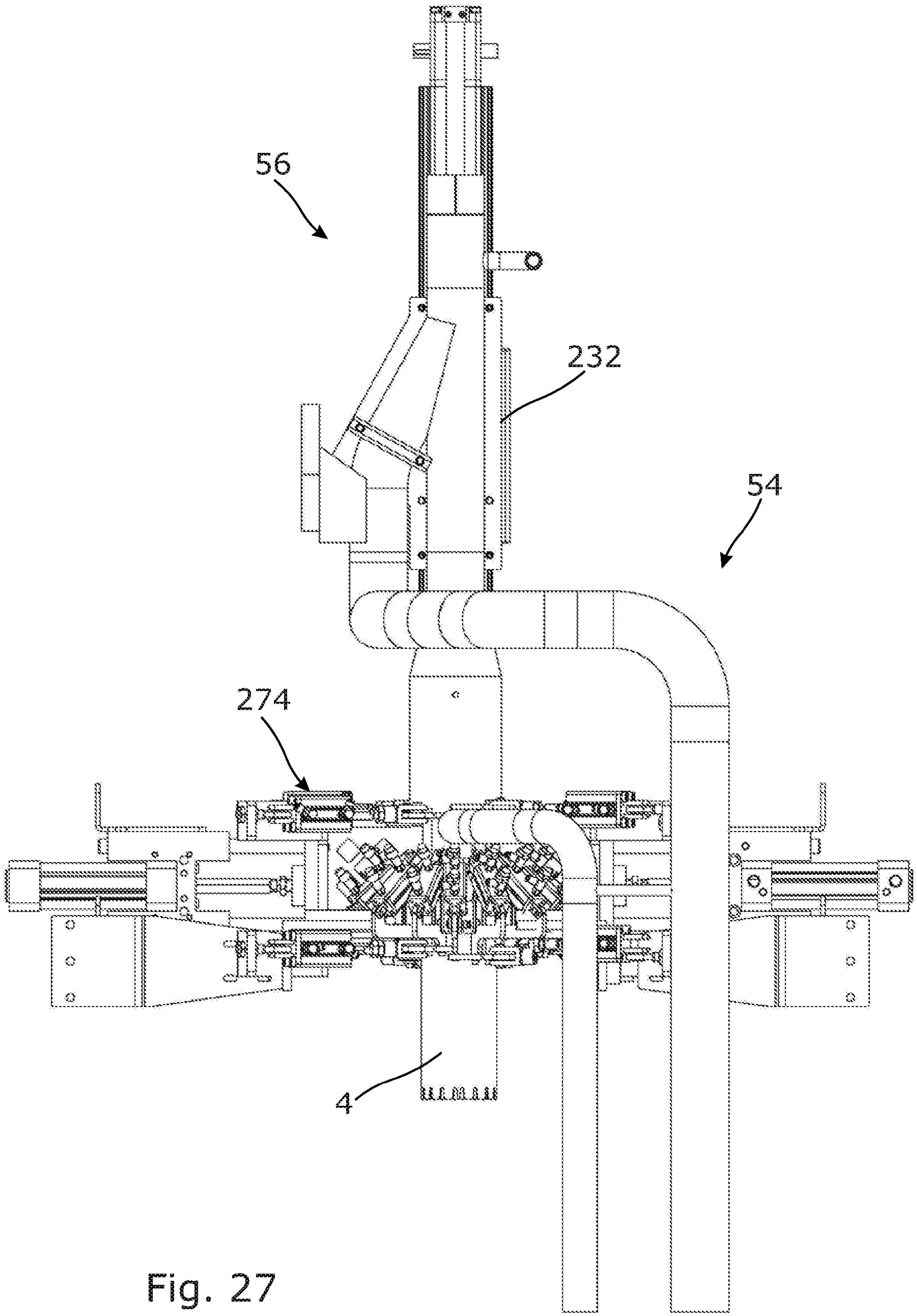
FIG. 27 is a plan view from a first side of a fourth station (Station D) of a machine for manufacturing a bottle according to a preferred embodiment of the present invention.
Figure 28:
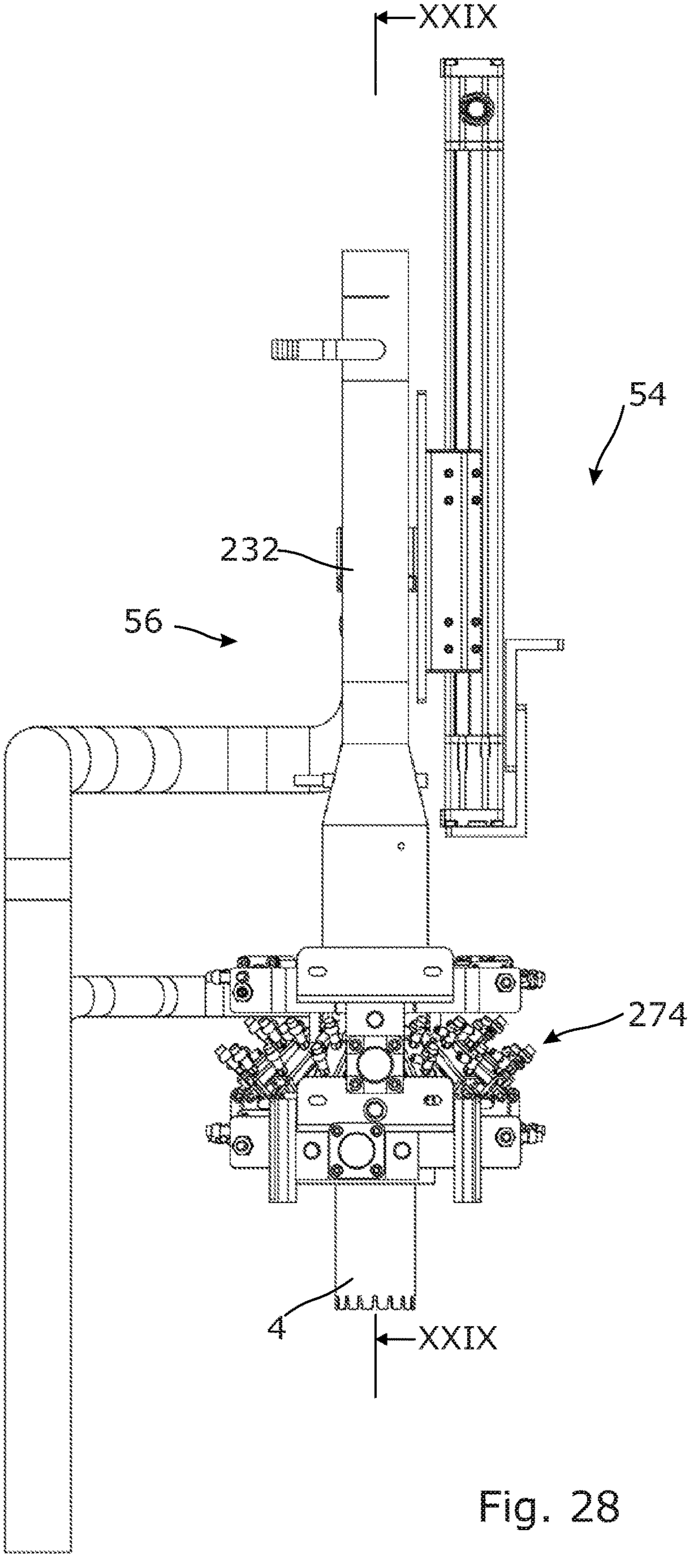
FIG. 28 is a plan view from a second side of the fourth station, perpendicular to the view of FIG. 27.
Figure 29:
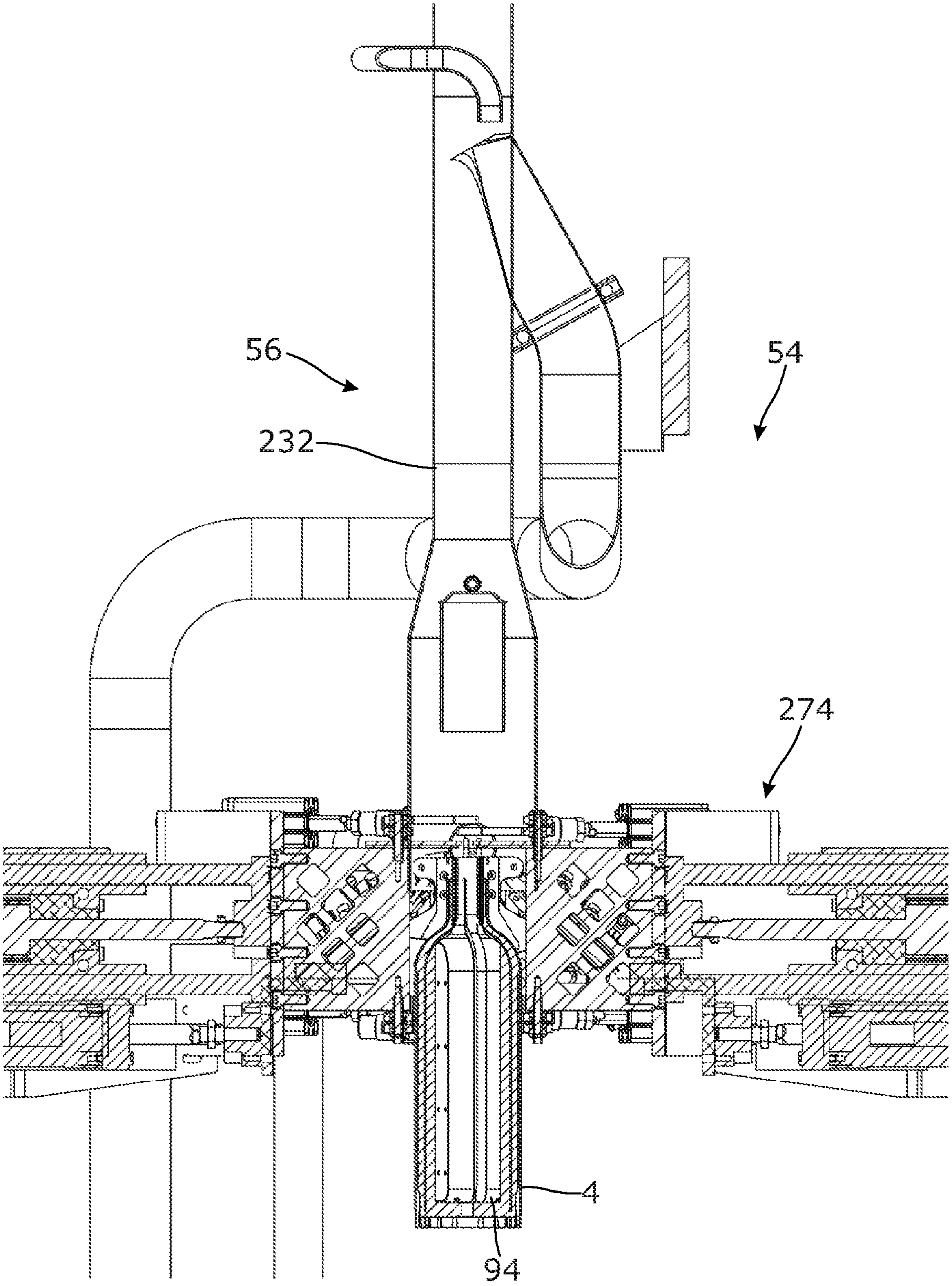
FIG. 29 is a cross-sectional view along the line XXIX-XXIX of FIG. 28.
Figure 30:
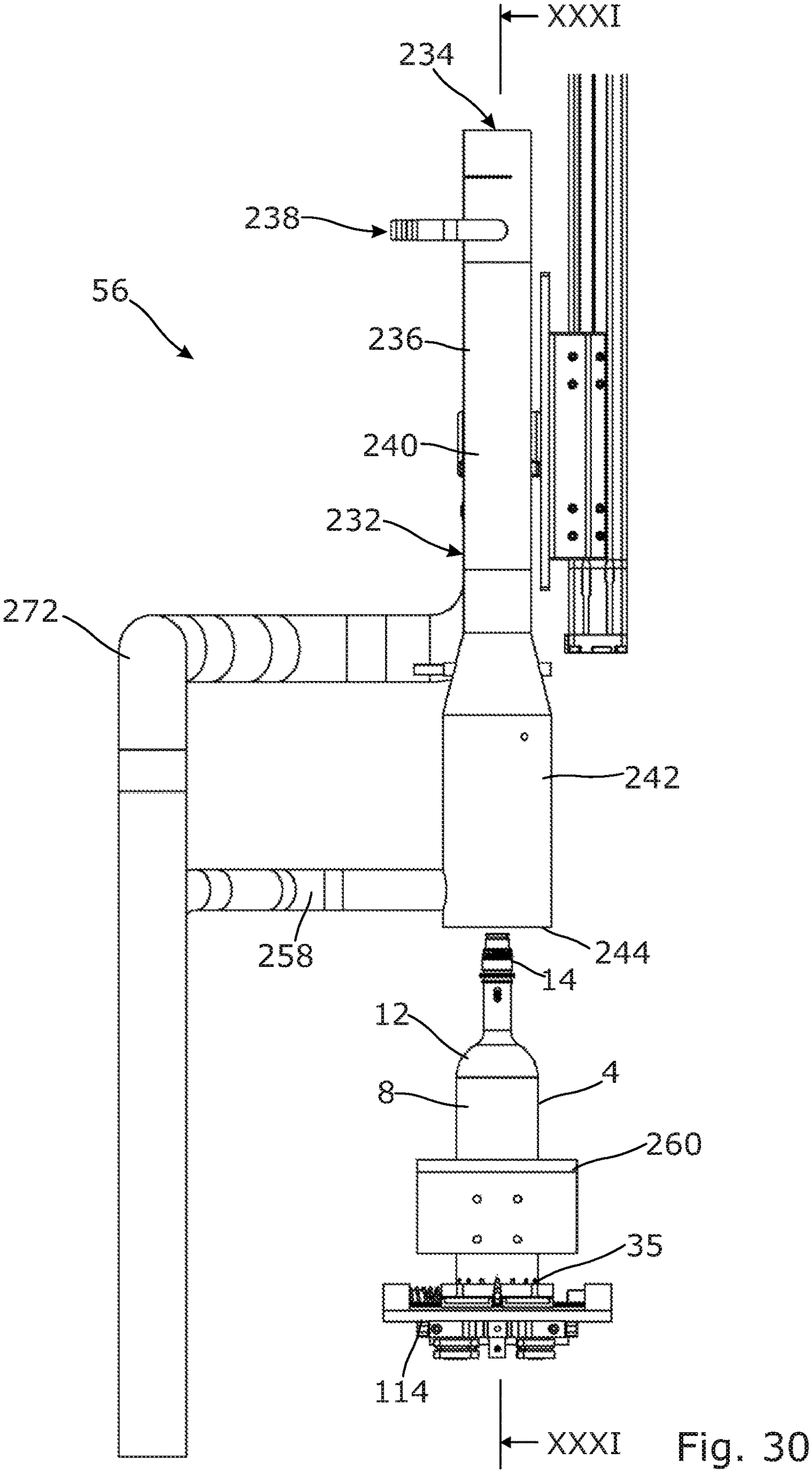
FIG. 30 is a plan view from the side of a steam application assembly of the fourth station of FIG. 27, showing the steam application assembly in a raised position.
Figure 31:
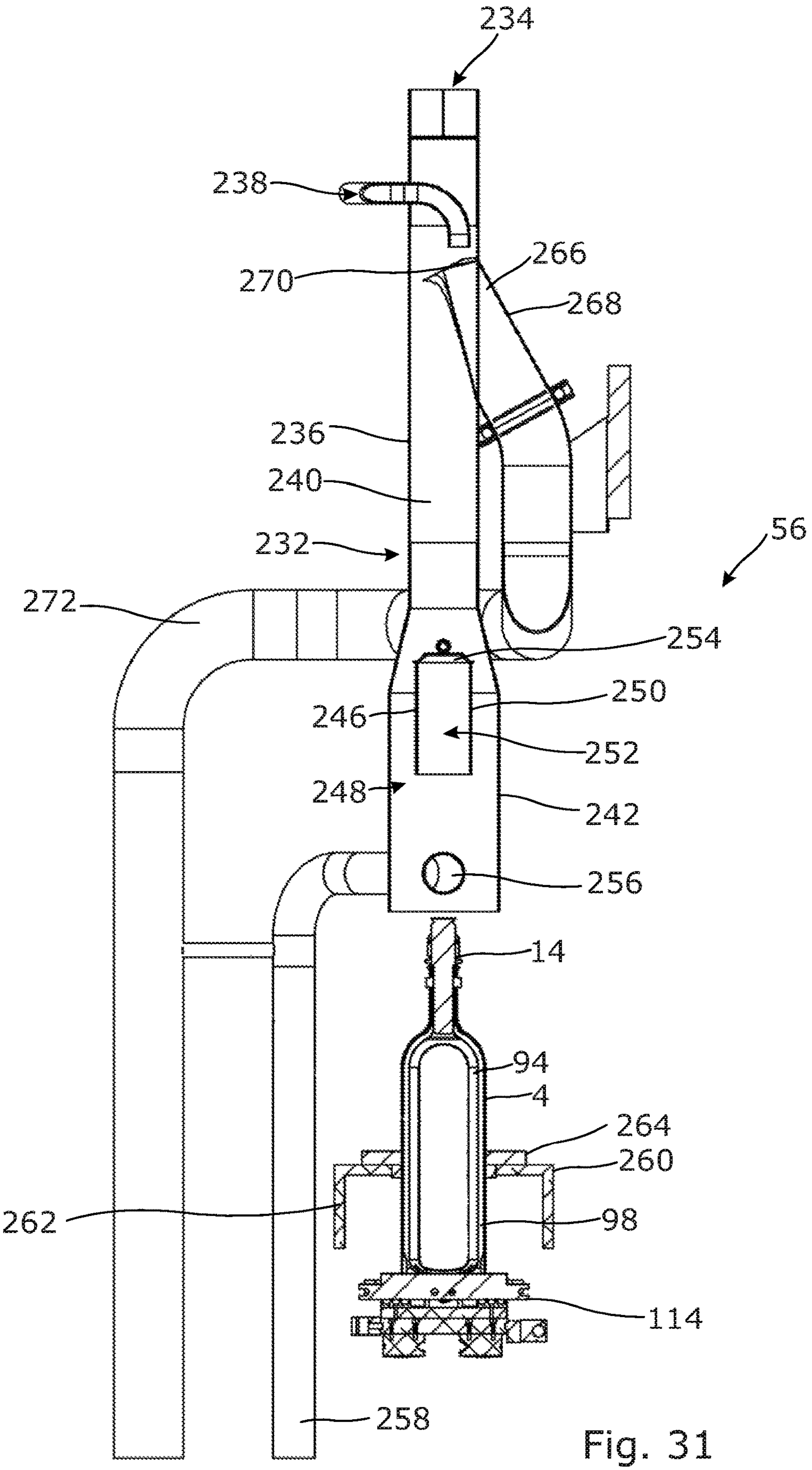
FIG. 31 is a cross-sectional view along the line XXXI-XXXI of FIG. 30.
Figure 32:
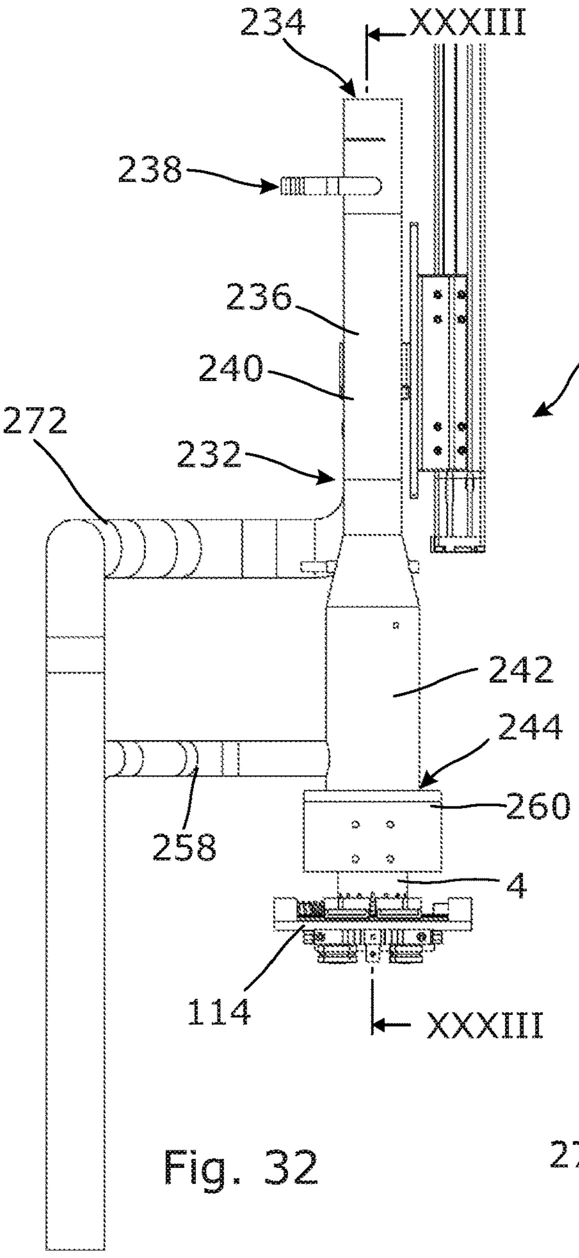
FIG. 32 is a plan view from the side of the steam application assembly of FIG. 30, showing the steam application assembly in a lowered position.
Figure 33:
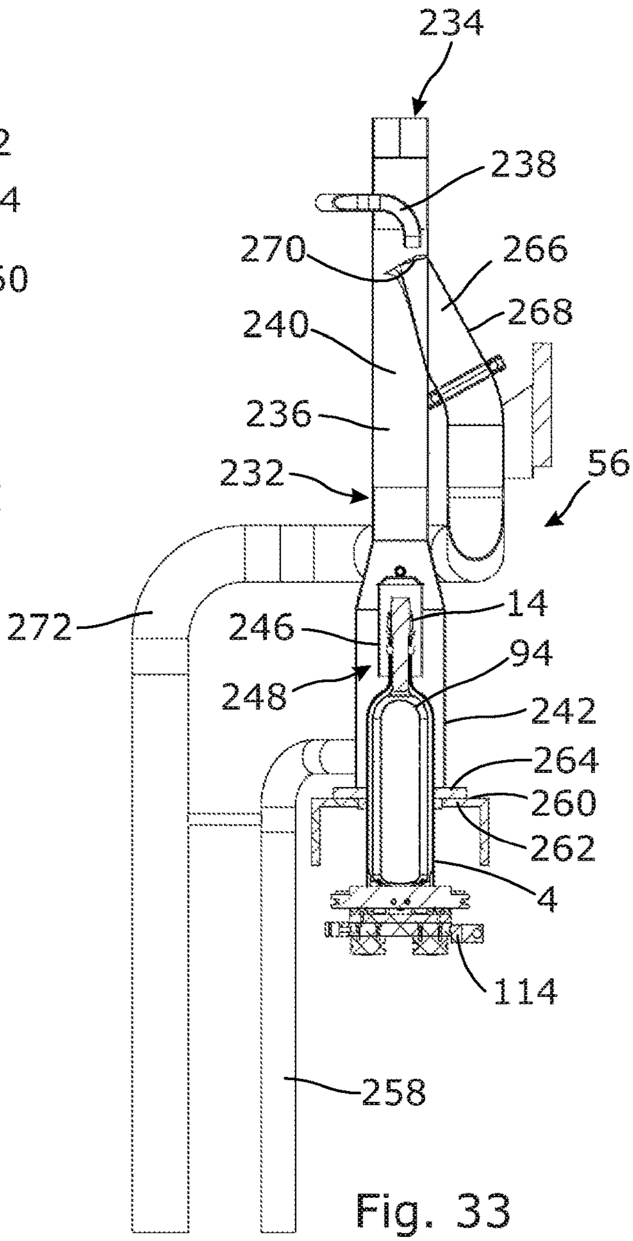
FIG. 33 is a cross-sectional view along the line XXXIII-XXXIII of FIG. 32.
Figure 34:
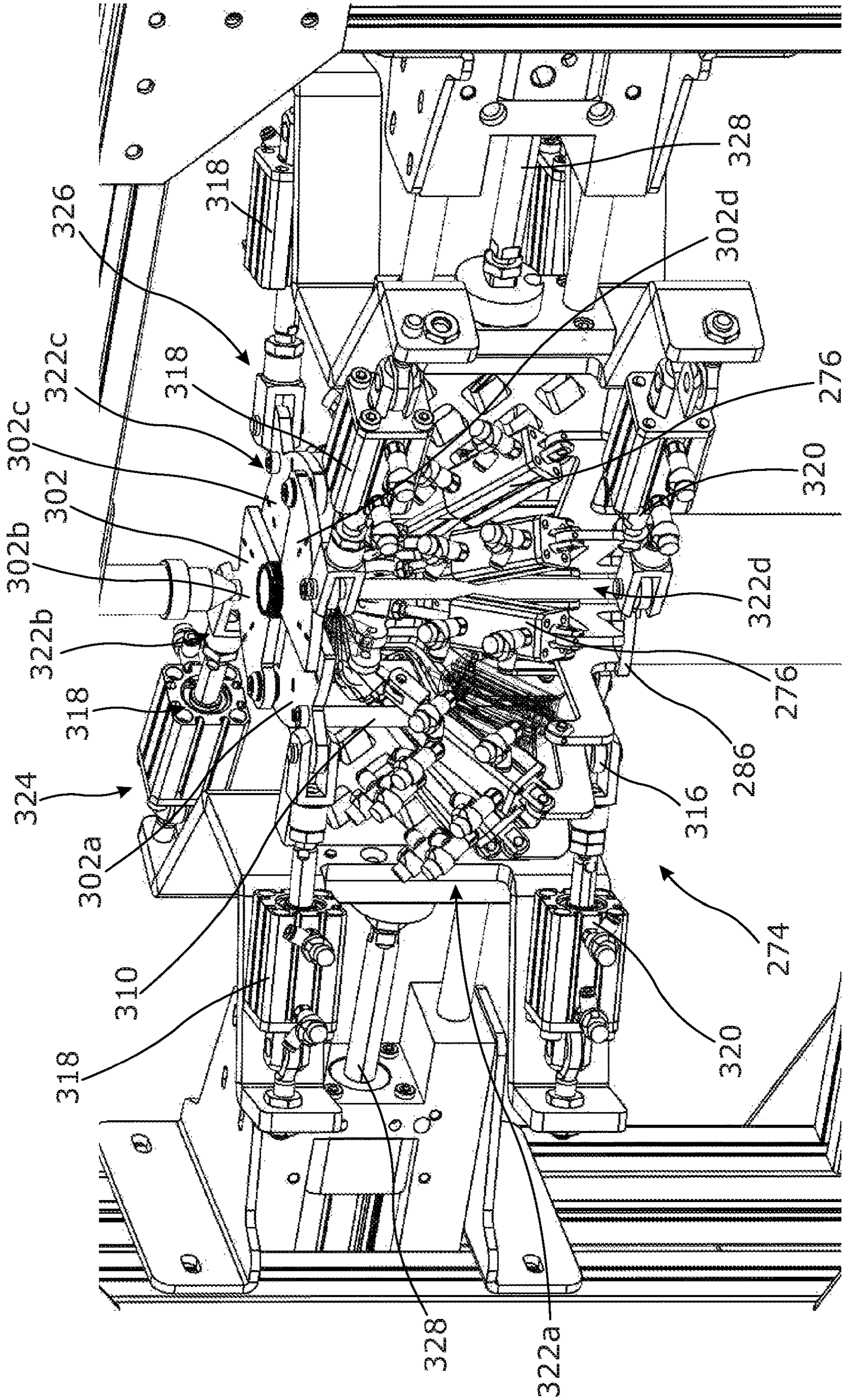
FIG. 34 is a perspective view of a second neck press assembly of the fourth station of FIG. 27.
Figure 35:
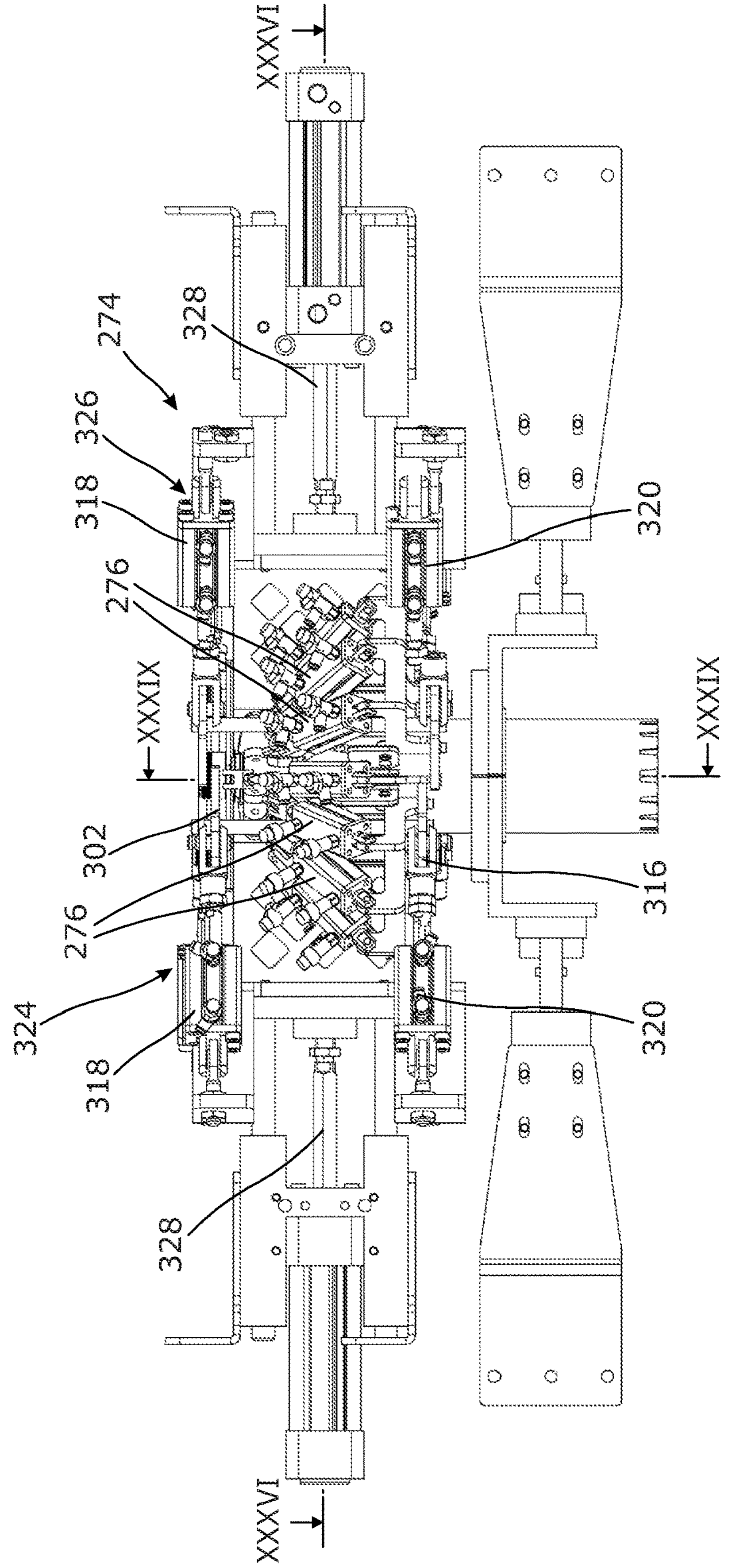
FIG. 35 is a plan view from the side of the second neck press assembly of FIG. 34.
Figure 36:
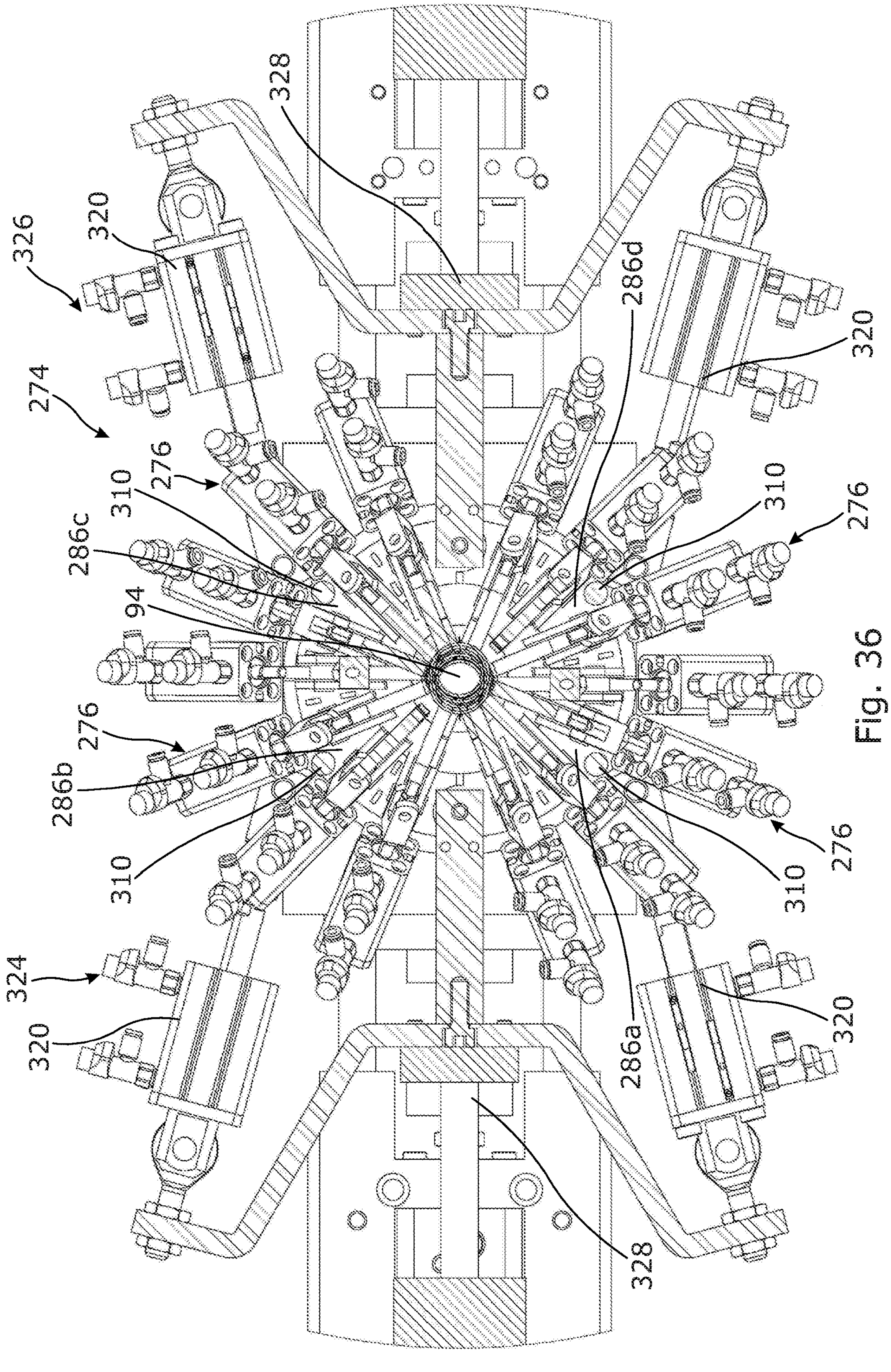
FIG. 36 is a cross-sectional view along the line XXXVI-XXXVI of FIG. 35.

The fingers 204 extend around the former 94 such that a first finger 204*a* of a first arm 196*a* of a first one of the upper press elements 192 overlaps a second finger 204*b* of a second arm 196*b* of a second one of the upper press elements 192, as illustrated in FIG. 26. In this way, the central neck panels 36 are formed completely around the neck section 100 of the former 94 and the fitment 14.

With the upper press elements 192 in the clamping position each of the lugs 17 of the fitment 14 protrude through a respective one of the apertures 39. At this point the alignment fingers 182 may be moved back to their initial, retracted positions.

It will be appreciated that during this forming of the central neck panels 36, at least a part of the upper press elements 192 press against or clamp around a part of the fitment 14. The stopper 88 that extends through the fitment 14 prevents or minimises distortion of the fitment 14 during this process. It is important to retain the shape of the fitment 14 so that any screw cap or other closure device of the bottle 2 that is to be secured to the fitment 14 will engage with the fitment 14 correctly to seal the bottle 2.

The third station 52 comprises a pair of lower, shoulder press elements 194, one disposed on each side of the former 94. Each lower press element 194 is aligned with a lower portion of a respective central neck panel 36. Each lower press element 194 is configured to press and shape regions of the central neck panel 36 around the neck section 100 and shoulder section 102 of the former 94.

In this embodiment each lower press element 194 comprises a press block or jaw 210 including a press surface 212. Each jaw 210 is moveable between a disengaged or retracted position and a clamping position. In the retracted position the lower press elements 194 are at a distance from the former 94 such that the jaws 210 are not engaged with the partially formed side wall elements 18, 20. In the clamping position the press surface 212 of each of the jaws 210 is in contact with the respective central neck panel 36 and the lower portion of the central neck panel 36 is clamped between the jaw 210 and the former 94.

Each jaw 210 comprises an upper section 214, a lower section 216, and a middle section 218 extending between the upper and lower sections 214, 216. The upper section 214 of the jaw 210 terminates at an upper face 220 of the jaw 210 and the lower section 216 terminates at a lower face 222 of the jaw 210. An axis extending between the upper and lower faces 220, 222 defines a vertical axis of the jaw 210.

The upper section 214 of the jaw 210 includes an upper portion 224 of the press surface 212. The upper portion 224 of the press surface 212 has a concave semi-cylindrical shape. A radius of curvature of the upper portion 224 of the press surface 212 is substantially the same as the radius of curvature of the outer surface of the neck section 100 of the former 94. An axis of curvature of the upper portion 224 of the press surface 212 is substantially vertical. The lower section 216 of the jaw 210 includes a lower portion 226 of the press surface 212. The lower portion 226 of the press surface 212 has a concave part-cylindrical shape. A radius of curvature of the lower portion 226 of the press surface 212 is substantially the same as the radius of curvature of the outer surface of the main body section 98 of the former 94. An axis of curvature of the lower portion 226 of the press surface 212 is substantially vertical.

The middle section 218 of the jaw 210 includes a middle portion 228 of the press surface 212. The middle portion 228 of the press surface 212 has a double curvature. The middle portion 228 of the press surface 212 has two planes of principle curvature, and these planes are perpendicular to each other. A first axis of curvature is substantially vertical and a second axis of curvature is substantially horizontal. In this way, the middle portion 228 of the press surface 212 has a semi-dome shape or truncated semi-dome shape.

The upper, lower and middle portions 224, 226, 228 of the press surface 212 are continuous with each other to form a continuous press surface 212 of the jaw 210.

In use the lower press elements 194 are moved from the retracted position to the clamping position. The lower press elements 194 are moved in a direction perpendicular to the vertical axes of the jaws 210 such that the jaws 210 move towards the neck section 100 and shoulder section 102 of the former 94. During this movement each of the press surfaces 212 contacts a respective one of the central neck panels 36. The lower press elements 194 apply a force to the central neck panels 36 and the press surfaces 212 shape the central neck panel 36 around the neck section 100 and the shoulder section 102 of the former 94. In particular, the upper portion 224 of the press surface 212 shapes a part of the central neck panel 36 around the neck section 100 of the former 94. In the clamped position a part of the central neck panel 36 is therefore clamped between the upper section 214 of the jaw 210 and the neck section 100 of the former 94. The middle portion 228 of the press surface 212 shapes a part of the central neck panel 36 around the shoulder section 102 of the former 94. In the clamped position a part of the central neck panel 36 is therefore clamped between the middle section 218 of the jaw 210 and the shoulder section 102 of the former 94. The lower section 216 of the jaw 210 shapes a proximal part of the central neck panel 36 around the main body section 98 of the former 94 and ensures a smooth transition and shaping between the main body portion 8 of the shell 4 and the shoulder portion 12 of the shell 4. In the clamped position a part of the central neck panel 36 is therefore clamped between the lower section 216 of the jaw 210 and the main body section 98 of the former 94.

It will be appreciated that the push rods 186 are aligned with a part of the shoulder section 102 of the former 94, and that the lower press elements 194 extend around and over a part of the shoulder section 102 of the former 94. Accordingly, in preferred embodiments, each of the jaws 210 of the lower press elements 194 includes an aperture or bore 230 through which a respective one of the push rods 186 extends. The dimensions of each of the bores 230 are preferably such that there is clearance between the push rods 186 and the surface of the bores 230.

In preferred embodiments the upper portion 224 of the press surface 212 has a concave substantially semi-cylindrical shape while the lower portion 226 of the press surface 212 has a concave part-cylindrical shape (i.e. less than semi-cylindrical). In this way, when the lower press elements 194 are in the clamping position, the upper sections 214 of the jaws 210 extend almost fully around the perimeter of the neck section 100 of the former 94, while the lower sections 216 of the jaws 210 only extend around a part of the perimeter of the main body section 98 of the former 94. This is because the lower section 216 of each of the jaws 210 is configured to press the proximal end region of the central neck panel 36 where the neck panel 36 meets the main body panel 34. The lower section 216 of each of the jaws 210 is therefore limited to only spanning the width of the central neck panel 36 in this region so that the jaws 210 do not apply a force to the outer neck panels 38 either side of the central neck panel 36. In contrast, the upper section 214 of each of the jaws 210 is able to extend between the outer neck panels 38 and fully shape or wrap the central neck panel 36 around the neck section 100 of the former 94.

In a preferred method of forming the central neck panels 36, the heating element 172 moves from the disengaged position to the engaged position to activate adhesive applied to the central neck panels 36. The heating element 172 then returns to the disengaged position.

The alignment fingers 182 then move from their initial positions to their inserted positions to correctly align the central neck panels 36 with the lugs 17 of the fitment 14. With the alignment fingers 182 remaining in the inserted positions, the push rods 186 are moved from their retracted positions to their extended positions to press the central neck panels 36 towards the shoulder section 102 and the neck section 100 of the former 94.

With both the alignment fingers 182 in the inserted positions and the push rods 186 in the extended positions, the upper press elements 192 and the lower press elements 194 are moved from their respective retracted positions to their respective clamping positions to shape the central neck panel 36 around the neck section 100 and the shoulder section 102 of the former 94. With the upper and lower press elements 192, 194 in the clamping positions, the alignment fingers 182 may then be moved back to their initial positions and the push rods 186 may then be returned to their retracted positions.

After a predetermined dwell time, the upper press elements 192 and the lower press elements 194 are then returned to their respective retracted positions.

The carriage assembly 114 then moves the former 94, together with the partially formed bottle 2, to the fourth station 54.

Station D

The fourth station 54, together with the associated means 56 to activate adhesive disposed on the outer neck panels 38 of the blanks 30, 32, is shown in FIGS. 27 to 39. At the fourth station 54 the outer neck panels 38 are shaped around the former 94 and a part of each of the outer neck panels 38 is adhered to the central neck panels 36.

In this embodiment the means 56 to activate adhesive disposed on the outer neck panels 38 of the blanks 30, 32 comprises apparatus 232 for delivering dry steam to the outer neck panels 38. This steam delivery apparatus 232 is shown most clearly in FIGS. 30 to 33.

The steam delivery apparatus 232 comprises a hot air inlet 234, which in this embodiment is provided at the first end of an elongate delivery conduit 236. Hot air is preferably supplied by one or more hot air blowers (not shown). A stream of hot air may, however, be supplied from any suitable system or apparatus fluidly connected to the hot air inlet 234. The hot air supply apparatus preferably provides a continuous stream of hot air to the hot air inlet 234.

The steam delivery apparatus 232 further comprises a steam inlet 238. In this embodiment the steam inlet 238 is connected to the elongate delivery conduit 236 downstream of the hot air inlet 234. A constant flow of steam is preferably created and supplied by a suitable steam generator (not shown). The steam generated by the steam generator is wet steam, and this wet steam is preferably supplied to a suitable separator device (not shown) to remove condensate or water droplets from the stream of wet steam. The separator device may be in the form of a cyclonic separator. The output from the separator device is in the form of a stream or flow of dry steam. This continuous flow of dry steam is supplied to the steam inlet 238. The dry steam is preferably low pressure steam.

The stream of dry steam entering the steam delivery apparatus 232 through the steam inlet 238 mixes with the stream or flow of hot air entering the steam delivery apparatus 232 through the hot air inlet 234 in a mixing chamber 240. In this embodiment the mixing chamber 240 is a section of the elongate delivery conduit 236 downstream of the steam inlet 238.

The combined stream of hot air and dry steam then passes into a delivery nozzle or chamber 242. In this embodiment the delivery nozzle 242 is disposed at a second end of the elongate delivery conduit 236. The delivery nozzle 242 comprises a length of tube having an internal diameter or internal dimensions greater than an outer diameter of the main body portion 8 of the bottle 2. A distal end of the delivery nozzle 242 is open and includes an annular end surface 244.

The delivery nozzle 242 further comprises a protective sheath 246 disposed in an interior volume 248 of the delivery nozzle 242. In this embodiment the protective sheath 246 comprises a tubular side wall 250 extending between first and second ends and defining a cylindrical bore 252. A cap 254 is disposed at the first end of the side wall 250 such that the first end of the bore 252 is closed. A second end of the bore 252 is an open end. An inner diameter of the tubular side wall 250 is greater than the largest dimension of the fitment 14 in a direction perpendicular to a longitudinal axis of the fitment 14. An outer diameter of the tubular side wall 250 is less than an outer diameter of the main body section 98 of the former 94. Preferably the outer diameter of the tubular side wall 250 is smaller than a diameter of a cylindrical surface defined by inner surfaces of the neck panels 36, 38 of the partially formed side wall elements 18, 20.

The protective sheath 246 is mounted in the interior volume 248 of the delivery nozzle 242 such that a longitudinal axis of the protective sheath 246 is substantially parallel to a longitudinal axis of the delivery nozzle 242. The outer diameter of the protective sheath 246 is smaller than the internal diameter of the delivery nozzle 242. As such an annular flow path is defined through the delivery nozzle 242 around the tubular side wall 250 of the protective sheath 246.

Furthermore, the protective sheath 246 is mounted in the interior volume 248 of the delivery nozzle 242 such that the second end of the protective sheath 246 lies in a plane that is spaced from a plane containing the end surface 244 of the delivery nozzle 242. A lower region of the delivery nozzle 242 is defined between the second end of the protective sheath 246 and the distal end of the delivery nozzle 242.

The protective sheath 246 may be mounted or suspended in the interior volume 248 of the delivery nozzle 242 using any suitable arrangement. The protective sheath 246 is preferably mounted or suspended such that there is no relative movement between the protective sheath 246 and the delivery nozzle 242.

A heating assembly (not shown) is preferably associated with a part of the delivery nozzle 242. The heating assembly is arranged to apply heat to a part of the delivery nozzle 242 at a distance from the distal end of the delivery nozzle 242. The heat is preferably applied to a part of the delivery nozzle 242 coincident with at least a part of the protective sheath 246, and more particularly a part of the delivery nozzle 242 coincident with a part of the side wall 250 of the protective sheath 246. The heating assembly is configured to supply heat to the delivery nozzle 242 to maintain the temperature of the interior volume of the delivery nozzle 242 at a pre-determined operating temperature. This operating temperature may be selected to remove any remaining condensate above a certain droplet size from the stream of mixed hot air and dry steam. The heating assembly may comprise a heating band that extends around the complete circumference of the delivery nozzle 242.

The delivery nozzle 242 further comprises an outlet 256 disposed in the lower region of the delivery nozzle 242. The outlet 256 is preferably disposed proximate or adjacent the distal end of the delivery nozzle 242. In this embodiment the outlet 256 is fluidly connected to a pressure balance conduit or pipe 258.

The steam delivery apparatus 232 further comprises a sealing plate 260. The sealing plate 260 is an annular plate that extends around the main body portion 8 of the shell 4. In this embodiment the sealing plate 260 extends around the main body portion 8 of the shell 4 approximately midway between the base tabs 35 of the shell 4 and the shoulder portion 12 of the shell 4. An inner radius of the annular sealing plate 260 is therefore substantially the same as an outer radius of the main body portion 8 of the shell 4. An outer radius of the annular sealing plate 260 is greater than an outer radius of the annular end surface 244 of the delivery nozzle 242.

The sealing plate 260 preferably comprises two semi-annular parts, each of the parts being moveable from a separated position to an abutted position. In the separated position a distance between the two parts of the heat resistant plate 260 is such that a former 94 and associated shell 4 can be located between the two parts, and in the abutted position the two parts abut each other so as to form a complete annular sealing plate 260 extending around the complete circumference of the main body portion 8 of the shell 4.

In this embodiment the sealing plate 260 comprises a support plate 262 and a heat resistant layer 264. The heat resistant layer 264 may comprise a foam material.

A diverter 266 is disposed downstream of the steam inlet 238. In this embodiment the diverter comprises a conduit 268 having a first end 270 disposed in the elongate delivery conduit 236 downstream of the steam inlet 238. A second end of the diverter conduit 236 is fluidly connected to a waste conduit or exhaust conduit 272. The diverter conduit 236 may be continuous with the exhaust conduit 272. The diverter 266 has a delivery configuration and an exhaust configuration. In the delivery configuration the stream of dry steam entering the steam delivery apparatus 232 through the steam inlet 238 mixes with the stream of hot air and moves through the steam delivery apparatus 232 to the delivery nozzle 242.

In the exhaust configuration the stream of dry steam flows into the diverter conduit 268 and into the exhaust conduit 272. The stream of dry steam then flows out of the exhaust conduit 272 and is exhausted into a waste tank or other suitable receptacle (not shown).

In preferred embodiments the diverter 266 comprises a valve, which may be a bypass valve. The valve may be a swivel valve.

In operation, a former 94 and associated shell 4 and pouch assembly 16 is disposed between the two parts of the sealing plate 260 with the two parts in their separated position.

The two parts are then moved into the abutted position to surround the shell 4.

Initially the diverter 266 is in the exhaust configuration and the constant flow of dry steam entering the steam delivery apparatus 232 through the steam inlet 238 is exhausted to the waste tank. The delivery nozzle 242 is moved to bring the annular end surface 244 of the delivery nozzle 242 into contact with the sealing plate 260 (and in particular a surface of the heat resistant layer 264). Preferably the annular end surface 244 contacts a surface of the sealing plate 260 to form a pressure seal between the delivery nozzle 242 and the sealing plate 260 (and in particular the heat resistant layer 264).

With the delivery nozzle 242 in contact with the sealing plate 260 the protective sheath 246 is disposed around the fitment 14 of the pouch assembly 16. As the outer neck panels 38 have not yet been formed, the outer neck panels 38 extend outside the protective sheath 246. In particular the outer neck panels 38 are disposed in the annular flow path defined through the delivery nozzle 242 around the tubular side wall 250 of the protective sheath 246. The shoulder portion 102 of the former 94 is disposed in the lower region of the delivery nozzle 242 between the second end of the protective sheath 246 and the distal end of the delivery nozzle 242.

Once a pressure seal has been made between the delivery nozzle 242 and the sealing plate 260, the diverter 266 is moved to the delivery configuration. The stream of dry steam then mixes with the stream of hot air and flows to the delivery nozzle 242. The dry steam mixed with the hot air flows through the annular flow path or gap defined through the delivery nozzle 242 around the tubular side wall 250 of the protective sheath 246. In this way the outer neck panels 38 of the shell 4 are exposed to a flow of dry steam and hot air.

The sealing plate 260 substantially prevents the dry steam and hot air escaping through the distal end of the delivery nozzle 242. The mixture of dry steam and hot air then flows through the outlet 256 of the steam delivery apparatus 232. In this embodiment the mixture of dry steam and hot air flows through the pressure balance conduit 258 and into a waste tank or other suitable receptacle (not shown).

The exposure of the outer neck panels 38 of the shell 4 to the flow of dry steam and hot air acts to both re-activate the adhesive applied to the outer neck panels 38 and to increase the moisture level in the paperboard of the outer neck panels 38 to make these easier to form.

The protective sheath 246 surrounds and protects the fitment 14 from the hot air and dry steam. The fitment 14 will typically be made of a polymeric material that may warp or distort if exposed to the mixture of hot air and dry steam. Additionally, the central neck panels 36, which have already been formed at the third station 52 of the machine 40 are also surrounded and protected by the protective sheath 246. This means that the central neck panels 36 are not exposed to the hot air and dry steam and will retain their shape and remain adhered to the fitment 14.

After a sufficient and predetermined steam application time, the diverter 266 is returned to the exhaust configuration. The delivery nozzle 242 is then moved away from the sealing plate 260. An outer neck press mechanism 274 of the fourth station 54 then shapes and forms the outer neck panels 38 around the former 94.

The outer neck press mechanism 274 of the fourth station 54 is shown most clearly in FIGS. 34 to 39.

The outer neck press mechanism 274 comprises a plurality of clamp units 276 arranged to press and shape the outer neck panels 38 of the shell 4 around the neck section 100 of the former 94. The clamp units 276 are arranged around the former 94 in a generally circular array, as shown most clearly in FIG. 36. Each clamp unit 276 comprises a support arm 278, a lower, shoulder press element 280, an upper, neck press element 282 and an actuator 284, as shown most clearly in FIG. 38.

In this embodiment the outer neck press mechanism 274 comprises four sets of clamp units 276. Each set of clamp units 276 is mounted to a support plate 286. Each support plate 286 has a quarter annulus shape, and has a radially inner edge 288, a radially outer edge 290 and two end edges 292. A radius of curvature of the radially inner edge 288 is substantially equal to a radius of curvature of an outer surface of the main body portion 8 of the shell 4.

Each set of clamp units 276 comprises a plurality of clamp units 276, in this embodiment three or four clamp units 276. The support arm 278 of each of the clamp units 276 is mounted to an upper surface of each support plate 286. The support arms 278 are spaced circumferentially around the support plate 286 between the two end edges 292. A first end 294 of each of the support arms 278 is disposed at the support plate 286 and the support arms 278 project radially outwardly from the support plate 286 so that a second end 296 of each support arm 278 is at a distance from the support plate 286.

The lower press element 280 is pivotally secured to the first end 294 of each support arm 278. Each lower press element 280 comprises a press surface 298. In this embodiment the lower press element 280 is in the form of a plate and the press surface 298 is provided by an edge of the plate. The press surface 298 has a curved shape with a profile that substantially matches the profile of a first part of the shoulder section 102 of the former 94. This first part of the shoulder section 102 is preferably a lower part of the shoulder section 102 adjacent the main body section 98 of the former 94.

The upper press element 282 is pivotally secured to the lower press element 280. An axis of the pivotal connection between the support arm 278 and the lower press element 280 is preferably parallel to but spaced apart or offset from an axis of the pivotal connection between the upper press element 282 and the lower press element 280. The upper press element 282 comprises a press surface 300. In this embodiment the upper press element 282 is in the form of a plate and the press surface 300 is provided by an edge of the plate. The press surface 300 comprises a first substantially straight or planar portion 302 and a second curved portion 304. The curved portion 304 has a profile that substantially matches the profile of a second part of the shoulder section 102 of the former 94. This second part of the shoulder section 102 is preferably an upper part of the shoulder section 102 adjacent the neck section 100 of the former 94.

The actuator 284 is connected between the support arm 278 and the upper press element 282. In this embodiment the actuator 284 is a linear actuator. A first end of the actuator 284 is pivotally connected to the second end of the support arm 278 and a second end of the actuator 284 is pivotally connected to the upper press element 282. An axis of the pivotal connection between the actuator 284 and the upper press element 282 is preferably parallel to but spaced apart or offset from an axis of the pivotal connection between the upper press element 282 and the lower press element 280. The actuator 284 is arranged to move the upper and lower press elements 282, 280 between a first configuration and a second configuration.

The outer neck press mechanism 274 further comprises a plurality of alignment plates 302. Each alignment plate 302 has a quarter annulus shape, and has a radially inner edge 304, a radially outer edge 306 and two end edges 308. In this embodiment the radius of curvature of the radially inner edge 304 is substantially less that a radius of curvature of the radially outer edge 306. Furthermore, a radial distance between the radially inner edge 304 and the radially outer edge 306 of the alignment plate 302 is preferably greater than a radial distance between the radially inner edge 288 and the radially outer edge 290 of the support plate 286. The radius of curvature of the radially inner edge 304 is substantially equal to a radius of curvature of an outer surface of a part of the fitment 14.

A link 310 extends between and connects each one of the alignment plates 302 to a respective one of the support plates 286. In this embodiment the link 310 comprises a rod member 312. A first end of the rod member 312 is secured to the alignment plate 302 proximate the radially outer edge 306 and a second end of the rod member 312 is secured to the support plate 286 proximate the radially outer edge 290.

In this embodiment the link 310 further comprises an upper arm 314 that extends radially outwardly from the radially outer edge 306 of the alignment plate 302 and a lower arm 316 that extends radially outwardly from the radially outer edge 290 of the support plate 286.

A main actuator is connected to each of the links 310 and is arranged to move the alignment plate 302 and support plate 286 between a disengaged position and an engaged position. In this embodiment a first, upper main actuator 318 is connected to the upper arm 314 and a second, lower main actuator 320 is connected to the lower arm 316. The first and second main actuators 318, 320 act in unison to move the alignment plate 302 and support plate 286 between the disengaged position and the engaged position.

Each alignment plate 302 is therefore linked to one of the support plates 286 and the associated set of clamp units 276. Each linked alignment plate 302, support plate 286 and set of clamp units 276 forms an outer neck press assembly 322. In this embodiment there are four outer neck press assemblies 322.

A first one of the outer neck press assemblies 322*a* is pivotally connected to a second one of the outer neck press assemblies 322*b*. In particular a first alignment plate 302*a* is pivotally connected to a second alignment plate 302*b*, and a first support plate 286*a* is pivotally connected to a second support plate 286*b*. The pivotal connection between the first alignment plate 302*a* and the second alignment plate 302*b* is proximate a first end edge 308 of the first alignment plate 302*a* and a second end edge 308 of the second alignment plate 302*b*. Furthermore, the pivotal connection between the first alignment plate 302*a* and the second alignment plate 302*b* is proximate the radially outer edges 306 of the alignment plates 302. Similarly, the pivotal connection between the first support plate 286*a* and the second support plate 286*b* is proximate a first end edge 292 of the first support plate 286*a* and a second end edge 292 of the second support plate 286*b*. Furthermore, the pivotal connection between the first support plate 286*a* and the second support plate 286*b* is proximate the radially outer edges 290 of the support plates 286.

In a similar manner, a third one of the outer neck press assemblies 322*c* is pivotally connected to a fourth one of the outer neck press assemblies 322*d*.

The pivotal connection between the first and second outer neck press assemblies 322*a*, 322*b* facilitates movement of the first and second outer neck press assemblies 322*a*, 322*b* between an open configuration and a closed configuration upon operation of the main actuators 318, 320 connected to the first and second outer neck press assemblies 322*a*, 322*b*. Similarly, the pivotal connection between the third and fourth outer neck press assemblies 322*c*, 322*d* facilitates movement of the third and fourth outer neck press assemblies 322*c*, 322*d* between an open configuration and a closed configuration upon operation of the main actuators 318, 320 connected to the third and fourth outer neck press assemblies 322*c*, 322*d*.

In the open configuration a distance between radially inner edges 304 of the pivotally connected alignment plates 302 is greater than in the closed configuration. Likewise, in the open configuration a distance between radially inner edges 288 of the pivotally connected support plates 286 is greater than in the closed configuration.

The first and second outer neck press assemblies 322*a*, 322*b* together form a first outer neck press system 324, and the third and fourth outer neck press assemblies 322*c*, 322*d* together form a second outer neck press system 326. In this embodiment each of the first and second outer neck press assemblies 322*a*, 322*b* comprises seven clamp units 276. Three clamp units 276 are mounted to each of the first and third support plates 286*a*, 286*c*, and four clamp units are mounted to each of the second and fourth support plates 286*b*, 286*d*.

The outer neck press mechanism 274 further comprises a drive mechanism 328 connected to each of the first and second outer neck press systems 324, 326. The drive mechanisms 328 are configured to move the first and second outer neck press systems 324, 326 away from each other into a retracted position and towards each other into an engaged position.

In use, the carriage assembly 114 and former 94 are positioned between the two outer neck press systems 324, 326 with the outer neck press systems 324, 326 in the retracted position. The steam delivery apparatus 232 is then actuated to apply hot air and dry steam to the outer neck panels 38 as described above. Following retraction or movement of the steam delivery apparatus 232 away from the former 94, the drive mechanisms 328 are then operated to move the first and second outer neck press systems 324, 326 towards the former 94 into the engaged position.

The main actuators 318, 320 of the first outer neck press system 324 are actuated to move the first and second outer neck press assemblies 322*a*, 322*b* into the closed configuration. The main actuators 318, 320 of the second outer neck press system 326 are actuated to move the third and fourth outer neck press assemblies 322*c*, 322*d* into the closed configuration. Preferably the main actuators 318, 320 of the first outer neck press system 324 and the main actuators 318, 320 of the second outer neck press system 326 are actuated simultaneously. In the closed configuration, the radially inner edges 304 of the alignment plates 302 are in contact with a part of the fitment 14 and the radially inner edges 288 of the support plates 286 are in contact with an outer surface of the main body portion 8 of the shell 4.

Contact between the alignment plates 302 and the fitment 14 and between the support plates 286 and the main body portion 8 of the shell 4 retains the former 94, shell 4 and fitment 14 in a fixed position and in the correct alignment with the clamp units 276. The stopper 88 disposed in the fitment 14 prevents distortion of the fitment 14 due to forces applied to the fitment by the alignment plates 302.

With the first and second outer neck press systems 324, 326 in the engaged position, and the first, second, third and fourth outer neck press assemblies 322 in the closed configuration, a first end edge 308 of the first alignment plate 302*a* is adjacent and substantially aligned with a second end edge 308 of the second alignment plate 302*b*, a first end edge 308 of the second alignment plate 302*b* is adjacent and substantially aligned with a second end edge 308 of the third alignment plate 302*c*, a first end edge 308 of the third alignment plate 302*c* is adjacent and substantially aligned with a second end edge 308 of the fourth alignment plate 302*d*, and a first end edge 308 of the fourth alignment plate 302*d* is adjacent and substantially aligned with a second end edge 308 of the first alignment plate 302*a*. In this way, the alignment plates 302 extend fully around the fitment 14.

Similarly, with the first and second outer neck press systems 324, 326 in the engaged position, and the first, second, third and fourth outer neck press assemblies 322 in the closed configuration, a first end edge 292 of the first support plate 286*a* is adjacent and substantially aligned with a second end edge 292 of the second alignment plate 286*b*, a first end edge 292 of the second support plate 286*b* is adjacent and substantially aligned with a second end edge 292 of the third alignment plate 286*c*, a first end edge 292 of the third support plate 286*c* is adjacent and substantially aligned with a second end edge 292 of the fourth alignment plate 286*d*, and a first end edge 292 of the fourth support plate 286*d* is adjacent and substantially aligned with a second end edge 292 of the first alignment plate 286*a*. In this way, the support plates 286 extend fully around the main body portion 8 of the shell 4.

As the outer neck press assemblies 322 are moved into the closed configuration, the clamp units 276, and in particular the upper and lower press elements 282, 280, are in their first configuration. In this first configuration the upper and lower press elements 282, 280 are not engaged with the outer neck panels 38 of the partially formed side wall elements 18, 20.

The actuators 284 of each of the clamp units 276 are then operated to move the upper and lower press elements 282, 280 into their second configuration. As the upper and lower press elements 282, 280 are moved towards the second configuration, the upper and lower press elements 282, 280 engage with the outer neck panels 38 and press the outer neck panels 38 towards and against the shoulder portion 102 and neck portion 100 of the former 94. The clamp units 276 mounted to the first support plate 286*a* engage with a first one of the outer neck panels 38 of the first side wall element 18, the clamp units 276 mounted to the second support plate 286*b* engage with a second one of the outer neck panels 38 of the first side wall element 18, the clamp units 276 mounted to the third support plate 286*c* engage with a first one of the outer neck panels 38 of the second side wall element 20, and the clamp units 276 mounted to the fourth support plate 286*d* engage with a second one of the outer neck panels 38 of the second side wall element 20.

In the second configuration a lower portion of the outer neck panel 38 is pressed or clamped between the lower press element 280 and the shoulder section 102 of the former 94, and an upper portion of the outer neck panel 38 is pressed or clamped between the upper press element 282 and the neck portion 100 of the former 94.

The actuator 284 and the pivotal connection between the upper and lower press elements 282, 280 are preferably arranged such that during movement of the upper and lower press elements 282, 280 into the second configuration the lower press element 280 applies a force to the outer neck panel 38 first so as to deflect the outer neck panel 38 around the shoulder section 102 and towards the neck section 100 of the former 94. The upper press element 282 then subsequently applies a force to the outer neck panel 38 to shape the outer neck panel 38 fully around the shoulder section 102 and neck section 100 of the former 94.

Figure 37:
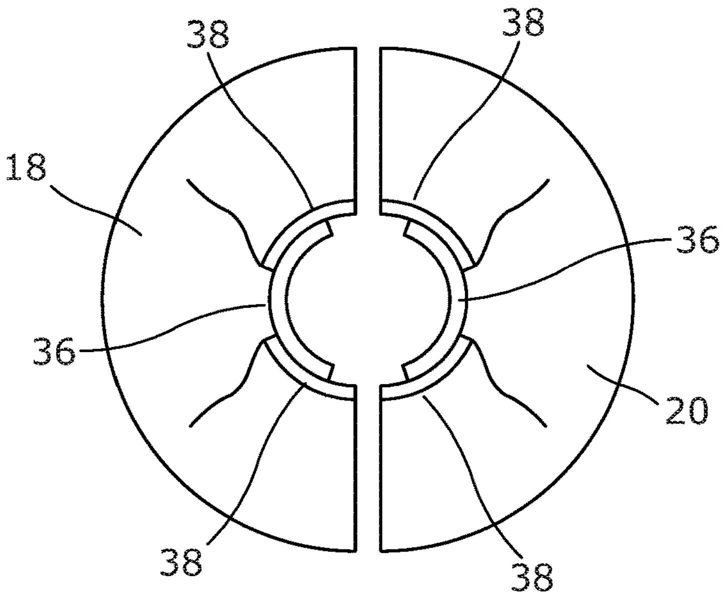
FIG. 37 illustrates the method step of pressing outer neck panels of the side wall elements to form the neck portion of the side wall of the shell (two side wall elements shown separated for clarity)
Figure 38:
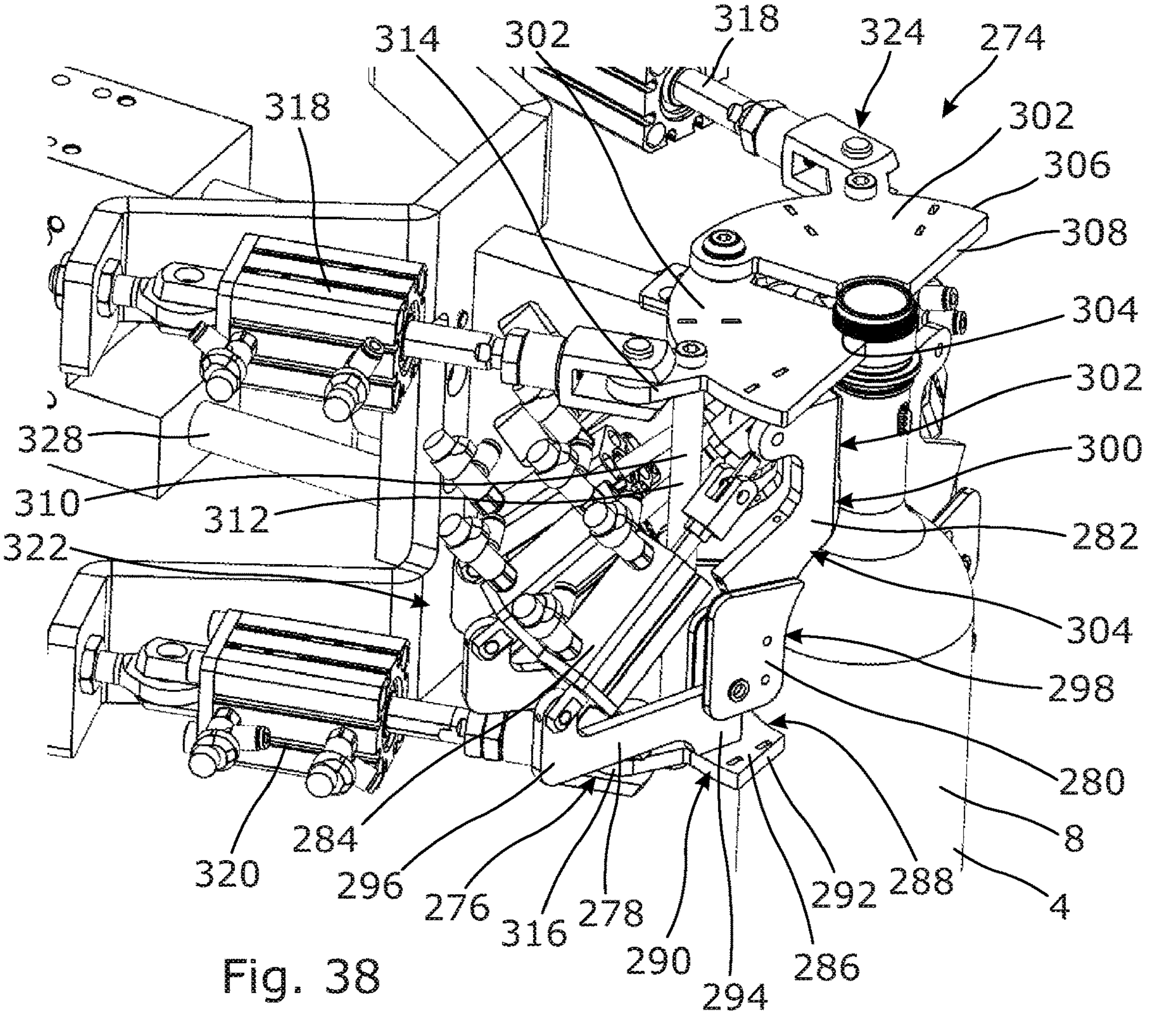
FIG. 38 is a perspective view of a part of the second neck press assembly of FIG. 34.
Figure 39:
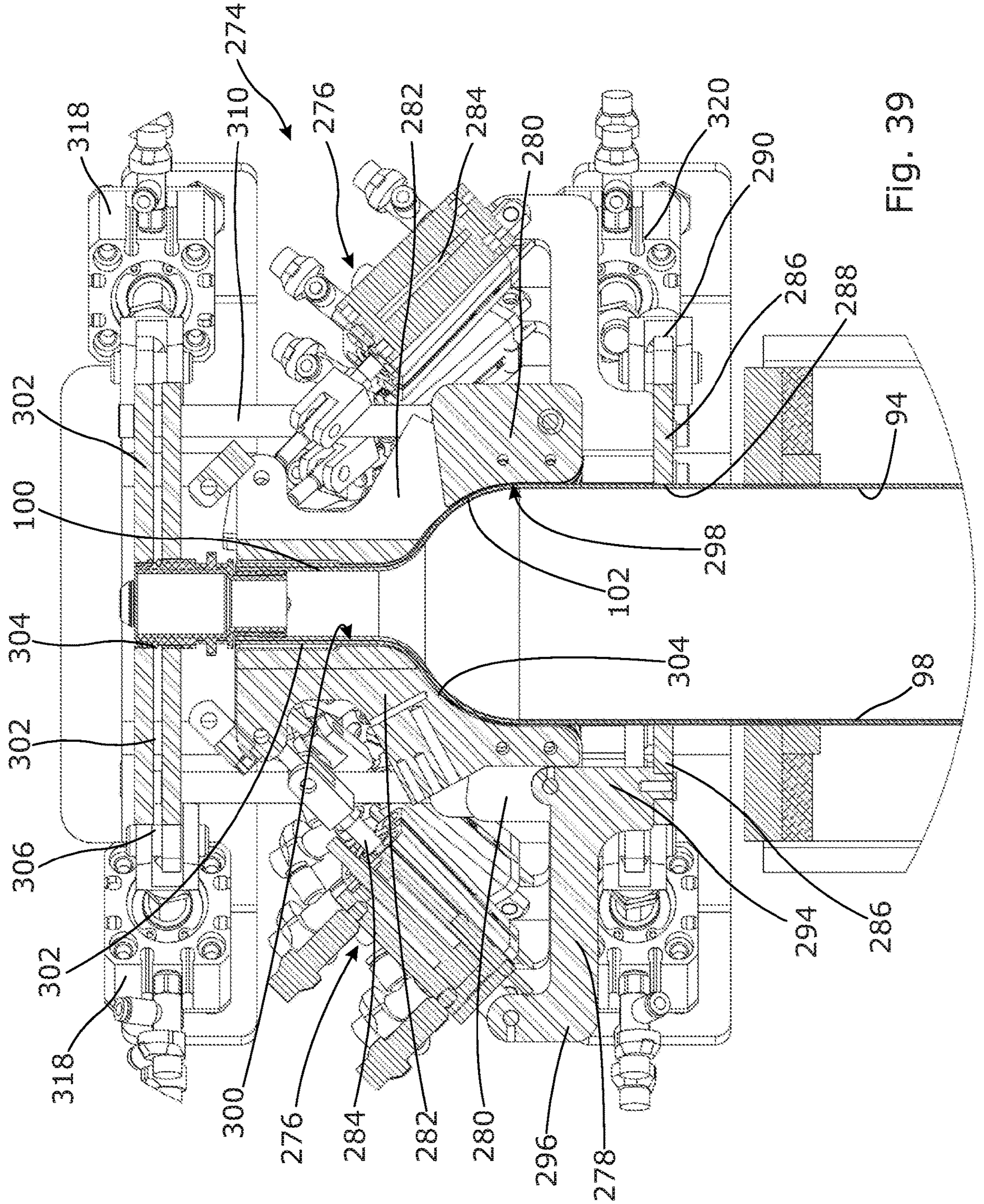
FIG. 39 is a cross-sectional view along the line XXXIX-XXXIX of FIG. 35.

As illustrated in FIG. 37, the outer neck panels 38 of each of the side wall elements 18, 20 overlap the respective central neck panel 36. Furthermore, the neck tabs 37 of the outer neck panels 38 of the second side wall element 20 overlap the outer neck panels 38 of the first side wall element 18 (not shown in FIG. 37) to form the complete neck portion 10 of the shell 4. Accordingly, the actuators 284 of each of the clamp units 276 may be operated in a specific sequence, rather than simultaneously. The sequence of operation of the actuators 284 may permit the outer neck panels 38 of the first side wall element 18 to be pressed first, followed by the outer neck panels 38 of the second side wall element 20, so that the neck tabs 37 of the outer neck panels 38 of the second side wall element 20 overlie the outer neck panels 38 of the first side wall element 18.

In this embodiment a fourth clamp unit 276*d* mounted to each of the second and fourth support plates 286*b*, 286*d* is disposed diametrically opposite each other when the outer neck press systems 324, 326 are in the engaged position and the outer neck press assemblies 322 are in the closed configuration. Each of the fourth clamp units 276*d* mounted to the second and fourth support plates 286*b*, 286*d* is also aligned with a respective edge of each of the outer neck panels 38 of the first side wall element 18 and a respective one of the neck tabs 37 of the second side wall element 20 when the outer neck panels 38 have been pressed to form the neck portion 10 of the shell 4.

A preferred sequence of operation is therefore:

(i) all of the clamp units 276 of the first outer neck press assembly 322*a*, all of the clamp units 276 of the second outer neck press assembly 322*b*, and the fourth clamp unit 276*d* of the fourth outer neck press assembly 322*d* are operated to move into the second configuration to press and shape the outer neck panels 38 of the first side wall element 18, such that the outer neck panels 38 of the first side wall element 18 adhere to the central neck panel 36 of the first side wall element 18;

(ii) the fourth clamp unit 276*d* of the second outer neck press assembly 322*b* and the fourth clamp unit 276*d* of the fourth outer neck press assembly 322*d* are moved back to the first configuration, while the clamp units 276 of the first outer neck press assembly 322*a* and the remaining three clamp units 276 of the second outer neck press assembly 322*b* are maintained in the second configuration to continue to apply a force to the outer neck panels 38 of the first side wall element 18;

(iii) all of the clamp units 276 of the third outer neck press assembly 322*c*, all of the clamp units 276 of the fourth outer neck press assembly 322*d*, and the fourth clamp unit 276*d* of the second outer neck press assembly 322*c* are operated to move into the second configuration to press and shape the outer neck panels 38 of the second side wall element 20, such that the outer neck panels 38 of the second side wall element 20 adhere to the central neck panel 36 of the second side wall element 20 and to the regions of overlap of the outer neck panels 38 of the first side wall element 18.

In the first step of this sequence of operation, therefore, the fourth clamp units 276*d* apply a force to the outer neck panels 38 of the first side wall element 18, and in the third step of the sequence of operation the fourth clamp units 276*d* apply a force to the neck tabs 37 of the outer neck panels 38 of the second side wall element 20, such that these neck tabs 37 overlap, are pressed against and are adhered to the outer neck panels 38 of the first side wall element 18.

After a predetermined dwell time, sufficient to allow adhesion between the outer neck panels 38 and the central neck panels 36 to occur, the clamp units 276 return to the first configuration. Subsequently the outer neck press assemblies 322 return to their open configuration and the outer neck press systems 324, 326 return to the retracted position.

The carriage assembly 114 then moves the former 94, together with the partially formed bottle 2, to the fifth station 58.

Station E

At the fifth station 58 the central neck panels 36 and the outer neck panels 38 are hot pressed. This provides additional shaping of the central neck panels 36 and in particular the outer neck panels 38 to form the final shape of the neck portion 10 of the bottle 2.

The fifth station 58 comprises a shaping assembly 330 including four shaping units 332.

Figure 40:
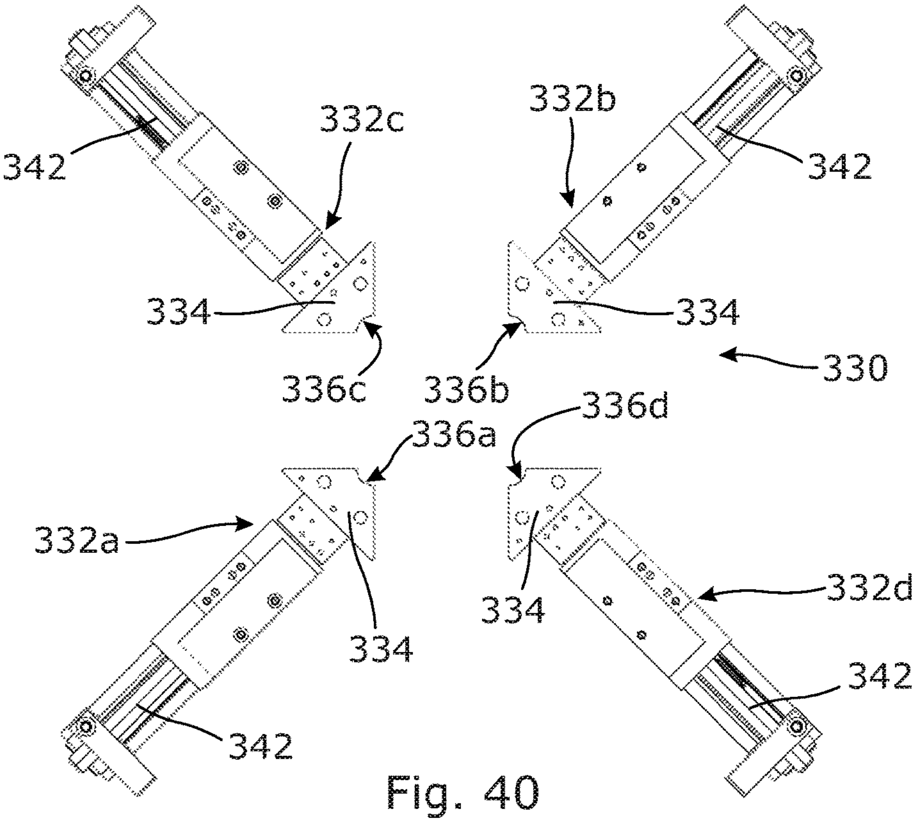
FIG. 40 is a plan view of four shaping units of a fifth station (Station E) of a machine for manufacturing a bottle according to a preferred embodiment of the present invention.
Figure 41:
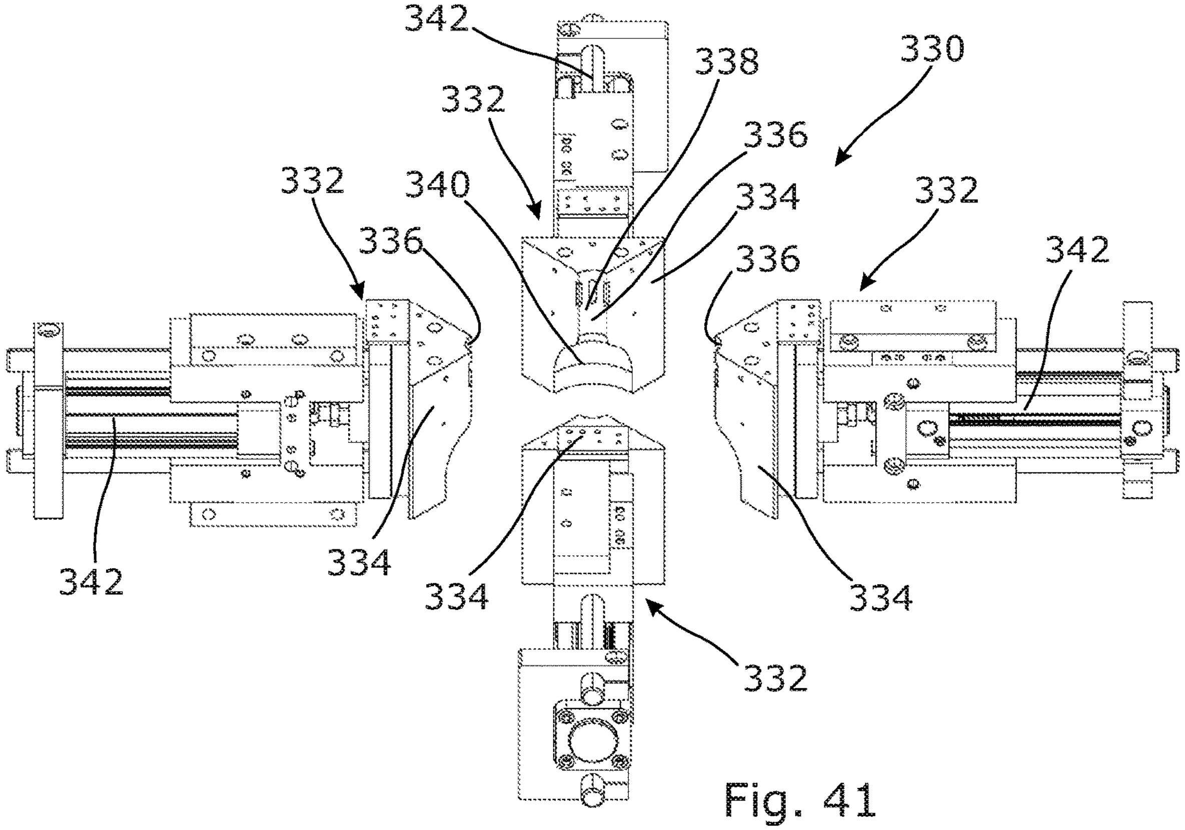
FIG. 41 is a perspective view of the shaping units of FIG. 40.

The four shaping units 332 are shown in FIGS. 40 and 41. In this embodiment the shaping units 332 are identical.

Each of the shaping units 332 comprises a shaping block 334 including a shaping surface 336. The shaping surface 336 comprises a first, upper portion 338 having a concave, part-cylindrical shape and a second, lower portion 340 having a concave, part-dome shape or truncated part-dome shape. The second lower portion 340 extends from and is continuous with the first upper portion 338 to form the shaping surface 336. The first upper portion 338 corresponds in shape and profile to the shape and profile of a part of the neck portion 10 of the bottle 2. The second lower portion 340 corresponds in shape and profile to the shape and profile of a part of the shoulder portion 12 of the bottle 2. The shaping blocks 334 are preferably made of a suitable metal material.

The four shaping units 332 are arranged such that a first shaping unit 332*a* is opposite a second shaping unit 332*b* and the shaping surface 336*a* of the first shaping unit 332*a* faces the shaping surface 336*b* of the second shaping unit 332*b*, and a third shaping unit 332*c* is opposite a fourth shaping unit 332*d*, and the shaping surface 336*c* of the third shaping unit 332*c* faces the shaping surface 336*d* of the fourth shaping unit 332*d*. The first, upper portion 338 of the shaping surface 336*a* of the first shaping unit 332*a* opposes and is aligned with the first, upper portion 338 of the shaping surface 336*b* of the second shaping unit 332*b*. The first, upper portion 338 of the shaping surface 336*c* of the third shaping unit 332*c* opposes and is aligned with the first, upper portion 338 of the shaping surface 336*d* of the fourth shaping unit 332*d*. The second, lower portion 340 of the shaping surface 336*a* of the first shaping unit 332*a* opposes and is aligned with the second, lower portion 340 of the shaping surface 336*b* of the second shaping unit 332*b*. The second, lower portion 340 of the shaping surface 336*c* of the third shaping unit 332*c* opposes and is aligned with the second, lower portion 340 of the shaping surface 336*d* of the fourth shaping unit 332*d*.

Each of the shaping units 332 further comprises a mechanism 342 to move the shaping block 334 between a retracted position and an extended position. In this embodiment the mechanism 342 comprises a linear actuator.

Each of the shaping units 332 further comprises a heating element (not shown) to heat the shaping block 334.

In use, the shaping blocks 334 are initially in their retracted positions, such that there is a gap between each of the shaping blocks 334. The carriage assembly 114 enters the fifth station 58 and positions the former 94 (and associated partially formed shell 4) centrally between the four shaping blocks 334. The shaping blocks 334 are aligned with the neck panels 36, 38 of the shell 4.

The shaping blocks 334 are then moved into the extended position. In the extended position, each of the shaping blocks 334 contacts and applies a force to a part of the shoulder and neck regions 12, 10 of the shell 4. In particular, the first, upper portion 338 of each shaping surface 336 contacts and applies a force to a part of the neck region 10 of the shell 4, and the second, lower portion 340 of each shaping surface 336 contacts and applies a force to a part of the shoulder region 12 of the shell 4. In the extended position neighbouring shaping blocks 334 may contact each other to fully surround the neck and shoulder regions 10, 12 of the shell 4.

The heat of the shaping blocks 334 and the profile of the shaping surface 336 further presses and shapes the neck panels 36, 38 of the shell 4 to form the final shape of the neck region 10 of the bottle 2.

After a pre-determined length of time the shaping blocks 334 are returned to their retracted positions. The carriage assembly 114 then moves the former 94, together with the partially formed bottle 2, to the sixth station 60.

Station F

At the sixth station 60 the central neck panels 36 and the outer neck panels 38 are cold pressed. This ensures that the outer neck panels 38 are firmly adhered to the central neck panels 36 and that the central neck panels 36 and the outer neck panels 38 retain their final shape.

The sixth station 60 comprises a shaping assembly including four shaping units. The four shaping units are substantially identical to the shaping units 332 of the fifth station 58, except that the four shaping units of the sixth station do not include a heating element. Shaping blocks of the four shaping units of the sixth station 60 therefore remain at ambient temperature. All other features of the four shaping units are substantially identical to the shaping units 332 of the fifth station 58.

In use, the shaping blocks are initially in their retracted positions, such that there is a gap between each of the shaping blocks. The carriage assembly enters the sixth station 60 and positions the former 94 (and associated partially formed shell 4) centrally between the four shaping blocks. The shaping blocks are aligned with the neck panels 36, 38 of the shell 4.

The shaping blocks are then moved into the extended position. In the extended position, each of the shaping blocks contacts and applies a force to a part of the shoulder and neck regions 12, 10 of the shell 4. In particular, a first, upper portion of a shaping surface of each shaping block contacts and applies a force to a part of the neck region 10 of the shell 4, and a second, lower portion of each shaping surface contacts and applies a force to a part of the shoulder region 12 of the shell 4. In the extended position neighbouring shaping blocks may contact each other to fully surround the neck and shoulder regions 10, 12 of the shell 4.

The neck panels 36, 38 are pressed for a pre-determined length of time to ensure that the adhesive of the neck panels 36, 38 is cured and that sufficient heat has been removed from the neck panels 36, 38. After the pre-determined length of time the shaping blocks are returned to their retracted positions.

The sixth station 60 preferably further comprises a mechanism to remove the stopper 88 from the fitment 14 of the pouch assembly 16. This mechanism may comprise means to grip or otherwise engage the stopper 88 and means to apply a force to the stopper to remove the stopper 88 from the fitment 14.

The carriage assembly 114 then moves the former 94, together with the partially formed bottle 2, out of the sixth station 60.

Station G

At the seventh station 62 of the machine 40 the now fully formed side wall 24 of the shell 4 is removed from the former 94 ready for insertion of the base element 22.

Figure 12:
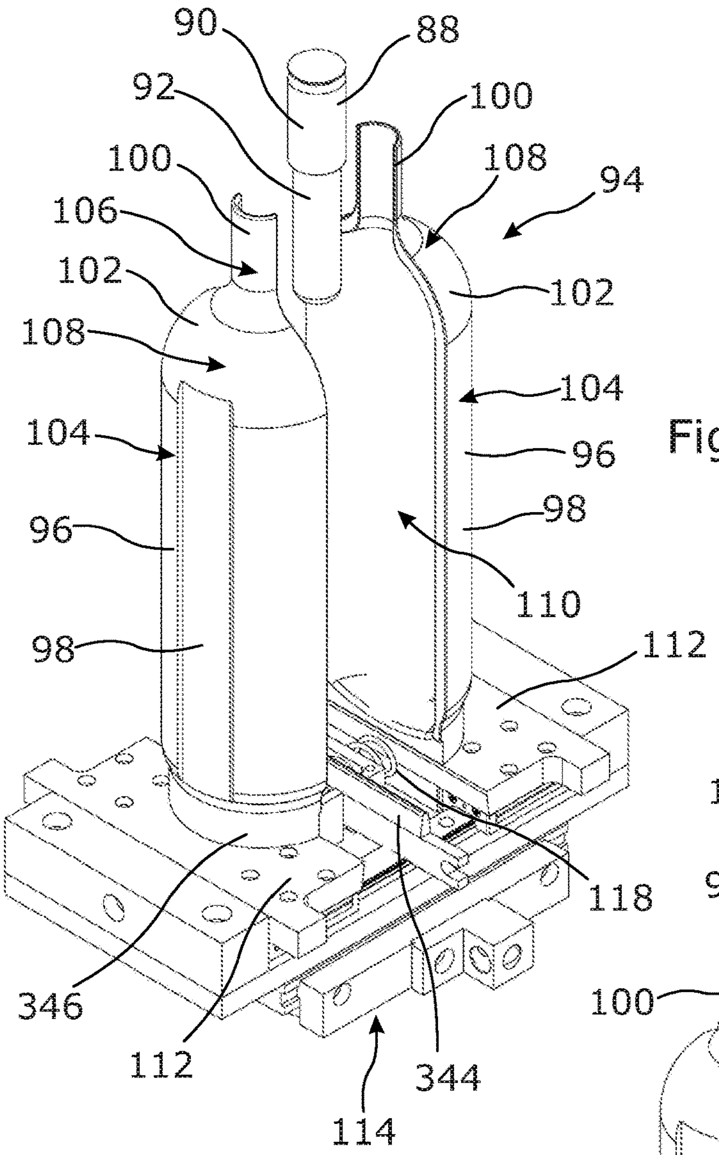
FIG. 12 is a perspective view of a split former according to an embodiment of the present invention.

In preferred embodiments the former 94 is split and the former 94 comprises two halves 96 as described above. Furthermore, in the closed configuration the two halves 96 of the former 94 are preferably not in contact with each other such that a gap remains between the two halves 96. Referring now to FIG. 12, the carriage assembly 114 may comprise a spacer member 344 disposed at a base 346 of the former 94. In the closed configuration the two halves 96 of the former 94 contact the spacer member 344 such that the spacer member 344 is disposed in the gap between the two halves 96 and maintains and defines the width of the gap in the closed configuration.

To remove the fully formed side wall 24 of the shell 4 from the former 94 the spacer member 344 is preferably moveable with respect to the former 94 to a removal position. In the removal position the spacer member 344 no longer maintains the gap between the two halves 96 of the former 94. The two halves 96 of the former 94 are preferably biased to move in a direction towards each other (for example by means of biasing element 118) such that the gap between the two halves 96 decreases in width. Movement of the two halves 96 of the former 94 towards each other creates a clearance between the outer surface of the former 94 and an inner surface of the side wall 24. The side wall 24 can then be slid or pulled off the former 94.

It will be appreciated that following removal of the stopper 88 at the sixth station 60 the neck sections 100 of the two halves 96 of the former 94 are free to move in a direction towards each other into the removal position. This movement into the removal position may result in minor deformation of the lower portion 13 of the fitment 14, however this deformation is preferably elastic deformation such that the lower portion 13 of the fitment 14 returns to its original shape after removal of the side wall 24 and pouch assembly 16 from the former 94.

The seventh station 62 further comprises an apparatus for inflating the pouch 6. A nozzle is preferably inserted into the fitment 14 and air is supplied to the nozzle to inflate the pouch 6. In other embodiments another suitable gas, such as an inert gas, may be supplied to the nozzle for inflating the pouch 6.

Inflation of the pouch 6 causes a distance between an end of the pouch 6 furthest from the fitment 14 (a lower end of the pouch 6) and the fitment 14 to decrease. The lower end of the pouch 6 therefore moves in a direction towards the fitment 14 within the side wall 24 and away from the base tabs 35. In this way a lower region of the inner surface 25 of the side wall 24 proximate and adjacent the base tabs 35 is exposed.

Station H

The eighth station 64 preferably comprises a mechanism for flaring the base tabs 35. The mechanism is preferably configured such that each of the base tabs 35 is pressed or pushed into a flared position in which the base tab 35 extends at an angle to and radially outwardly from the main body panel 34 from which the base tab 35 extends. Flaring the base tabs 35 in this way allows the base element 22 to be more easily inserted into the end of the side wall 24.

The eighth station 64 preferably further comprises an apparatus for applying the limit feature 350 to the inner surface 25 of the side wall 24 proximate the base tabs 35. In this embodiment the limit feature 350 comprises a line of adhesive extending in a circumferential direction around the lower region of the inner surface 25 of the side wall 24 proximate but spaced from the base tabs 35. The apparatus therefore comprises an applicator for applying a line of adhesive. The apparatus may comprise a mechanism for rotating the applicator while the side wall 24 remains stationary, or alternatively the apparatus may comprise a mechanism for rotating the side wall 24 while the applicator remains in a fixed position.

The line of adhesive dries or cures to form a substantially rigid protrusion extending inwardly from the inner surface 25 of the side wall 24. The line of adhesive may not extend fully around the circumference of the side wall 24.

In other embodiments the limit feature 350 may be of any suitable form that provides a substantially rigid protrusion extending inwardly from the inner surface 25 of the side wall 24. For example, in some embodiments, a line of a curable composition, other than an adhesive, may be applied to the inner surface 25 of the side wall 24. The composition may be a suitable polymeric composition. In other embodiments the adhesive or other composition may be applied as a series or line of discrete beads extending circumferentially around the inner surface 25 of the side wall 24.

In yet further embodiments the limit feature 350 may be provided by embossing or indenting a region of the side wall 24, or the limit feature 350 may be provided by folding a portion of the side wall 24. Importantly the limit feature 350 provides a substantially rigid protrusion extending inwardly from the inner surface 25 of the side wall 24 that limits the insertion of the base element 22 into the lower end of the side wall 24, as described further below.

Station I

At a ninth station 66 of the machine 40 the base element 22 is inserted into the end of the side wall 24.

In this embodiment a plurality of base elements 22 are held in the infeed assembly 68 associated with the ninth station 66. The infeed assembly 68 comprises a mechanism for supplying a single base element 22 to the ninth station 66 when required.

In preferred embodiments each of the base elements 22 are pre-formed to include the planar central region 26 and the peripheral skirt portion 28 that extends fully around the circumference of the central region 26.

The ninth station 66 comprises an apparatus for positioning a base element 22 with respect to the end of the side wall 24 and inserting the base element 22 into an opening defined by the end of the side wall 24. The base element 22 is inserted such that the first surface 27 of the base element 22 faces in a direction away from the neck portion 10 of the shell 4.

The base element 22 is inserted until the skirt portion 28 of the base element contacts or abuts the limit feature 350. The limit feature 350 therefore ensures that the base element 22 is in the correct position with respect to the base tabs 35 for the subsequent forming steps.

Station J

The tenth station 70 comprises an apparatus for applying adhesive to each of the base tabs 35 of the side wall 24. In this embodiment a bead or spot of adhesive 352 is applied to each base tab 35.

As adhesive is being applied to the base tabs 35, there is a clear advantage in applying the same adhesive to the inner surface 25 of the side wall 24 to form the limit feature 350. It is desirable if the adhesive forming the limit feature 350 cures or dries quickly. Accordingly, the same adhesive applied to the base tabs 35 will also dry or cure quickly.

Station K

The eleventh station 72 of the machine 40 comprises an apparatus for folding the base tabs 35 into contact with the skirt portion 28 of the base element 22. The apparatus may comprise a plurality of fingers configured to fold each of the base tabs 35. In other embodiments the apparatus may comprise an annular element arranged to engage with an outer surface of the base tabs 35. The annular element may be arranged to decrease in diameter to fold the base tabs 35 radially inwardly.

In yet further embodiments the eleventh station 72 may comprise a mandrel or former having a surface with a profile such that, when the base tabs 35 are brought into contact with the surface, the shape of the surface causes the base tabs 35 to fold inwardly.

During this folding and forming of the base tabs 35 the adhesive applied to the base tabs 35 is preferably not tacky or only provides limited adhesion.

Station L

The twelfth station 74 of the machine 40 preferably comprises a heating element. The heating element is configured to activate or re-activate the adhesive on the base tabs 35.

The heating element may be annular or circular.

The twelfth station 74 further comprises a press block including a press surface. The press surface has a shape corresponding to the shape of the first surface 27 of the base element 22. The press surface therefore includes a central planar region and an edge region extending around the periphery of the central region. The edge region extends at an angle from the planar central region. The press block is preferably made of a suitable metal material.

In some embodiments the press block is at ambient temperature. In other embodiments the twelfth station 74 includes means for cooling the press block to a temperature below ambient temperature.

In a preferred embodiment of a method of manufacturing a bottle 2 using the machine 40, the shell 4 of the bottle 2 is positioned in contact with the press surface. In particular, the shell is positioned such that the base tabs 35 are in contact with the press surface.

A force applied to the base tabs 35 by the press block to hold the base tabs 35 against the skirt portion 28 of the base element 22. The force is applied to the base tabs 35 for a pre-determined length of time sufficient to ensure that the adhesive of the base tabs 35 is cured.

The shell 4 of the bottle 2 is now fully formed.

In an optional further step in the method of manufacturing a bottle 2 a label is wrapped around the neck portion 10 of the bottle 2. The label preferably surrounds and covers at least a portion of the neck panels 36, 38. The label may be in the form of a paper label having an adhesive layer, or may be in the form of a length of tape.

The finished bottle 2 may then be ejected from the machine 40.

The bottle 2 may undergo a further drying process to remove excess moisture from the paperboard shell 4. The bottle 2 may therefore pass through a heater station including a heating element. The heater station may be in the form of a heater tunnel through which the bottle 2 is conveyed.

Additionally, a cap or other closure device may be affixed to the fitment 14. In preferred embodiments the upper portion 15 of the fitment 14 comprises a screw thread for engagement with a screw cap of the bottle 2.

In the preceding description each of the stations A to L of the machine 40 is described as a separate station. It will be appreciated, however, that in some embodiments the processes or method steps of more than one station may be combined into a single station. Alternatively, those method steps or processes of a single station described above may be provided by more than one station in other embodiments.

The machine 40 may include one or more controllers configured to operate one or more stations of the machine 40. The machine 40 may include a single controller configured to centrally coordinate and control the operation of all of the stations. In other embodiments each station of the machine may include a separate controller.

Although in the preceding description and embodiments the shell of the bottle comprised a side wall formed from two blanks, in other embodiments the side wall may be formed from a single blanks that is wrapped around the former, with a single overlap. This single blank will comprise a plurality of neck panels extending from the single main body panel. The single blank may include six neck panels extending from the main body panel such that when the blank is wrapped around the former, the neck panels adopt a configuration as described above. In yet further embodiments, the side wall of the shell may be formed from more than two blanks, each blank preferably including at least two neck panels.

Other modifications and variations not explicitly disclosed above may also be contemplated without departing from the scope of the invention as defined in the appended claims.

The invention claimed is:

1. An apparatus for use in manufacturing a bottle, the bottle comprising an inner pouch and an outer paperboard shell, the shell being made from a sheet blank comprising a main body panel, and a plurality of neck panels including at least first and second neck panels, and the apparatus comprising:

a former having a cavity for receiving said pouch, the former comprising a main body section, a neck section and a shoulder section extending between the main body section and the neck section;

at least two neck press elements, each neck press element including a press surface facing and aligned with at least a part of the neck section of the former, and each neck press element being moveable into a clamping position to clamp a part of one of said neck panels between the neck press element and the neck section of the former, with the plurality of neck panels, in combination, extending around an outer circumference of the former; and at least two shoulder press elements, each shoulder press element including a press surface facing and aligned with the shoulder section of the former, and each shoulder press element being moveable into a clamping position to clamp a part of one of said neck panels between the shoulder press element and the shoulder section of the former, wherein the cavity extends through the neck section and the main body section of the former.

2. An apparatus as claimed in claim 1, comprising a pair of the neck press elements, the neck press elements being disposed on opposite sides of the former, and a pair of the shoulder press elements, the shoulder press elements being disposed on opposite sides of the former.

3. An apparatus as claimed in claim 1, wherein the main body section of the former is substantially cylindrical and the neck section of the former is substantially cylindrical, and a diameter of the main body section of the former is larger than a diameter of the neck section of the former.

4. An apparatus as claimed in claim 1, wherein the press surface of each of the shoulder press elements is a curved press surface, and/or wherein the press surface of each of the neck press elements includes a curved portion.

5. An apparatus as claimed in claim 4, wherein the curved press surface of each of the shoulder press elements comprises an upper portion having a part-cylindrical shape with a first radius of curvature, and a lower portion having a part-cylindrical shape with a second radius of curvature, the second radius of curvature being larger than the first radius of curvature.

6. An apparatus as claimed in claim 5, wherein the curved press surface of each of the shoulder press elements further comprises a middle portion disposed between the upper portion and the lower portion, the middle portion of the press surface having a double curvature, and wherein two planes of principle curvature of the middle portion of the press surface are perpendicular to each other.

7. An apparatus as claimed in claim 1, wherein each of the neck press elements comprises a pair of arms extending substantially parallel to each other, a gap being defined between the arms, and a curved press surface is provided at a distal end of each arm.

8. An apparatus as claimed in claim 1, further comprising a heating element configured to heat a region of the first neck panel to activate adhesive on a surface of the first neck panel.

9. An apparatus as claimed in claim 8, wherein the heating element is moveable between a disengaged position and an engaged position, and movement of the heating element from the disengaged position to the engaged position comprises movement of the heating element in a direction towards the former.

10. An apparatus as claimed in claim 1, in which the first neck panel of the blank includes an aperture, and the apparatus comprises an alignment finger moveable between a retracted position, in which an end of the alignment finger is at a distance from the former, and an inserted position, in which the end of the alignment finger extends through the aperture in the first neck panel.

11. An apparatus as claimed in claim 1, further comprising a pair of push rods, each of the push rods being aligned with a part of the shoulder section of the former, and each of the push rods being moveable into an extended position in which each push rod applies a force to a respective neck panel to deflect at least a part of the neck panel in a direction towards the neck section of the former.

12. An apparatus as claimed in claim 11, wherein each push rod extends through an aperture in a respective one of the shoulder press elements.

13. An apparatus as claimed in claim 1, wherein the press surface of each of the neck press elements includes a straight portion.

14. An apparatus as claimed in claim 13, further comprising an actuator connected to each one of the neck press elements, the actuator being arranged to move the neck press element with respect to the shoulder press element about a pivotal connection between the neck press element and the shoulder press element.

15. An apparatus as claimed in claim 14, wherein the arrangement of the actuator, the shoulder press element and the neck press element is such that the actuator is arranged to move the shoulder press element into the clamping position and, subsequently, to move the neck press element into the clamping position.

16. An apparatus as claimed in claim 13, wherein the apparatus comprises a plurality of the neck press elements arranged in a substantially circular array around the former.

17. An apparatus as claimed in claim 16, further comprising at least two alignment plates, a first set of the neck press elements being connected to a first one of the alignment plates and a second set of the neck press elements being connected to a second one of the alignment plates, the alignment plates being moveable in a direction towards the former.

18. An apparatus as claimed in claim 17, wherein each of the alignment plates includes a radially inner curved surface, a radius of curvature of the radially inner curved surface being substantially the same as a radius of curvature of the neck section of the former.

19. An apparatus as claimed in claim 1, wherein the former comprises two halves, between which the cavity is defined.

20. An apparatus as claimed in claim 19, wherein the two halves of the former are separated by a gap, and the two halves are movable between an open and a closed configuration, and wherein the gap between the two halves in the closed configuration is smaller than the gap between the two halves in the open configuration.

* * * * *